US011015385B2

(12) United States Patent
Fraser

(10) Patent No.: US 11,015,385 B2
(45) Date of Patent: May 25, 2021

(54) MOTORIZED SHUTTER ASSEMBLY

(71) Applicant: Hunter Douglas Inc., Pearl River, NY (US)

(72) Inventor: Donald E. Fraser, Owensboro, KY (US)

(73) Assignee: HUNTER DOUGLAS INC., Pearl River, NY (US)

(*) Notice: Subject to any disclaimer, the term of this patent is extended or adjusted under 35 U.S.C. 154(b) by 0 days.

(21) Appl. No.: 16/903,517

(22) Filed: Jun. 17, 2020

(65) Prior Publication Data

US 2020/0308902 A1 Oct. 1, 2020

Related U.S. Application Data

(63) Continuation of application No. 16/546,487, filed on Aug. 21, 2019, now Pat. No. 10,697,232, which is a (Continued)

(51) Int. Cl.
*E06B 7/096* (2006.01)
*E06B 7/09* (2006.01)
(Continued)

(52) U.S. Cl.
CPC .............. *E06B 7/09* (2013.01); *E05F 15/619* (2015.01); *E06B 9/04* (2013.01);
(Continued)

(58) Field of Classification Search
CPC ... E06B 7/09; E06B 7/096; E06B 9/04; F16D 43/211; F16D 7/022; E05F 15/619; E05Y 2900/146
(Continued)

(56) References Cited

U.S. PATENT DOCUMENTS 107,557 A 9/1870 Smith
145,842 A 12/1873 Byam
(Continued)

FOREIGN PATENT DOCUMENTS

AU 1950700 9/2000
CA 2933937 12/2016
(Continued)

OTHER PUBLICATIONS

Great Brittan Search Report for Application No. GB1720682.2 dated Feb. 21, 2019 (2 pages).
(Continued)

*Primary Examiner* — Jerry E Redman
(74) *Attorney, Agent, or Firm* — Dority & Manning, P.A.

(57) ABSTRACT

In one aspect, a shutter assembly includes a shutter frame and a plurality of louvers supported by the frame. The shutter assembly also includes a louver drive assembly and a motor positioned within the frame. The motor is configured to rotationally drive a drive shaft extending within the frame. Additionally, the shutter assembly includes a clutch assembly rotationally coupled between the drive shaft and the louver drive assembly. The clutch assembly is configured to disengage or decouple the drive shaft from the louver drive assembly when a torque transmitted through the clutch assembly exceeds a given torque threshold.

20 Claims, 34 Drawing Sheets

Related U.S. Application Data continuation of application No. 15/834,331, filed on Dec. 7, 2017, now Pat. No. 10,407,977.

(60) Provisional application No. 62/439,527, filed on Dec. 28, 2016.

(51) Int. Cl.
*E05F 15/619* (2015.01)
*E06B 9/04* (2006.01)
*F16D 7/02* (2006.01)

(52) U.S. Cl.
CPC ......... *E05Y 2900/146* (2013.01); *E06B 7/096* (2013.01); *F16D 7/022* (2013.01)

(58) Field of Classification Search
USPC .......................................................... 49/82.1
See application file for complete search history.

(56) References Cited

U.S. PATENT DOCUMENTS

| | | | | |
|---|---|---|---|---|
| 164,464 | A | 6/1875 | Lanphere | |
| 284,222 | A | 9/1883 | Nelson | |
| 342,124 | A | 5/1886 | Naylor | |
| 397,322 | A | 2/1889 | Whitaker | |
| 439,912 | A | 11/1890 | Ward | |
| 518,368 | A * | 4/1894 | Jobin | E06B 7/084 49/74.1 |
| 708,618 | A * | 9/1902 | Briggs | E06B 7/084 49/87.1 |
| 734,603 | A * | 7/1903 | Plucker | F24F 13/15 49/77.1 |
| 1,715,424 | A | 6/1929 | Ohno | |
| 1,830,405 | A | 11/1931 | Ohno | |
| 1,932,244 | A | 10/1933 | Green | |
| 2,225,332 | A * | 12/1940 | Collins | E06B 7/084 49/82.1 |
| 2,955,815 | A * | 10/1960 | Muhr | E06B 7/084 49/64 |
| 3,285,089 | A | 11/1966 | Tsugawa | |
| 3,853,167 | A | 12/1974 | Wardlaw | |
| 4,389,014 | A | 6/1983 | Chow | |
| 4,406,319 | A | 9/1983 | McNiel et al. | |
| 4,417,185 | A | 11/1983 | Bullat | |
| 4,449,563 | A * | 5/1984 | Toda | E06B 9/26 160/184 |
| 4,644,990 | A | 2/1987 | Webb, Sr. et al. | |
| 4,850,138 | A | 7/1989 | Watannabe et al. | |
| 4,896,713 | A | 1/1990 | Rademacher | |
| 4,934,438 | A | 6/1990 | Yuhas et al. | |
| 4,957,600 | A | 9/1990 | Carlson et al. | |
| 5,390,721 | A | 2/1995 | Oskam et al. | |
| 5,537,780 | A * | 7/1996 | Cleaver | E06B 7/086 49/82.1 |
| 5,760,558 | A | 6/1998 | Popat | |
| 5,762,123 | A | 6/1998 | Kuyama et al. | |
| 5,957,186 | A | 9/1999 | Boswell | |
| 5,969,492 | A | 10/1999 | Motte et al. | |
| 6,014,839 | A | 1/2000 | Ruggles | |
| 6,021,691 | A | 2/2000 | Wilkerson, Jr. | |
| 6,029,735 | A | 2/2000 | Nicholson | |
| 6,049,293 | A | 4/2000 | Koot et al. | |
| 6,055,885 | A | 5/2000 | Shea | |
| 6,094,864 | A * | 8/2000 | Hsu | E06B 7/096 49/82.1 |
| 6,170,274 | B1 | 1/2001 | Ichishi et al. | |
| 6,181,089 | B1 | 1/2001 | Kovach et al. | |
| 6,244,325 | B1 | 6/2001 | Miller et al. | |
| 6,259,218 | B1 | 7/2001 | Kovach et al. | |
| 6,314,680 | B1 * | 11/2001 | Buckwaiter | E06B 7/096 49/82.1 |
| 6,338,677 | B1 | 1/2002 | White | |
| 6,347,987 | B1 | 2/2002 | Ichishi et al. | |
| 6,369,530 | B2 | 4/2002 | Kovach et al. | |
| 6,429,961 | B1 | 8/2002 | Harary et al. | |
| 6,568,131 | B1 * | 5/2003 | Milano, Jr. | E06B 7/096 49/25 |
| 6,701,669 | B1 * | 3/2004 | Yorgason | E06B 7/096 49/82.1 |
| 6,789,597 | B2 | 9/2004 | Wen et al. | |
| 6,984,951 | B2 | 1/2006 | Osinga et al. | |
| 7,040,056 | B2 | 5/2006 | DuBose et al. | |
| 7,040,374 | B2 | 5/2006 | Wen et al. | |
| 7,082,982 | B2 | 8/2006 | Eveland et al. | |
| 7,124,537 | B2 | 10/2006 | Young | |
| 7,178,291 | B2 | 2/2007 | Vasquez | |
| 7,328,533 | B1 * | 2/2008 | Coleman | E06B 7/08 49/74.1 |
| 7,389,806 | B2 | 6/2008 | Kates | |
| 7,434,353 | B2 | 10/2008 | Nien et al. | |
| 7,481,133 | B2 | 1/2009 | Walravens et al. | |
| 7,574,827 | B2 | 8/2009 | Huang et al. | |
| 7,584,777 | B2 | 9/2009 | Hoberman et al. | |
| 7,740,045 | B2 | 6/2010 | Anderson et al. | |
| 7,931,068 | B2 | 4/2011 | Carmen, Jr. et al. | |
| 8,079,398 | B2 | 12/2011 | Tsukamoto | |
| 8,161,919 | B2 * | 4/2012 | Klotz | B60K 11/085 123/41.04 |
| 8,281,843 | B2 | 10/2012 | Yu et al. | |
| 8,336,256 | B2 | 12/2012 | Jeffrey et al. | |
| 8,393,378 | B2 | 3/2013 | Geriniere et al. | |
| 8,424,378 | B2 | 4/2013 | Mugnier et al. | |
| 8,432,117 | B2 | 4/2013 | Berman et al. | |
| 8,511,364 | B2 | 8/2013 | Anderson et al. | |
| 8,723,455 | B2 | 5/2014 | Mullet et al. | |
| 8,739,744 | B2 | 6/2014 | Charnesky et al. | |
| 8,806,806 | B2 | 8/2014 | Leivenzon et al. | |
| 8,851,141 | B2 | 10/2014 | Blair et al. | |
| 8,931,541 | B2 | 1/2015 | Chambers et al. | |
| 8,973,305 | B2 * | 3/2015 | Zalesak | E06B 7/09 49/74.1 |
| 9,038,800 | B2 | 5/2015 | Dang | |
| 10,221,615 | B2 * | 3/2019 | Meyerink | E06B 9/02 |
| 10,407,977 | B2 * | 9/2019 | Fraser | E06B 7/09 |
| 10,697,232 | B2 * | 6/2020 | Fraser | E06B 9/04 |
| 2002/0129553 | A1 | 9/2002 | Metzen et al. | |
| 2003/0159355 | A1 | 8/2003 | Froerer et al. | |
| 2003/0188836 | A1 | 10/2003 | Whiting | |
| 2004/0094274 | A1 | 5/2004 | Judkins | |
| 2004/0226222 | A1 * | 11/2004 | Young | E06B 7/084 49/82.1 |
| 2004/0244291 | A1 * | 12/2004 | Lee | E06B 7/096 49/82.1 |
| 2005/0189078 | A1 | 9/2005 | Whiting | |
| 2005/0252086 | A1 * | 11/2005 | Yorgason | E06B 7/096 49/82.1 |
| 2005/0257429 | A1 * | 11/2005 | Yorgason | E06B 7/096 49/82.1 |
| 2007/0123158 | A1 | 5/2007 | Shibata et al. | |
| 2007/0204513 | A1 * | 9/2007 | Griffiths | E06B 7/096 49/82.1 |
| 2007/0266636 | A1 * | 11/2007 | Chen | E06B 7/096 49/82.1 |
| 2008/0000157 | A1 * | 1/2008 | Nien | E06B 7/096 49/82.1 |
| 2008/0244979 | A1 * | 10/2008 | Huang | E06B 7/096 49/82.1 |
| 2010/0332034 | A1 | 12/2010 | Bergeson et al. | |
| 2012/0000133 | A1 | 1/2012 | Rohee | |
| 2012/0085030 | A1 * | 4/2012 | Marocco | E06B 7/096 49/82.1 |
| 2014/0055061 | A1 | 2/2014 | Chambers et al. | |
| 2014/0059931 | A1 | 3/2014 | Tasheiko et al. | |
| 2014/0224437 | A1 * | 8/2014 | Colson | E06B 9/72 160/291 |
| 2014/0332168 | A1 | 11/2014 | Vasquez | |
| 2014/0352217 | A1 * | 12/2014 | Blackburn | E06B 7/086 49/82.1 |
| 2015/0020452 | A1 * | 1/2015 | Chen | E06B 7/09 49/82.1 |
| 2015/0240560 | A1 | 8/2015 | Blair et al. | |

(56) References Cited

U.S. PATENT DOCUMENTS

| | | | |
|---|---|---|---|
| 2016/0032642 A1* | 2/2016 | Rotchell | E06B 7/086 49/82.1 |
| 2016/0376834 A1* | 12/2016 | Meyerink | E06B 7/096 49/82.1 |
| 2018/0030777 A1* | 2/2018 | Yen | E06B 7/09 |
| 2018/0311519 A1* | 11/2018 | Jenks | A62C 2/14 |
| 2018/0320438 A1* | 11/2018 | Anderson | E06B 9/322 |
| 2019/0078377 A1* | 3/2019 | Jao | E05F 15/619 |

FOREIGN PATENT DOCUMENTS

| | | |
|---|---|---|
| CN | 2486703 | 4/2002 |
| CN | 1154786 | 6/2004 |
| CN | 203008747 | 6/2013 |
| CN | 203010866 | 6/2013 |
| CN | 203977740 | 12/2014 |
| CN | 104343374 | 2/2015 |
| CN | 105386642 | 3/2016 |
| DE | 202014003969 | 5/2014 |
| EP | 399130 | 5/1989 |
| EP | 0399130 | 11/1990 |
| EP | 1087096 | 3/2001 |
| EP | 2829683 | 1/2015 |
| EP | 2980346 | 2/2019 |
| FR | 1473554 | 1/1915 |
| GB | 658681 | 10/1951 |
| GB | 768127 | 2/1957 |
| GB | 1422989 | 1/1976 |
| JP | H 0350442 | 3/1991 |
| JP | H 03180686 | 8/1991 |
| JP | H 03248158 | 11/1991 |
| JP | H 05248158 | 9/1993 |
| JP | H07180458 | 7/1995 |
| JP | H 09221972 | 8/1997 |
| JP | H 09324586 | 12/1997 |
| JP | H 10266741 | 10/1998 |
| JP | H 10266742 | 10/1998 |
| JP | 2982143 | 9/1999 |
| JP | H 11310034 | 11/1999 |
| JP | 2005273220 | 10/2005 |
| JP | 3750197 | 3/2006 |
| JP | 3800754 | 5/2006 |
| JP | 3823430 | 7/2006 |
| JP | 2009084894 | 4/2009 |
| JP | 4521021 | 5/2010 |
| JP | 2010265715 | 11/2010 |
| JP | 5235780 | 4/2013 |
| KR | 19960023589 | 7/1996 |
| KR | 200196516 | 9/2000 |
| KR | 100298884 | 6/2001 |
| TW | 487134 | 5/2002 |
| TW | 529658 | 4/2003 |
| WO | WO 2006/005107 | 1/2006 |
| WO | WO 2006/045299 | 5/2006 |
| WO | WO 2006/120771 | 11/2006 |
| WO | WO 2007/132363 | 11/2007 |
| WO | WO 2008/006177 | 1/2008 |
| WO | WO 2008/119247 | 10/2008 |

OTHER PUBLICATIONS

NL Search Report issued in corresponding Application No. NL2022401, dated Jul. 10, 2019, (12 pages).

* cited by examiner

MOTORIZED SHUTTER ASSEMBLY

CROSS-REFERENCE TO RELATED APPLICATIONS

This application is a continuation of U.S. patent application Ser. No. 16/546,487 (now U.S. Pat. No. 10,697,232), filed Aug. 21, 2019, which is a continuation of U.S. patent application Ser. No. 15/834,331 (now U.S. Pat. No. 10,407,977), filed Dec. 7, 2017, which, in turn, is based upon and claims the right of priority to U.S. Provisional Patent Application No. 62/439,527, filed on Dec. 28, 2016, the disclosures of all of which are hereby incorporated by reference herein in their entirety for all purposes.

FIELD OF THE INVENTION

The present subject matter relates generally to coverings for architectural structures and, more particularly, to a motorized shutter assembly for use as a covering for an architectural structure, such as a window.

BACKGROUND OF THE INVENTION

Shutter assemblies typically include two or more shutter panels configured to be installed within a frame relative to an architectural structure, such as a window. Each shutter panel includes a shutter frame and a plurality of louvers configured to rotate relative to the shutter frame. For instance, the ends of the louvers are often rotatable coupled to the shutter frame via louver pegs to allow the louvers to be rotated relative to the frame between a substantially vertical orientation and a substantially horizontal orientation. Additionally, in many instances, a tie bar may be secured to all or a portion of the louvers of each shutter panel to couple the louvers to one another, thereby allowing such louvers to be rotated simultaneously relative to the adjacent shutter frame.

To enhance the functionality and usability of shutter assemblies, attempts have been made to integrate automatic louver drive systems within shutter assemblies that allow for the automatic adjustment of the rotational orientation of the louvers. For example, louver drive systems have been developed in the past that include multiple motors as well as complex gearbox arrangements associated with each motor. As a result, these conventional louver drive systems are often costly and quite difficult to design and manufacture, in addition, due to the use of multiple motors and associated gearboxes, such louver drive systems significantly increase the overall weight of the associated shutter assembly and also reduce the available space for the louvers of the shutter assembly given the significant storage requirements for the motors/gearboxes.

Accordingly, an improved motorized shutter assembly would be welcomed in the technology.

BRIEF DESCRIPTION OF THE INVENTION

Aspects and advantages of the present subject matter will be set forth in part in the following description, or may be obvious from the description, or may be learned through practice of the present subject matter.

In various aspects, the present subject matter is directed to a shutter assembly for use as a covering for an architectural structure, with the shutter assembly including a motorized drive system. Specifically, in several embodiments, the shutter assembly includes a motor configured to drive a primary drive shaft coupled to a louver drive assembly. The louver drive assembly may, in turn, be coupled to one or more driven louvers of the shutter assembly. Accordingly, by rotating the primary drive shaft via the motor, rotational motion is transferred to each driven louver via the louver drive assembly to allow the rotational orientation of the louvers to be automatically adjusted.

Additionally, in several embodiments, the shutter assembly includes one or more clutch assemblies configured to disengage or decouple the louvers from the motor when the rotational orientation of the louvers is being manually adjusted, thereby allowing the automatic louver drive system to be manually overridden when desired. For instance, in one embodiment, a clutch assembly may be coupled between the primary drive shaft and the louver drive assembly. In such an embodiment, the clutch assembly is configured to disengage or decouple the louver drive assembly from the primary drive shaft, thereby allowing the driven louvers to be rotated freely without back-driving the motor.

Moreover, in accordance with aspects of the present subject matter, the motor of the disclosed drive system may be configured to drive the louvers of one or more additional shutter panels positioned relative to the shutter panel within which the motor is installed. For instance, in one embodiment, adjacent shutter panels include drive shafts that terminate at or adjacent to an interface defined between the shutter panels. In such an embodiment, the adjacent ends of the shafts may be coupled to each other at the interface to allow rotational motion from one of the drive shafts to be transferred to the adjacent drive shaft across the interface, thereby allowing the motor to drive the louvers of the adjacent shutter panels.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Figure 1:
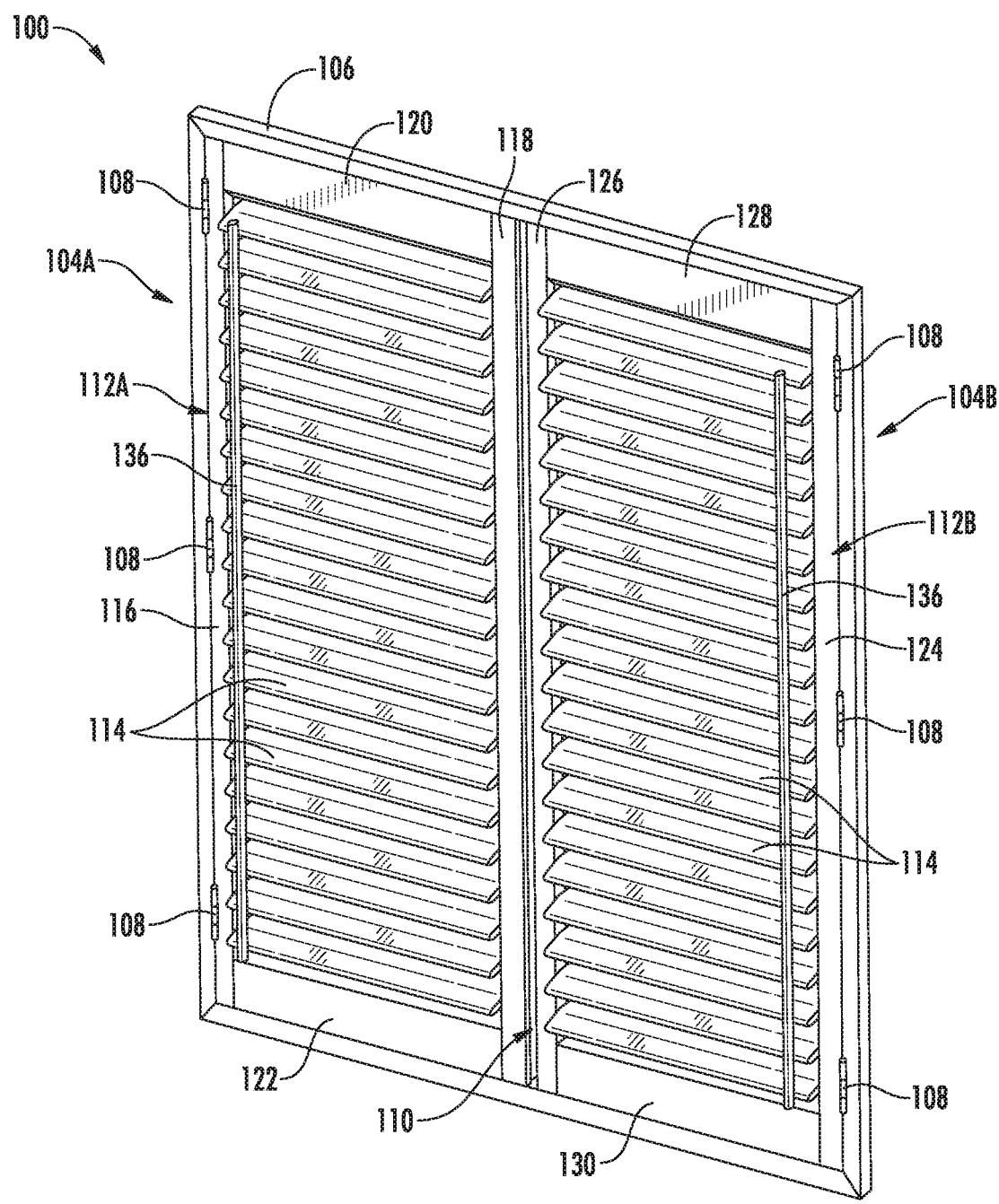
FIG. 1 illustrates a perspective view of one illustrative embodiment of a motorized shutter assembly configured for use as a covering for an architectural structure in accordance with aspects of the present subject matter, particularly illustrating the shutter panels in a closed position relative to the adjacent architectural structure.

Reference now will be made in detail to embodiments of the present subject matter, one or more examples of which are illustrated in the drawings. Each example is provided by way of explanation without intent to limit the broad concepts of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

In general, the present subject matter is directed to a shutter assembly configured for use as a covering for an architectural structure, with the shutter assembly including a motorized louver drive system. Specifically, in several embodiments, the motorized louver drive system includes a motor configured to adjust the rotational orientation of the louvers within the shutter assembly. As such, when the user activates the motor, the motor may be used to drive the louvers without any further manual interaction from the user.

In one embodiment, a louver drive assembly is installed within a shutter frame of the shutter assembly (e.g., within a stile of the shutter frame) that is configured to be coupled to a primary drive shaft coupled to the motor. In such an embodiment, the louver drive assembly may be coupled to one or more driven louvers of the shutter assembly. Accordingly, rotation of the primary drive shaft via the motor may be transferred through the louver drive assembly to each driven louver, thereby allowing the orientation of the louvers within the shutter assembly to be adjusted.

Additionally, the shutter assembly also includes one or more clutch assemblies configured to disengage or decouple the louvers from the motor. Specifically, in several embodiments, each clutch assembly may be configured to decouple its associated louver(s) from the motor when the rotational orientation of such louver(s) is being adjusted manually (e.g., adjustment without the use of a motor or other mechanized device). As such, the automatic louver drive system may be manually overridden when a user of the shutter assembly desires to adjust one or more of the louvers manually. In addition, such decoupling of the louvers from the motor may be desirable to prevent back-driving of the motor during manual adjustment, which may reduce the potential for damage to the motor.

In one embodiment, each clutch assembly includes one or more torque transfer members that provide a selective coupling (e.g., a rotational coupling) between separate input and output members or portions of the clutch assembly (e.g., first and second clutch drive members of the clutch assembly). In such an embodiment, the torque transfer member(s) may be configured to transfer torque between the input and output members when the torque being transmitted through the clutch assembly is less than a given torque threshold (e.g., when the louvers are being drive by a motor). However, when the torque being transmitted through the clutch assembly exceeds the associated torque threshold (e.g., during manual operation), the torque transfer member(s) may allow the input and output members to be decoupled or disengaged from each other.

In one embodiment, a first portion of the coupling formed by the torque transfer member(s) of the clutch assembly may be configured to selectively engage the input member while a second portion of the coupling formed by the torque transfer member(s) may be configured to selectively engage the output member. In such an embodiment, the first and second portions of the coupling may be configured to engage the input and output members, respectively, when the torque being transmitted through the clutch assembly is below the torque threshold. However, when the torque being transmitted through the clutch assembly exceeds the torque threshold, one of the first portion or the second portion of the coupling may be configured to disengage from its respective input/output member when the rotational direction of the torque input into the clutch assembly is in a first direction while the other of the first portion or the second portion of the coupling may be configured to disengage from its respective input/output member when the rotational direction of the torque input into the clutch assembly is in a second, opposite direction.

In one embodiment, the first and second portions of the coupling formed by the torque transfer member(s) of the clutch assembly correspond to separate coiled sections of a single clutch spring or respective coiled sections of separate clutch springs. In such an embodiment, the coiled sections may be counter-wrapped or wound in opposite directions relative to each other. As such, when the torque being transmitted through the clutch assembly exceeds the torque threshold, one of the coiled sections may be configured to tighten around its respective input/output member while the other coiled section may be configured to loosen relative to its respective input/output member depending on the rotational direction of the torque. The loosened coiled section may, thus, be allowed to slip relative to or otherwise decouple from its respective input/output member, thereby permitting the input member to be decoupled or disengaged from the output member.

Moreover, in several embodiments, the shutter assembly includes two or more shutter panels configured to be installed adjacent to one another within a frame positioned relative to the architectural structure. In such embodiments, the motor of the louver drive system may be configured to drive all of the louvers of the shutter assembly, including both the louvers of the shutter panel within which the motor is installed and the louvers of any other adjacent shutter panels. For instance, in one embodiment, adjacent shutter panels include drive shafts that terminate at or adjacent to an interface defined between the shutter panels. In such an embodiment, the adjacent ends of the shafts may be coupled to each other at the interface to allow rotational motion from one of the drive shafts to be transferred to the adjacent drive shaft across the interface, thereby allowing a single motor to drive the louvers of the adjacent shutter panels.

In one embodiment, the adjacent ends of the drive shafts of adjacent shutter panels are coupled to each other via mating coupling assemblies positioned at the shaft ends. In such an embodiment, each coupling assembly includes one or more engagement features configured to engage corresponding engagement features of the mating coupling assembly. For instance, each coupling assembly may include axially extending ribs configured to engage corresponding ribs of the mating coupling assembly. As such, when one of the drive shafts is rotated, torque may be transferred across the interface defined between the shutter panels to the adjacent drive via the engagement provided between the mating coupling assemblies. In addition, the engagement feature(s) of the coupling assemblies may be configured to align with each other when one of the drive shafts is rotated relative to the other, thereby permitting torque to be transferred across the interface even when the coupling assemblies are initially misaligned.

In a particular aspect of the present subject matter, a shutter assembly includes a shutter frame, a plurality of louvers supported by the shutter frame, and a louver drive assembly positioned within the shutter frame, with the louver drive assembly being rotationally coupled to at least one driven louver of the plurality of louvers. Additionally, the shutter assembly includes a motor positioned within the shutter frame, with the motor being configured to rotationally drive a drive shaft extending lengthwise within the shutter frame. Moreover, the shutter assembly includes a clutch assembly rotationally coupled between the drive shaft and the louver drive assembly. The clutch assembly includes a first clutch drive member, a second clutch drive member, and first and second torque transfer members coupled to each other to provide a rotational coupling between the first and second clutch drive members, with first torque transfer member configured to be selectively engaged with the first clutch drive member, and the second torque transfer member configured to be selectively engaged with the second clutch drive member. In such an embodiment, when a torque transmitted through the clutch assembly exceeds a torque threshold (e.g., such as when a louver is moved manually by a user with or without the motor), one of the first torque transfer member or the second torque transfer member is configured to disengage from a respective clutch drive member of the first and second clutch drive members to decouple the first clutch drive member from the second clutch drive member.

Additionally, in one embodiment, when the torque transmitted through the clutch assembly is less than the torque threshold, the first and second torque transfer members are engaged with the first and second clutch drive members, respectively, to allow the torque to be transmitted between the first and second clutch drive members. In one embodiment, a minimum torque required to rotationally drive the louvers may be less than the torque threshold such that the torque is transmitted between the first and second clutch drive members when the motor is being operated to rotationally drive the louver drive assembly without external input to the louvers.

Moreover, in one embodiment, the torque transmitted through the clutch assembly is configured to exceed the torque threshold when the louvers are being manually rotated.

Further, in one embodiment, the first torque transfer member corresponds to a first clutch spring and the second torque transfer member corresponds to a second clutch spring. In such an embodiment, the first clutch spring may be configured to be selectively engaged with a first spring support surface of the first clutch drive member, and the second clutch spring may be configured to be selectively engaged with a second spring support surface of the second clutch drive member. For example, when the torque transmitted through the clutch assembly exceeds the torque threshold, the first clutch spring may be configured to tighten around the first spring support surface, and the second clutch spring may be configured to loosen relative to the second spring support surface when the torque is transmitted through the clutch assembly in a first direction, thereby allowing the second clutch spring to slip relative to the second clutch drive member. Additionally, the first clutch spring may be configured to loosen relative to the first spring support surface, and the second clutch spring may be configured to tighten around the second spring support surface when the torque is transmitted through the clutch assembly in an opposite, second direction, thereby allowing the first clutch spring to slip relative to the first clutch drive member.

Additionally, in one embodiment, the first and second clutch springs are coupled to each other via a clutch sleeve such that the first and second clutch springs and the clutch sleeve collectively form the rotational coupling between the first and second clutch drive members. In such an embodiment, the first clutch spring may include, for example, both a first coiled section extending around a portion of the first clutch drive member, and a first spring tang extending outwardly from the first coiled section. Similarly, the second clutch spring may include, for instance, both a second coiled section extending around a portion of the second clutch drive member, and a second spring tang extending outwardly from the second coiled section.

Moreover, in one embodiment, the first and second spring tangs are configured to be coupled to the clutch sleeve. For example, the clutch sleeve may include an outer wall and a spring engagement portion extending radially inwardly from the outer wall. In addition, the spring engagement portion may define both a first engagement slot for receiving the first spring tang and a second engagement slot for receiving the second spring tang.

Further, in one embodiment, the louver drive assembly includes a drive rack assembly rotationally engaged with the clutch assembly and at least one driven rack assembly rotationally engaged with a louver drive post associated with the driven louver(s). In such an embodiment, the drive rack assembly and the driven rack assembly may be operatively coupled to each other via a pair of drive bars extending lengthwise within the shutter frame. Moreover, in one embodiment, the drive rack assembly includes a rack gear and a pair of geared racks configured to mesh with the rack gear, with the rack gear being configured to rotationally engage the second clutch drive member of the clutch assembly.

Additionally, in one embodiment, the shutter frame includes a top rail, a bottom rail, and first and second stiles extending between the top and bottom rails.

Further, in one embodiment, the motor and the clutch assembly are both positioned within one of the bottom rail or the top rail.

In another aspect, the present subject matter is directed to a clutch assembly for use within a motorized shutter, with the motorized shutter including a motor configured to rotationally drive a drive shaft and a louver drive assembly rotationally coupled to a plurality of louvers of the motorized shutter.

In one embodiment, the clutch assembly includes a clutch housing and a first clutch drive member configured to be at least partially received within the clutch housing, with first clutch drive member being configured to rotationally engage the drive shaft. The clutch assembly also includes a second clutch drive member configured to be at least partially received within the clutch housing, with the clutch drive member being configured to rotationally engage a component of the louver drive assembly. Additionally, the clutch assembly includes a first torque transfer member configured to be selectively engaged with the first clutch drive member, and a second torque transfer member coupled configured to be selectively engaged with the second clutch drive member, with the first and second torque transfer members being coupled to each other to provide a rotational coupling between the first and second clutch drive members. Moreover, when a torque transmitted through the clutch assembly exceeds a torque threshold, one of the first torque transfer member or the second torque transfer member is configured to rotationally disengage from a respective clutch drive member of the first and second clutch drive members to decouple the first clutch drive member from the second clutch drive member.

Additionally, in one embodiment, when the torque transmitted through the clutch assembly is less than the torque threshold, the first and second torque transfer members are engaged with the first and second clutch drive members, respectively, to allow the torque to be transmitted between the first and second clutch drive members.

Moreover, in one embodiment, the first torque transfer member corresponds to a first clutch spring and the second torque transfer member corresponds to a second clutch spring. Further, in one embodiment, the torque threshold corresponds to a slippage torque of the first and second clutch springs.

In a further aspect, the present subject matter is directed to a shutter assembly including a first shutter panel having a first shutter frame and a first drive shaft extending within the first shutter frame. The shutter assembly also includes a second shutter panel having a second shutter frame configured to extend adjacent to the first shutter frame at a panel-to-panel interface defined between the first and second shutter panels, with the second shutter panel including a second drive shaft extending within the second shutter frame and being axially aligned with the first drive shaft. Additionally, the shutter assembly also includes a motor rotationally coupled to the first drive shaft. Moreover, the shutter assembly includes a first coupling assembly coupled to an end of the first drive shaft, with the first coupling assembly including a plurality of first engagement ribs extending axially towards the second shutter panel at the panel-to-panel interface. Further, the shutter assembly includes a second coupling assembly coupled to an end of the second drive shaft, with the second coupling assembly including a plurality of second engagement ribs extending axially towards the first shutter panel at the panel-to-panel interface. The first engagement ribs are configured to engage the second engagement ribs such that rotational motion of the first drive shaft is transferred to the second drive shaft across the panel-to-panel interface.

In one embodiment, the first engagement ribs extend axially from an end wall of the first coupling assembly and are spaced apart circumferentially in an annular array such that a circumferential gap is defined between each adjacent pair of the first engagement ribs. Additionally, in one embodiment, each of the first engagement ribs defines a radial height, with the radial height being greater than a circumferential width of the circumferential gap defined between each adjacent pair of the first engagement ribs.

Moreover, in one embodiment, the first coupling assembly includes a coupling base rotationally engaged with the first drive shaft, and a spring-loaded coupler configured to be received within the coupling base, with the first engagement ribs extending outwardly from an end wall of the spring-loaded coupler.

Further, in one embodiment, the coupling base defines a shaft opening configured to receive the first drive shaft.

Additionally, in one embodiment, the spring-loaded coupler defines a plurality of recesses configured to receive corresponding engagement features of the coupling base. In one embodiment, at least one of the recesses corresponds to a closed-end recess and at least one of the recesses corresponds to an open-end recess. In such an embodiment, at least one of the engagement features of the coupling base may be configured to serve as a stop for limiting the axial movement of the spring-loaded coupler relative to the coupling base.

Moreover, in one embodiment, the spring-loaded coupler includes a plurality of flanges extending outwardly from its outer perimeter, and the coupling base defines a plurality of channels configured to receive the flanges when the coupler is received within the coupling, base.

Further, in one embodiment, the coupling base includes a stop provided in association with at least one of the channels to limit axial movement of the coupler relative to the coupling base.

Additionally, in one embodiment, one or more springs are positioned between the coupling base and the spring-loaded coupler. The spring(s) is configured to bias the coupler outwardly relative to a wall of the coupling base.

In another aspect, the present subject matter is directed to a shutter assembly including a first shutter panel having a first shutter frame including a first bottom rail and a first top rail. The first shutter panel further includes a first drive shaft extending within one of the first top rail or the first bottom rail. The shutter assembly also includes a second shutter panel having a second shutter frame configured to extend adjacent to the first shutter frame at a panel-to-panel interface defined between the first and second shutter panels. The second shutter panel includes a second drive shaft extending within the second shutter frame that is axially aligned with the first drive shaft. Additionally, the shutter assembly includes a motor rotatably coupled to the first drive shaft, a first coupling assembly coupled to an end of the first drive shaft, and a second coupling assembly coupled to an end of the second drive shaft. The first and second coupling assemblies are configured to engage each other at the panel-to-panel interface such that rotational motion of the first drive shaft is transferred to the second drive shaft across the panel-to-panel interface.

In one embodiment, the first coupling member includes a plurality of first engagement ribs extending axially towards the second coupling member at the panel-to-panel interface. Additionally, the second coupling member includes a plurality of second engagement ribs extending axially towards the first coupling member at the panel-to-panel interface. The first engagement ribs are configured to rotationally engage the second engagement ribs to allow rotational motion to be transferred from the first drive shaft to the second drive shaft.

In yet another aspect, the present subject matter is directed to a shutter assembly including a shutter frame, a plurality of louvers supported by the shutter frame, and a louver drive assembly positioned within the shutter frame, with the louver drive assembly being coupled to at least one driven louver of the plurality of louvers. The shutter assembly also includes a motor positioned relative to the shutter frame, with the motor being configured to drive a drive shaft extending lengthwise within the shutter frame. Additionally, the shutter assembly includes a clutch assembly coupled between the drive shaft and the louver drive assembly. The clutch assembly includes an input clutch portion, an output clutch portion, and a coupling provided between the input and output clutch portion. A first portion of the coupling is configured to be selectively engaged with the input clutch portion and a second portion of the coupling is configured to be selectively engaged with the output clutch portion. Moreover, when a torque transmitted through the clutch assembly exceeds a torque threshold, one of the first portion or the second portion of the rotational coupling is configured to disengage from a respective clutch portion of the input and output clutch portions to decouple the input clutch portion from the output clutch portion.

In one embodiment, the input clutch portion corresponds to a first clutch drive member coupled to the drive shaft, and the output clutch portion corresponds to a second clutch drive member coupled to the louver drive assembly. Additionally, in one embodiment, the first portion corresponds to a first coiled spring section of the rotational coupling, and the second portion corresponds to a second coiled spring section of the rotational coupling.

In a further aspect, the present subject matter is directed to a shutter assembly including a shutter frame, a plurality of louvers supported by the shutter frame, and a louver drive assembly positioned within the shutter frame, with the louver drive assembly being coupled to at least one driven louver of the plurality of louvers. The shutter assembly also includes a motor positioned within the shutter frame, with the motor being configured to drive a drive shaft extending lengthwise within the shutter frame. Additionally, the shutter assembly includes a clutch assembly coupled between the drive shaft and the louver drive assembly. The clutch assembly includes an input clutch member, an output clutch member, and a coupling provided between the input and output clutch members. A first portion of the coupling is configured to be selectively engaged with the input clutch member and a second portion of the coupling is configured to be selectively engaged with the output clutch member. When a torque transmitted through the clutch assembly exceeds a torque threshold, the first portion of the rotational coupling is configured to disengage from the input member when a rotational direction of the torque is in a first direction, and the second portion of the rotational coupling is configured to disengage from the output member when the rotational direction of the torque is in a second direction opposite the first direction.

In one embodiment, the input clutch portion corresponds to a first clutch drive member coupled to the drive shaft, and the output clutch portion corresponds to a second clutch drive member coupled to the louver drive assembly.

Additionally, in one embodiment, the first portion corresponds to a first coiled spring section of the rotational coupling and the second portion corresponds to a second coiled spring section of the rotational coupling.

It should be appreciated that various embodiments of different components, sub-assemblies, and/or systems will be described herein as being configured for use within the disclosed shutter assembly. In certain instances, specific embodiments of one or more components, sub-assemblies, and/or systems of the shutter assembly will be described in the context of other embodiments of one or more of the components, sub-assemblies, and/or systems of the shutter assembly. Such descriptions are simply provided for exemplary purposes and should not be interpreted as limiting the scope of the present subject matter. In general, the various embodiments of the components, sub-assemblies, and/or systems described herein may be used, assembled, and/or combined in any suitable manner to produce a shutter assembly having one or more of the advantageous features of the present subject matter.

It should also be appreciated that, although present subject matter is generally described herein with reference to specific embodiments, the configuration of each component described herein may be independent of the configuration of every other component described herein and the various components may generally be structured to engage and/or interact with one another in any suitable manner consistent with the disclosure provided herein.

Figure 2:
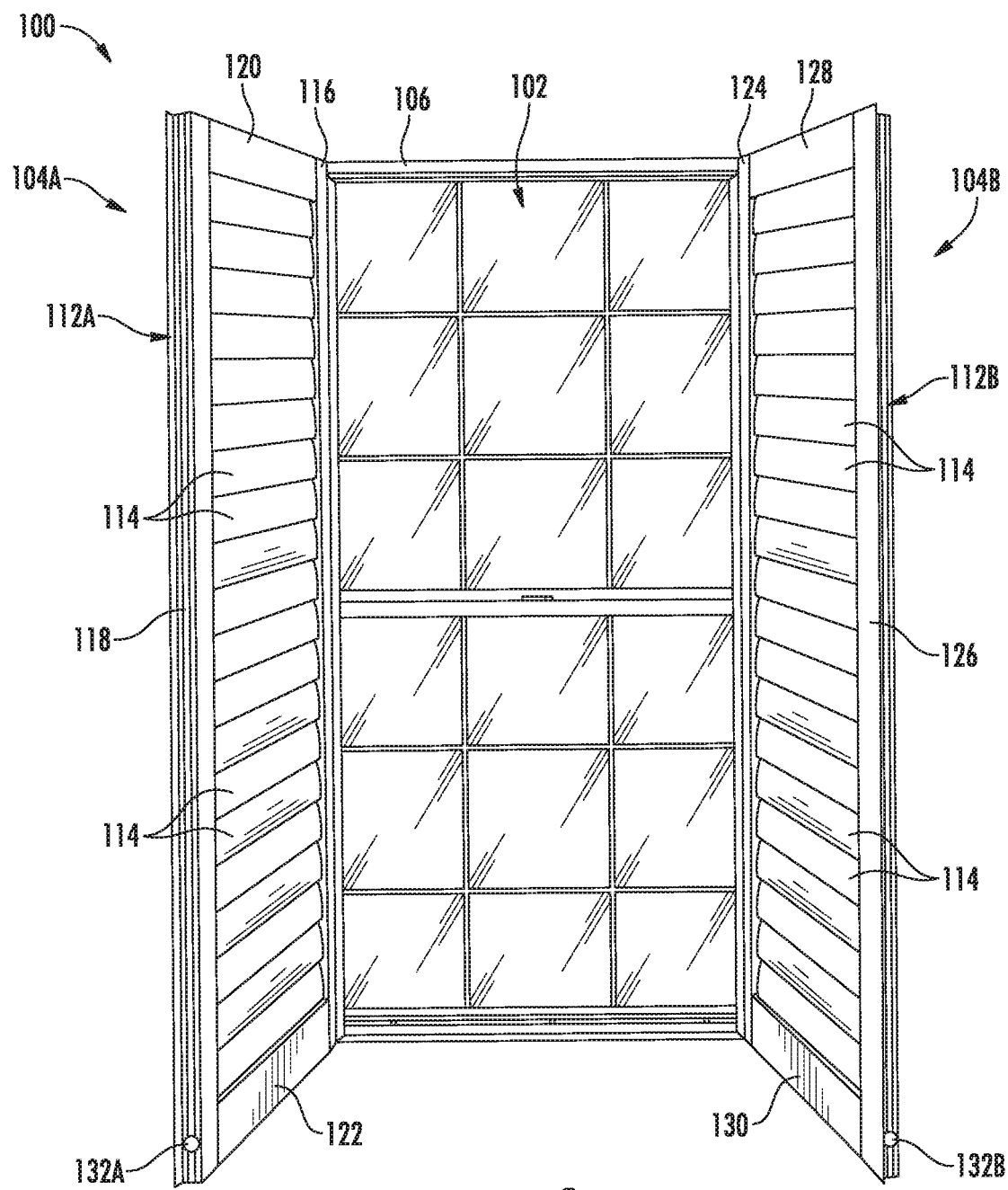
FIG. 2 illustrates a front view of the shutter assembly shown in FIG. 1, particularly illustrating the shutter panels in an open position relative to the adjacent architectural structure.
Figure 3:
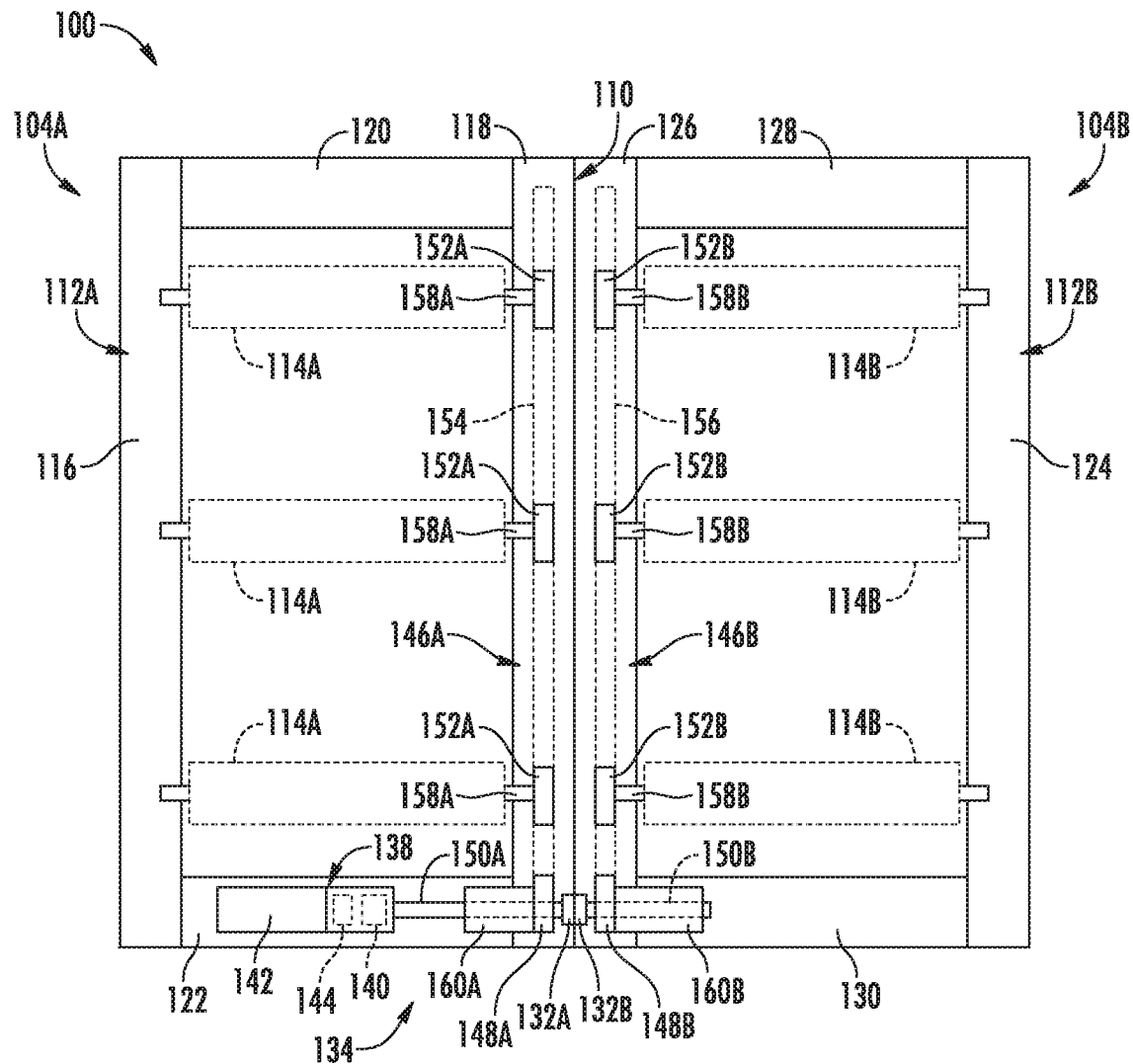
FIG. 3 illustrates a simplified front view of the shutter assembly shown in FIG. 1 with the frames of the shutter panels being shown in wireframe to allow various internal components of the shutter assembly to be viewed, particularly illustrating one illustrative embodiment of a drive system configured for use within the shutter assembly in accordance with aspects of the present subject matter.

Referring now to FIGS. 1-3, differing views of one example of an embodiment of a shutter assembly 100 configured for use as a covering for an architectural structure 102 (FIG. 2) are illustrated in accordance with aspects of the present subject matter. As shown, the shutter assembly 100 generally includes one or more shutter panels 104A, 104B configured to be coupled to an outer frame 106 (e.g., a frame defining or associated with the adjacent architectural structure 102). For instance, in the illustrated embodiment, the shutter assembly 100 includes both a first shutter panel 104A and a second shutter panel 104B coupled to outer frame 106. However, in other embodiments, the shutter assembly 100 may only include a single shutter panel installed relative to the outer frame 106 or three or more shutter panels installed relative to the outer frame 106. As shown in FIGS. 1-3, the shutter panels 104A, 104B may, in one embodiment, be pivotably coupled to the outer frame 106 (e.g., via hinges 108 (FIG. 1)) to allow the shutter panels 104A, 104B to be moved between closed (FIG. 1) and open positions (FIG. 2) relative to the adjacent architectural structure 102. For example, as particularly shown in FIG. 1, the shutter panels 104A, 104B may be moved to the closed position to cover the adjacent architectural structure 102. In such closed position, shutter panels 104A, 104B may generally be positioned in a generally planar configuration (e.g., by extending in a plane oriented substantially parallel to the adjacent architectural structure 102), with ends of shutter panels 104A, 104B extending directly adjacent to each other along the height of the panels 104A, 104B such that a vertically extending panel-to-panel interface 110 (FIGS. 1 and 3) is defined between the shutter panels 104A, 104B. Additionally, as shown in FIG. 2, the shutter panels 104A, 104B may be moved to the open position to expose the architectural structure 102. For instance, the panels 104A, 104B may be pivoted outwardly away from the architectural structure 102 so that each panel 104A, 104B has an angled orientation relative to the plane defined by at least a portion of the architectural structure 102.

In general, each shutter panel 104A, 104B includes a shutter frame 112A, 112B and a plurality of louvers 114 configured to rotate relative to the associated frame 112A, 112B. As shown in FIGS. 1-3, a first shutter frame 112A of the first shutter panel 104A may have a generally rectangular shape defined by a first frame-side stile 116, a first panel-side stile 118, and top and bottom rails 120, 122 extending horizontally between the vertically extending stiles 116, 118. Similarly, as shown in FIGS. 1-3, a second shutter frame 112B of the second shutter panel 104B may have a generally rectangular shape defined by a second frame-side stile 124, a second panel-side stile 126, and top and bottom rails 128, 130 extending horizontally between the vertically extending stiles 124, 126. As particularly shown in FIG. 1, when the shutter panels 104A, 104B are at their closed position relative to the architectural structure 102, the first panel-side stile 118 of the first shutter frame 112A may be configured to extend vertically adjacent to the second panel-side stile 126 of the second shutter frame 112B along the panel-to-panel interface 110 defined between the panels 104A, 104B.

It should be appreciated that the adjacent panel-side stiles 118, 126 of the shutter frames 112A, 112B may be configured to contact each other at the panel-to-panel interface 110, or may be spaced apart from each other such that a gap is defined between the adjacent shutter frames 112A, 112B at the panel-to-panel interface 110. Additionally, as will be described below, each shutter panel 104A, 104B may, in one embodiment, include a coupling assembly 132A, 132B (FIGS. 2 and 3) positioned at the panel-to-panel interface 110 that is configured to engage a corresponding coupling member 132A, 132B of the adjacent shutter panel 104A, 104B to allow the louvers 114 of the shutter frames 104A, 104B to be driven via a common motorized drive system 134 of shutter assembly 100.

As indicated above, each shutter panel 104A, 104B also includes a plurality of louvers 114 configured to be rotated relative to its associated shutter frame 112A, 112B. For example, as shown in the illustrated embodiment, the first shutter panel 104A includes a plurality of louvers 114 extending horizontally between the vertical stiles 116, 118 of the first shutter frame 112A. Similarly, the second shutter panel 104B includes a plurality of louvers 114 extending horizontally between the vertical stiles 124, 126 of the second shutter frame 112B.

As is generally understood, each louver 114 may be configured to rotate about its longitudinal axis relative to the adjacent shutter frame 112A, 112B approximately 180 degrees to vary the degree to which the architectural structure 102 may be viewed through the shutter panels 104A, 104B when the panels 104A, 104B are at their closed positions. For instance, the louvers 114 may be rotated to a substantially horizontal orientation (e.g., a fully open position as shown in FIG. 1) to allow maximum exposure to the architectural structure 102 through shutter panels 104A, 104B. Similarly, the louvers 114 may be rotated approximately 90 degrees in one direction or the other from the substantially horizontal orientation to a substantially vertical orientation (e.g., a fully closed position as shown in FIG. 2) to block the view through the shutter panels 104A, 104B. For instance, when at their substantially vertical orientation, adjacent louvers 114 may vertically overlap each other at their top and bottom ends to fully block the view through the shutter panels 104A, 104B.

In several embodiments, one or more groups or sections of the various louvers 114 may be coupled together in a manner that allows the louvers 114 to rotate simultaneously or otherwise in unison with one another. For example, as shown in FIG. 1, each shutter panel 104A, 104B includes a tie bar 136 that is configured to couple all of the louvers 114 included within such panel 104A, 104B to one another. As such, by moving the tie bar 136 for a given shutter panel up or down, all of the louvers 114 within such panel may be rotated about their respective longitudinal axes. Similarly, due to the connection provided by each tie bar 136, rotation of one of the louvers 114 within a given shutter panel may result in corresponding rotation of the remainder of the louvers 114 included within such panel. For example, when one of the louvers 114 of the second shutter panel 104B is rotated about its axis, the associated tie bar 136 may result in the remainder of the louvers 114 within the second shutter panel 104B being rotated about their longitudinal axes.

In several embodiments, one or more of the louvers 114 of each shutter panel 104A, 104B corresponds to a driven louver 114A, 114B (e.g., a louver that is being directly driven by a component of the drive system 134), with the remainder of the louvers 114 in such panel corresponding to non-driven louvers (e.g., a louver that is being indirectly driven via its connection to a driven louver). For instance, as shown in FIG. 3, the first shutter panel 104A includes three driven louvers 114A while the second shutter panel 104B similarly includes three driven louvers 114B. However, in other embodiments, each shutter panel 104A, 104B may include fewer than three driven louvers or greater than the three driven louvers. As will be described in greater detail below, each driven louver 114A, 114B may be coupled to a motor of the drive system 134 to allow such louver to be driven about its longitudinal axis. As a result, by rotating a given driven louver 114A, 114B, the remainder of the louvers 114 in the corresponding shutter panel 104A, 104B may be rotated about their longitudinal axes.

It should be appreciated that the tie bars 136 of the shutter assembly 100 may generally be configured to be positioned at any suitable location relative to the louvers 114. For instance, in the illustrated embodiment, the tie bars 136 are positioned at the ends of the louvers 114 located adjacent to the frame-side stiles 116, 124 along the front side of the shutter panels 104A, 104B (i.e., the side facing away from the architectural structure 102). However, in other embodiments, the tie bars 136 may be positioned at any other suitable location along the front side of the shutter panels 104A, 104B, such as by positioning the tie bars 136 at a central location along the louvers 114 or by positioning the tie bars 136 at the ends of the louvers 114 located adjacent to the panel-side stiles 118, 126. Similarly, in another embodiment, the tie bars 136 may be positioned along the rear side of the shutter panels 104A, 104B (i.e., the side facing towards the architectural structure 102). It should also be appreciated that, in alternative embodiments, the louvers 114 contained within each shutter panel 104A, 104B may be coupled to one another using any other suitable means that allows for each section of louvers 114 to rotate in unison (e.g., an internal coupling obviating the need for an external coupling, such as the tie bars 136).

As indicated above, in several embodiments, the disclosed shutter assembly 100 also includes a motorized drive system 134 for driving the driven louver(s) 114A, 114B, of each shutter panel 104A, 104B. Specifically, as shown in FIG. 3, the drive system 134 includes a motor assembly 138 having a single electric motor 140 configured to be coupled to each driven louver 114A, 114B. For example, as particularly shown in FIG. 3, the motor 140 is, in one embodiment, positioned within the bottom rail 122, 130 of one of the shutter panels 104A, 104B, such as the bottom rail 122 of the first shutter panel 104A. However, in other embodiments, the motor 140 may be positioned at any other suitable location within the shutter assembly 100, such as within the top rail 120, 128 of one of the shutter panels 104A, 104B.

It should be appreciated that the motor 140 may generally be powered via any suitable power source. For example, in one embodiment, one or more batteries may be installed within the shutter assembly 100 to supply power to the motor 140, such as by installing a battery pack 142 within the bottom rail 122 of the first shutter frame 112A at a location adjacent to the motor assembly 138. Alternatively, the motor 140 may be configured to receive power from any other suitable power source, such as by hardwiring the motor 140 to an external power source (e.g., a 120 volt electrical circuit).

It should also be appreciated that the operation of the motor 140 may, in several embodiments, be controlled automatically via a suitable controller or other electronic circuit. For instance, as shown in FIG. 3, the motor assembly 138 also includes a motor controller 144 communicatively coupled to the motor 140. In one embodiment, the motor controller 140 may incorporate or may otherwise be associated with a communications module for wirelessly receiving motor control signals. In such an embodiment, the operation of the motor 140 may be remotely controlled via a separate control device (e.g., a remote control device, such as an RF-based or IR-based remote control device) configured to communicate with the motor controller 140 via the communications module.

Additionally, in several embodiments the motor 140 may be coupled to each driven louver 114A, 114B via a louver drive assembly 146A, 146B installed within each shutter frame 112A, 112B. Specifically, as shown in FIG. 3, a first louver drive assembly 146A is installed within the one of the stiles 116, 118 of the first shutter panel 104A, such as the first panel-side stile 118, for transferring rotational motion from the motor 140 to the driven louvers 114A of the first shutter panel 104A. In one embodiment, the first louver drive assembly 146A may correspond to a rack and gear-type drive arrangement. For instance, as shown in FIG. 3, the first louver drive assembly 146A includes a first drive rack assembly 148A coupled to a first drive shaft 150A driven by the motor 140, and a first pair of drive bars 154 extending lengthwise along the height of the corresponding stile 118. Additionally, in one embodiment, the first louver drive assembly 146A includes a first driven rack assembly 152A coupled to the drive bars 154 at the location of each driven louver 114A of the first shutter panel 104A. Each driven rack assembly 152A may, in turn, be coupled to the associated driven louver 114A. For instance, as shown in FIG. 3, each driven rack assembly 152A may be coupled to a louver peg or post 1584 extending outwardly from the adjacent end (or endcap) of the driven louver 114A.

Moreover, in several embodiments, a second louver drive assembly 146B is installed within the one of the stiles 124, 126 of the second shutter panel 104B, such as the second panel-side stile 126, for transferring rotational motion from the motor 140 to the driven louvers 114B of the second shutter panel 104B. Similar to the first louver drive assembly 146A, the second louver drive assembly 146B may, in one embodiment, correspond to a rack and gear-type drive arrangement. For instance, as shown in the illustrated embodiment, the second louver drive assembly 146B includes a second drive rack assembly 148B, a second pair of drive bars 156 extending lengthwise along the height of the corresponding stile 126, and a separate second driven rack assembly 152B coupled to the drive bars 156 at the location of each driven louver 114B of the second shutter panel 104B, with each second driven rack assembly 152B being, in turn, coupled to the associated driven louver 114B. For instance, as shown in FIG. 3, each driven rack assembly 152B may be coupled to a louver peg or post 158B extending outwardly from the adjacent end (or endcap) of the driven louver 114B. It should be appreciated that each driven louver 114A, 114B is associated with a corresponding driven assembly (e.g., rack assembly 152A, 152B). For example, in the illustrated embodiment, each shutter panel 104A, 104B includes three driven louvers 114A, 114B, and, thus, each louver drive assembly 146A, 146B similarly includes three driven rack assemblies 152A, 152B. However, in other embodiments, the disclosed shutter assembly 100 may include any suitable number of driven louvers 114A, 114B and associated driven rack assemblies 152A, 152B.

In accordance with one embodiment of the present subject matter, the second drive rack assembly 148A may be configured to be driven by a second drive shaft 150B coupled to the first drive shaft 150A via a pair of coupling assemblies 132A, 132B installed at the panel-to-panel interface 110 defined between the shutter panels 104A, 104B. Specifically, as shown in FIG. 3, the first drive shaft 150A may be coupled to a first coupling assembly 132A installed within the first panel-side stile 118 of the first shutter panel 104A at the panel-to-panel interface 110 and the second drive shaft 150B may be coupled to a second coupling assembly 132B installed within the second panel-side stile 126 of the second shutter panel 104B at the panel-to-panel interface 110, with the coupling assemblies 132A, 132B being engageable with each other at the interface 110 to allow rotational motion of the first drive shaft 150A to be transferred to the second drive shaft 150B.

Thus, in the illustrated embodiment, by driving the first drive rack assembly 148A via rotation of the first drive shaft 150A, the first drive rack assembly 148A may cause the first pair of drive bars 154 to translate relative to each other along the height of the first panel-side stile 118. Such relative translation of the drive bars 154 may, in turn, drive each first driven rack assembly 152A, thereby causing rotation of the corresponding driven louvers 114A via the associated louver posts 158A. Additionally, simultaneous with driving the first drive rack assembly 148A, rotational motion from the first drive shaft 150A may be transferred to the second drive shaft 150B via the engagement of the coupling assemblies 132A, 132B to drive the second drive rack assembly 148B and, thus, cause the associated drive bars 156 to be translated relative to each other. The translation of the drive bars 156 may, in turn, drive each second driven rack assembly 152B, thereby causing rotation of the corresponding driven louvers 114B via the associated louver posts 158B. Various aspects of one or more illustrative embodiments of a rack assembly 148, 152 suitable for use within the disclosed shutter assembly 100 will be described in greater detail below with reference to FIGS. 4-9. Similarly, various aspects of one or more illustrative embodiments of a coupling assembly 132 suitable for use within the disclosed shutter assembly 100 will be described in greater detail below with reference to FIGS. 22-29.

It should be appreciated that, in other embodiments, the louver drive assemblies 146A, 146B may include any other suitable drive arrangement for transferring the rotational motion or torque from the motor 140 to the driven louvers 114A, 114B of each shutter panel 104A, 104B. For instance, in one embodiment, the rack assemblies 148A, 148B, 152A, 152B may be replaced by gearboxes and a secondary drive shaft may be installed along the length of each corresponding stile 118, 126 that extends through the associated gearboxes. In such an embodiment, rotation of the first and second drive shafts 150A, 150B may be transferred from the gearbox coupled directly to each drive shaft 150A, 150B (e.g., the gearboxes replacing the drive rack assemblies 148A, 148B) to the secondary shaft to drive the other gearboxes (e.g., the gearboxes replacing the driven rack assemblies 152A, 152B), which, in turn, may drive the driven louvers 114A, 114B.

Additionally, in several embodiments, the drive system 134 also includes one or more clutch assemblies associated with each shutter panel 104A, 104B to permit the louvers 114 within each panel 104A, 104B to be disengaged or decoupled from the motor 156, thereby allowing for adjustment of the rotational orientation of the louvers 114 manually (e.g., adjustment without the use of a motor or other mechanized device, such as when the user simply grasps a louver 114 to adjust its position). Specifically, as shown in FIG. 3, in one embodiment, the disclosed shutter assembly 100 includes a first clutch assembly 160A positioned within the bottom rail 122 of the first shutter panel 104A and a second clutch assembly 160B positioned within the bottom rail 130 of the second shutter panel 104B. However, in alternative embodiments, the clutch assemblies 160A, 160B may be positioned at any other suitable location within each respective shutter frame 112A, 112B, such as within each panel-side stile 118, 126. As will be described in greater detail below, the first clutch assembly 104A may be operatively coupled between the first drive shaft 150A and the first drive rack assembly 148A to allow the first louver drive assembly 146A to be disengaged or decoupled from the first drive shaft 150A. Similarly, the second clutch assembly 160B may be operatively coupled between the second drive shaft 150B and the second drive rack assembly 148B to allow the second louver drive assembly 146B to be disengaged or decoupled from the second drive shaft 150B.

By including the clutch assemblies 160A, 160B within the disclosed shutter assembly 100, a user of the shutter assembly 100 may manually override the drive system 134 to allow for manual adjustment of the position of the louvers 114. For instance, in the illustrated embodiment, a user may grasp one of the louvers 114 of the first shutter panel 104A (e.g., one of the driven louvers 114A or any of the non-driven louvers 114) or may grasp the associated tie bar 136 to adjust the orientation of all of the louvers 114 within such shutter panel 104A manually. As the user begins to rotate the louvers 114 manually, the first clutch assembly 160A may allow the first louver drive assembly 146A to be disengaged from the first drive shaft 150A, thereby permitting the louvers 114 of the first shutter panel 104A to be rotated freely independent of the motor 140 as well as the louvers 114 associated with the second shutter panel 104B. Similarly, with manual rotation of the louvers 114 associated with the second shutter panel 104B, the second clutch assembly 160B may function similarly to decouple the second louver drive assembly 146A from the second drive shaft 150B, thereby allowing the louvers 114 of the second shutter panel 104B to be rotated freely independent of the motor 140 as well as the louvers 114 associated with the first shutter panel 104A.

Figure 4:
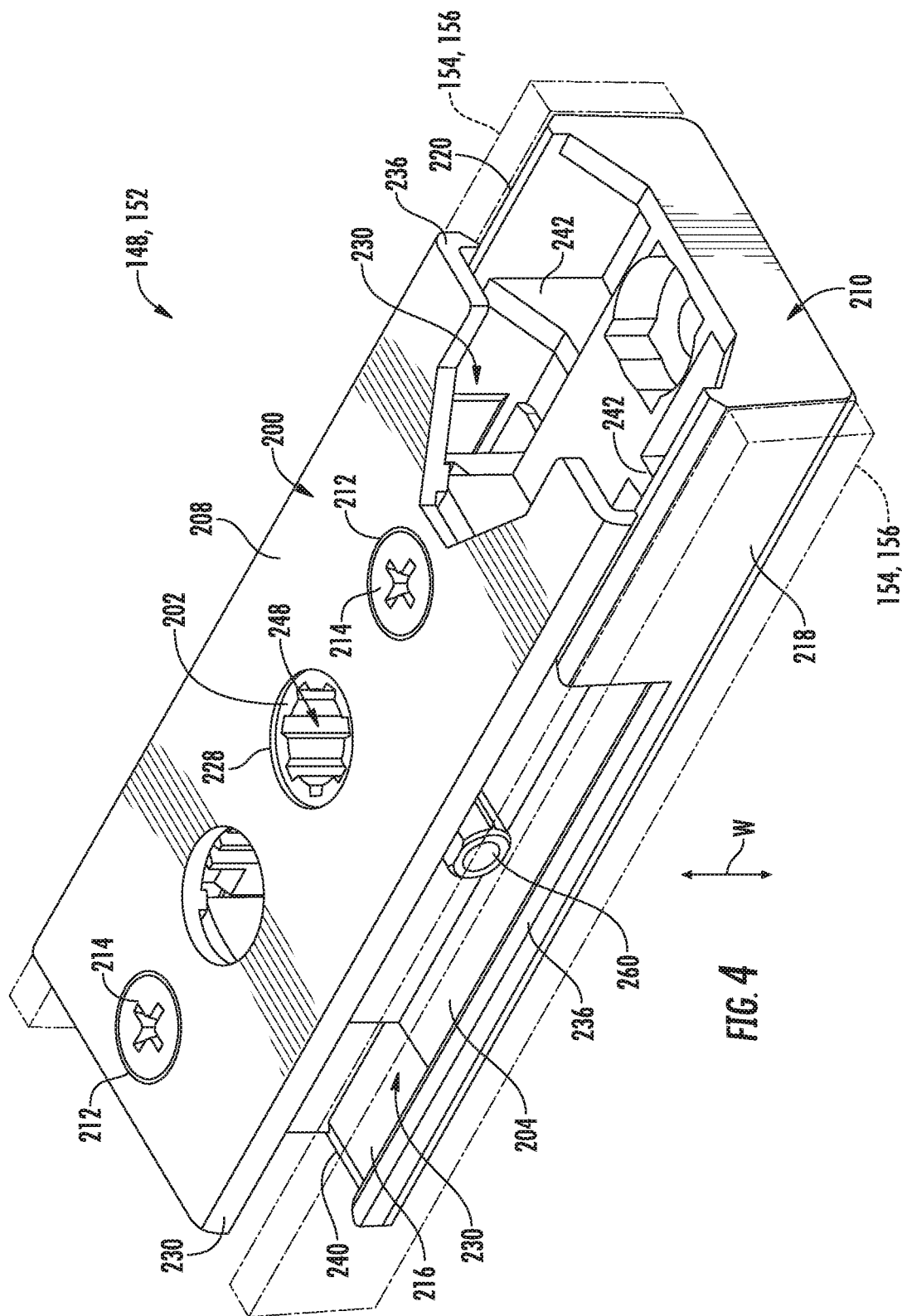
FIG. 4 illustrates a perspective, assembled view of one illustrative embodiment of a rack assembly suitable for use within the disclosed shutter assembly in accordance with aspects of the present subject matter.
Figure 5:
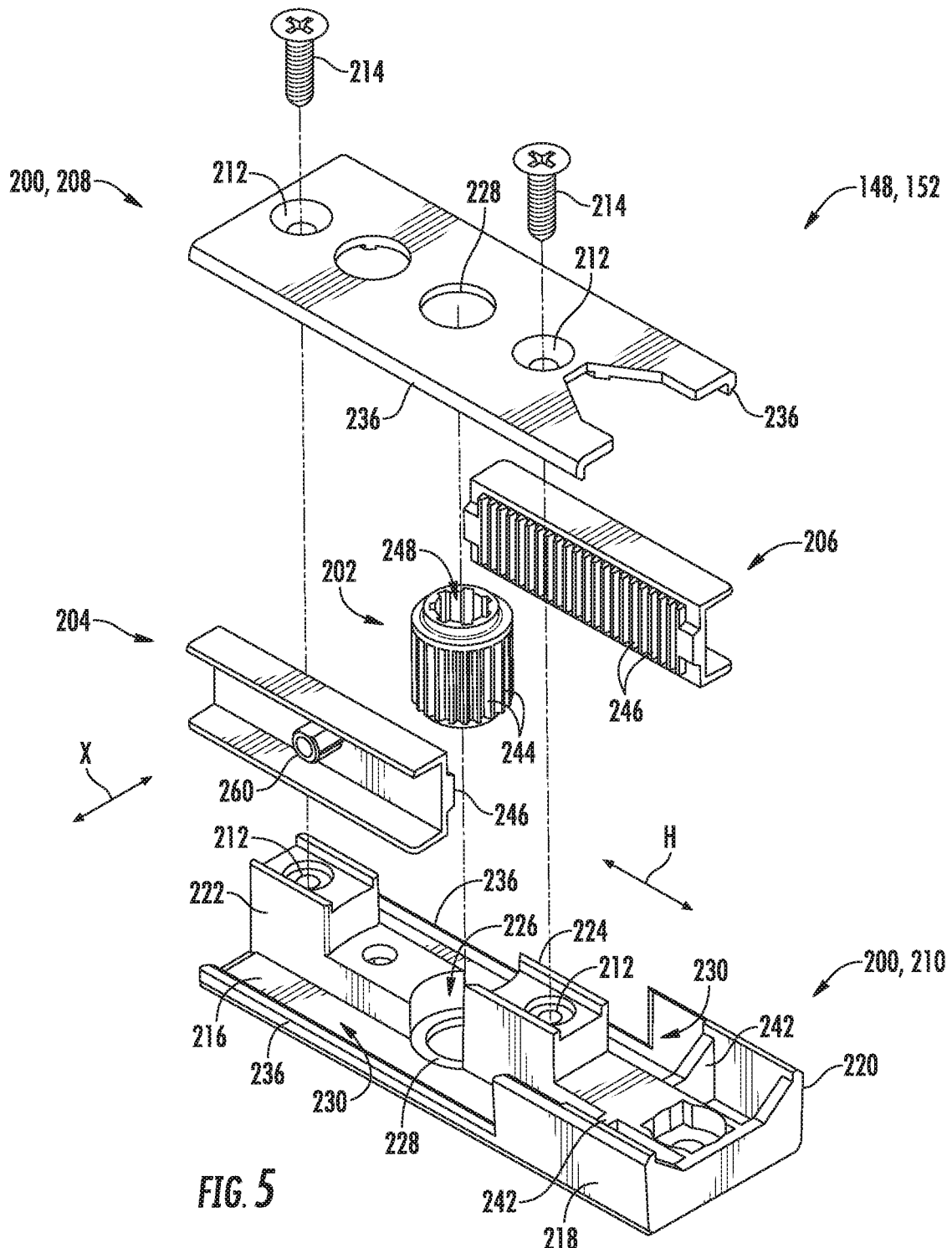
FIG. 5 illustrates a perspective, exploded view of the rack assembly shown in FIG. 4.

Referring now to FIGS. 4 and 5, respective assembled and exploded views of one illustrative embodiment of a rack assembly 148, 152 suitable for use within the disclosed shutter assembly 100 are illustrated in accordance with aspects of the present subject matter. It should be appreciated that the rack assembly 148, 152 may, in one embodiment, illustrate aspects of one or more of the rack assemblies described above with reference to FIG. 3, such as one of the drive rack assemblies 148A, 148B and/or one of the driven rack assemblies 152A, 152B.

As indicated above, the disclosed rack assemblies may generally be configured to permit rotational motion to be converted to linear translation of the associated drive bars 154, 156 (e.g., in the case of the drive rack assemblies 148A, 148B when being driven by the motor 140 or in the case of the driven rack assemblies 152A, 152B when the user is manually adjusting the position of the louvers 114) or to permit linear translation of the associated drive bars 154, 156 to be converted to rotational motion (e.g., in the case of the driven rack assemblies 152A, 152B when being driven by the motor 140 or in the case of the drive rack assemblies 148A, 148B when the user is manually adjusting the position of the louvers 114). Thus, in general, it should be appreciated that the disclosed rack assemblies may have any suitable configuration that allows such components to function as described above.

As shown in FIGS. 4 and 5, in one embodiment, the rack assembly 148, 152 includes a housing 200, a rack gear 202 configured to be rotationally supported within the housing 200, and first and second geared racks 204, 206 configured to mesh with the rack gear 202. In general, the housing 200 may be configured to at least partially encase and/or support the rack gear 202 and/or the associated gear racks 204, 206. Specifically, as shown in the illustrated embodiment, the housing 200 includes both a first housing component 208 and a second housing component 210, with the first housing component 208 configured to be coupled to the second housing component 210. For instance, as shown in FIG. 5, each housing component 208, 210 may define one or more fastener openings 212 configured to receive suitable fasteners 214. Thus, when the housing components 208, 210 are positioned relative to each other such that the fastener openings 212 of the first housing component 208 are aligned with the fastener openings 212 of the second component 210, the fasteners 214 may be inserted through the aligned openings 212 to couple the housing components 208, 210 to each other. Alternatively, the housing components 208, 210 may be coupled to each other using any other suitable attachment means, such as by using ultrasonic welding or by creating a snap-fit between the housing components 208, 210.

As shown in FIG. 5, in one embodiment, the second housing component 210 includes a base wall 216 and first and second sidewalls 218, 220 extending outwardly from the base wall 216. Additionally, as shown in FIG. 5, the second housing component 210 includes first and second raised projections 222, 224 extending outwardly from the base wall 216 within a central portion of the second housing component 210. In one embodiment, the first housing component 208 may be configured to be engaged against and/or supported by the top(s) of one or both of the projections 222, 224 and/or the top(s) of one or both of the sidewalls 218, 220 to set the desired spacing between the first housing component 208 and the base wall 216 of the second housing component 210. Moreover, as shown in FIG. 5, a semi-circular or curved gear channel 226 is defined between the first and second projections 222, 224 for receiving the rack gear 202. In such an embodiment, corresponding openings 228 may be defined through both the first housing component 208 and the base wall 216 of the second housing component 210 that are aligned with the gear channel 226 for receiving one or more component(s) of the disclosed drive system 134 (FIG. 3).

Additionally, in one embodiment, a translation channel 230 is defined along both sides of the housing 200 for receiving the geared racks 204, 206. Specifically, each translation channel 230 may be configured to extend in a widthwise direction (indicated by arrow W in FIG. 4) between the base wall 216 of the second housing component 210 and the first housing component 208 and in a cross-wise direction (indicated by arrow X in FIG. 5) between the raised projections 222, 224 and corresponding channel lips 236 defined along each outer side of the first and second housing components 208, 210. Moreover, as shown in FIG. 5, each translation channel 230 may be configured to extend in a heightwise direction (indicated by arrow H in FIG. 5) between an open end 240 (FIG. 4) of the housing 200 and a structural support member 242 extending inwardly from each of the sidewalls 218, 220 of the second housing component 210. In such an embodiment, each geared rack 204, 206 may be configured to be translated relative to the housing 200 (e.g., via rotation of the rack gear 202) between the open end 240 of the housing 200 and the support member 242.

As particularly shown in FIG. 5, the rack gear 202 of the rack assembly 148, 152 includes outer gear teeth 244 configured to mesh with or otherwise engage corresponding rack teeth 246 provided on each geared rack 204, 206. Thus, when the gear 202 and racks 204, 206 are installed within the housing 200 such that the outer gear teeth 244 mesh with the rack teeth 246, rotation of the rack gear 202 relative to the housing 200 may result in the geared racks 204, 206 being linearly translated relative to the housing 200 in opposite directions along each associated translation channel 230 in the heightwise direction H. In such instance, the rack gear 202 may be rotated in a given direction until the end(s) of the geared racks 204, 206 reaches the gear 202 (or until the louvers 114 contact one another in the closed position). Similarly, the rack gear 202 may be rotated in the opposite direction until the opposed end(s) of the geared racks 204, 206 reaches the gear 202 (or until the louvers 114 contact one another in the closed position).

Additionally, as shown in FIG. 5, a gear opening 248 is defined through the rack gear 202 for receiving one or more components of the disclosed drive system 134. For instance, when the rack assembly 148, 152 corresponds to one of the drive rack assemblies 148A, 148B, the gear opening 248 may be configured to receive a portion of the associated clutch assembly 160A, 160B, thereby providing a mechanical connection between the rack assembly 148A, 148B and the clutch assembly 160A, 160B. In such an embodiment, the gear opening 248 may be keyed or shaped in any suitable manner that allows the rack gear 202 to engage the corresponding portion of the clutch assembly 160A, 160B. Specifically, as shown in FIG. 5, the gear opening 248 may, in one embodiment, correspond to a splined opening. In such an embodiment, the gear opening 248 may be configured to receive a corresponding splined drive portion 360 of a second clutch drive member 318 (FIG. 14) of the associated clutch assembly 160A, 160B. Alternatively, when the rack assembly 148, 152 corresponds to one of the driven rack assemblies 152A, 152B, the gear opening 248 may be configured to receive a portion of one of the louver drive posts 158A, 158B (or a separate shaft coupling coupled to the associated louver drive posts 158A, 158B), thereby providing a mechanical connection between the rack assembly 152A, 152B and the associated driven louver 114A, 114B. In such an embodiment, the gear opening 248 may be keyed or shaped in any suitable manner that allows the rack gear 202 to engage the corresponding portion of the louver drive post 158A, 158B (or coupling). For instance, if the louver drive post 158A, 158B defines one or more keyways (e.g., two opposed v-shaped keyways), the gear opening 248 may be configured as a corresponding keyed opening (e.g., gear opening 248' shown in FIG. 31) to allow the rack gear 202 to be coupled to the louver drive post 158A, 158B.

Moreover, in several embodiments, each geared rack 204, 206 may be configured to be coupled to one of the drive bars 154, 156 of the associated louver drive assembly 146A 146B (FIG. 3) to allow the racks 204, 206 and corresponding drive bars 154, 156 to be translated together relative to the housing 200. For instance, as shown in phantom lines in FIG. 4, the drive bars 154, 156 are configured to be installed along opposed sides of the housing 200. In such an embodiment, each geared rack 204, 206 may be configured to be coupled to the adjacent drive bar 154, 156 via any suitable means. For example, as shown in FIGS. 4 and 5, each geared rack 204, 206 includes a boss or projection 260 extending outwardly. In such an embodiment, when the associated drive bar 154, 156 and the housing 200 are placed side-by-side, the projection 260 may be inserted into (e.g., via a press-fit) a corresponding opening (not shown) defined in the drive bar 154, 156 to couple the drive bar 154, 156 to the geared rack 204, 206.

By coupling the drive bars 154, 156 to the geared racks 204, 206, linear motion may be transmitted from the gear racks 204, 206 to the drive bars 154, 156 or vice versa, depending on the mode of operation of the shutter assembly 100. Specifically, when the shutter assembly 100 is being driven by the motor 140, the rack gear 202 of each drive rack assembly 148A, 148B may be rotated to translate the gear racks 204, 206 of each drive rack assembly 148A, 148B and, thus, the drive bars 154, 156 coupled to such geared racks 204, 206. The translation of the drive bars 154, 156 may then drive the geared racks 204, 206 of each driven rack assembly 152A, 152B, which, in turn, rotates the rack gear 202 of each driven rack assembly 152A, 152B to drive the associated louver drive posts 158A, 158B. Similarly, when the shutter assembly 100 is being manually operated, the rack gear 202 of each driven rack assembly 152A, 152B may be rotated to translate the geared racks 204, 206 of each driven rack assembly 152A, 152B and, thus, the drive bars 154, 156 coupled to such geared racks 204, 206. The linear translation of the drive bars 154, 156 may then linearly drive the geared racks 204, 206 of each drive rack assembly 148A, 148B, which, in turn, results in rotation of the rack gear 202 of each drive rack assembly 148A, 148B.

It should be appreciated that, in some embodiments, the configuration of the drive rack assemblies 148A, 148B may be the same as the configuration of the driven rack assemblies 152A, 152B. For instance, in one embodiment, both the drive rack assemblies 148A, 148B and the driven rack assemblies 152A, 152B may be configured in the manner shown in FIGS. 4 and 5. Alternatively, the configuration of the drive rack assemblies 148A, 148B may differ from the configuration of the driven rack assemblies 152A, 152B. For instance, in one embodiment, the rack assembly 148, 152 shown in FIGS. 4 and 5 may correspond to the specific configuration for the drive rack assemblies 148A, 148B while the driven rack assemblies 152A, 152B may be configured differently. For example, given their positioning, it may be desirable for the driven rack assemblies 152A, 152B to have a more compact design that provides for improved assembly of the disclosed shutter assembly 100.

Figure 6:
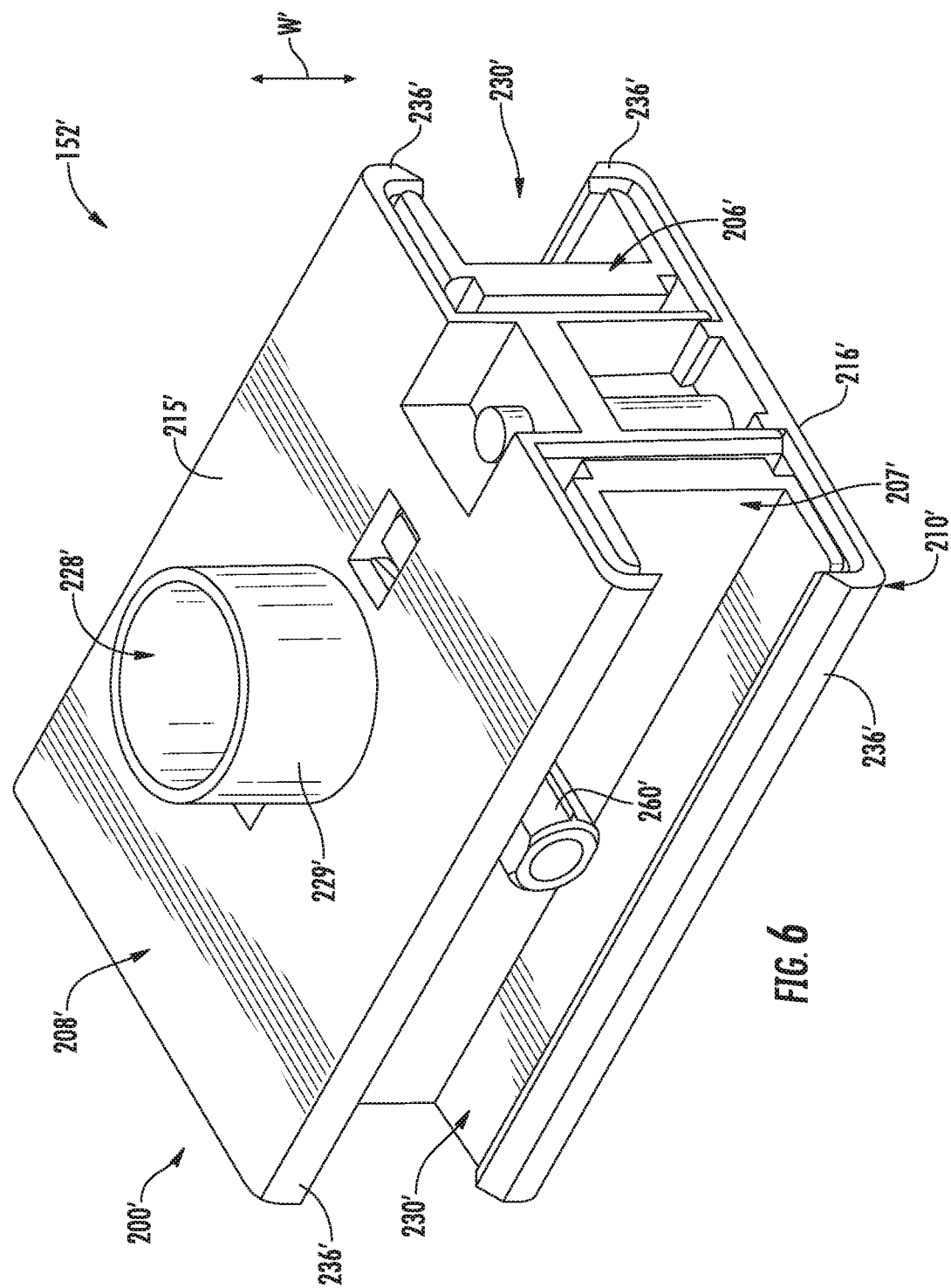
FIG. 6 illustrates a perspective, assembled view of another illustrative embodiment of a rack assembly suitable for use within the disclosed shutter assembly in accordance with aspects of the present subject matter.
Figure 7:
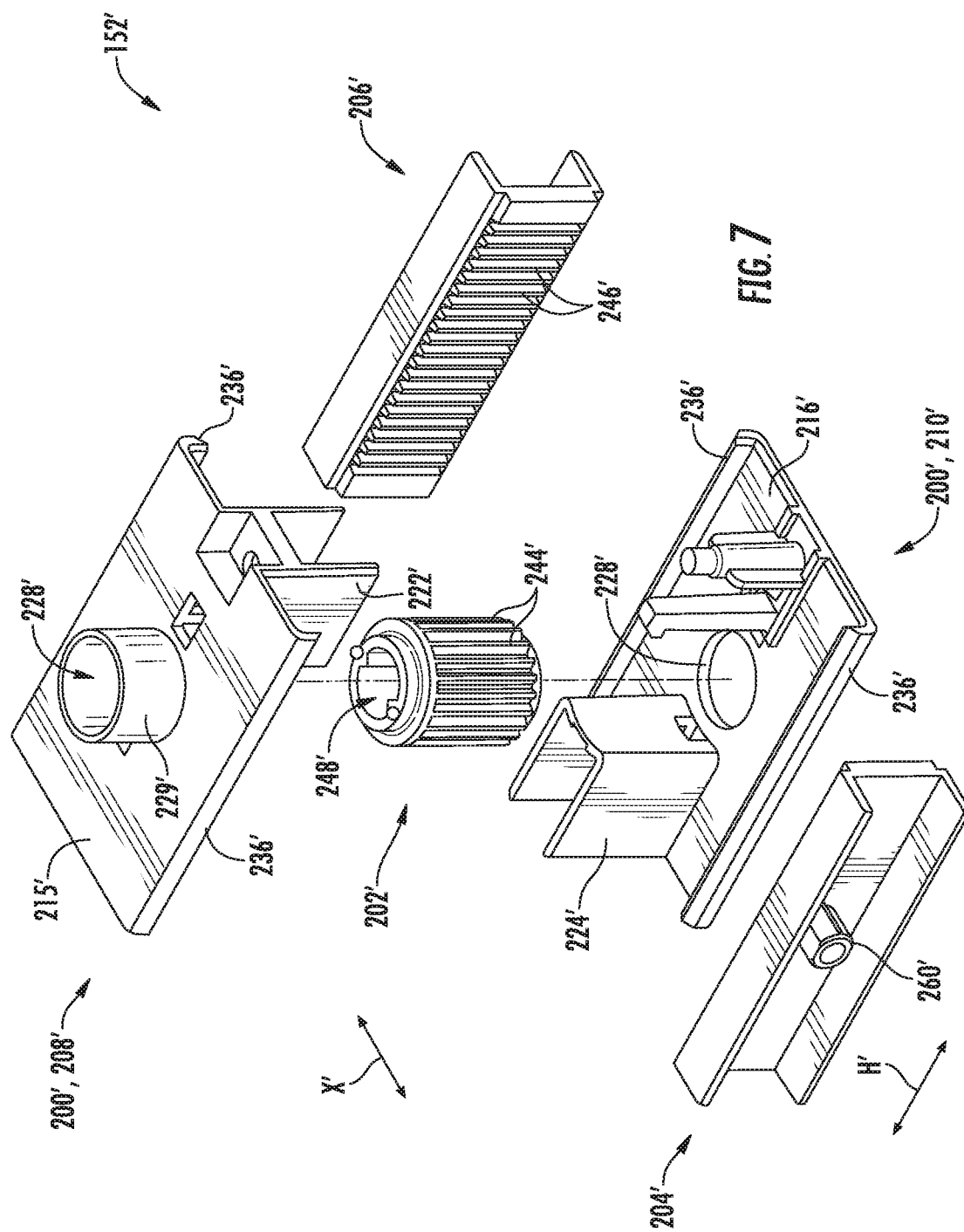
FIG. 7 illustrates a perspective, exploded view of the rack assembly shown in FIG. 6.
Figure 8:
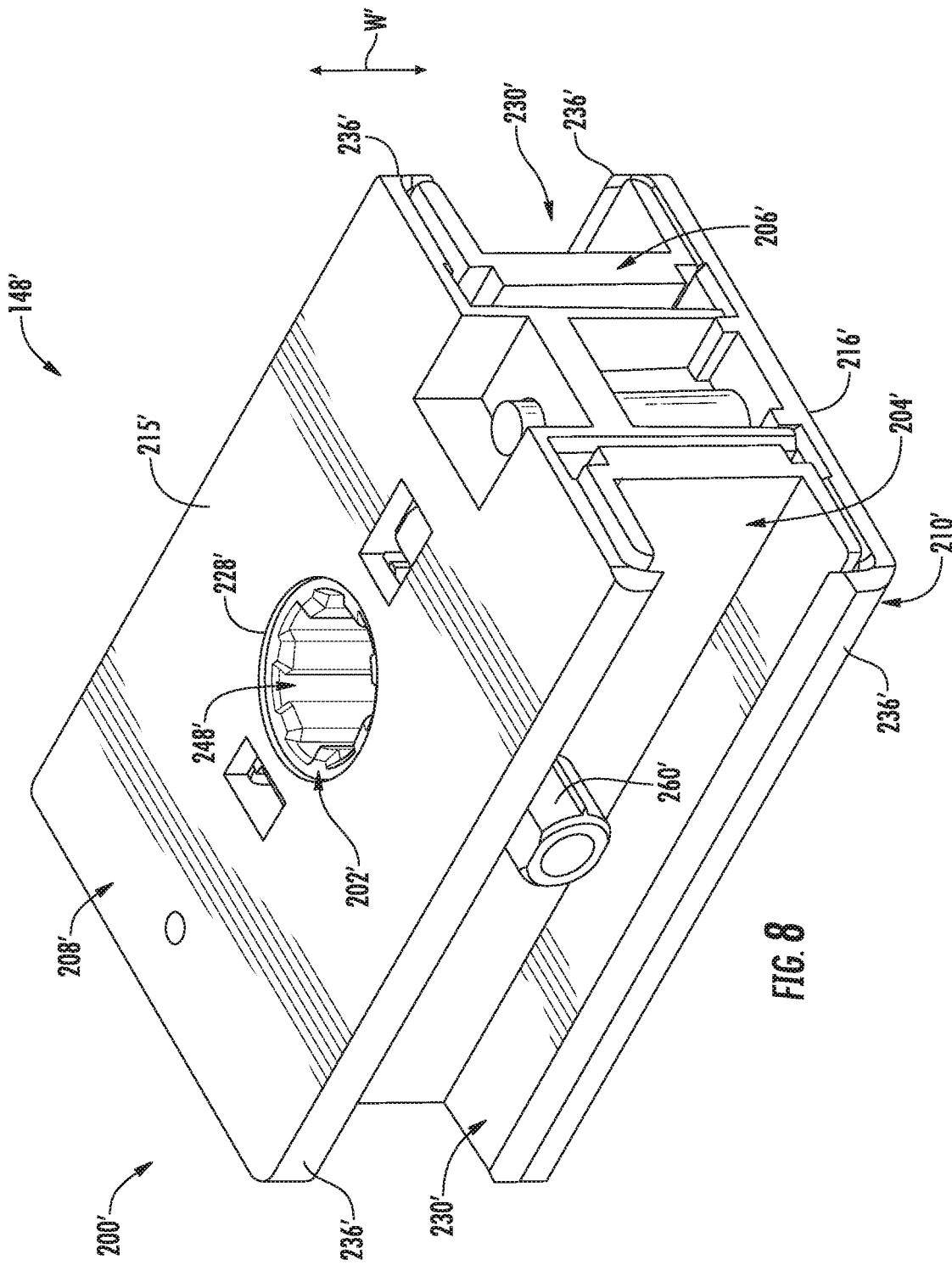
FIG. 8 illustrates a perspective, assembled view of a further illustrative embodiment of a rack assembly suitable for use within the disclosed shutter assembly in accordance with aspects of the present subject matter.
Figure 9:
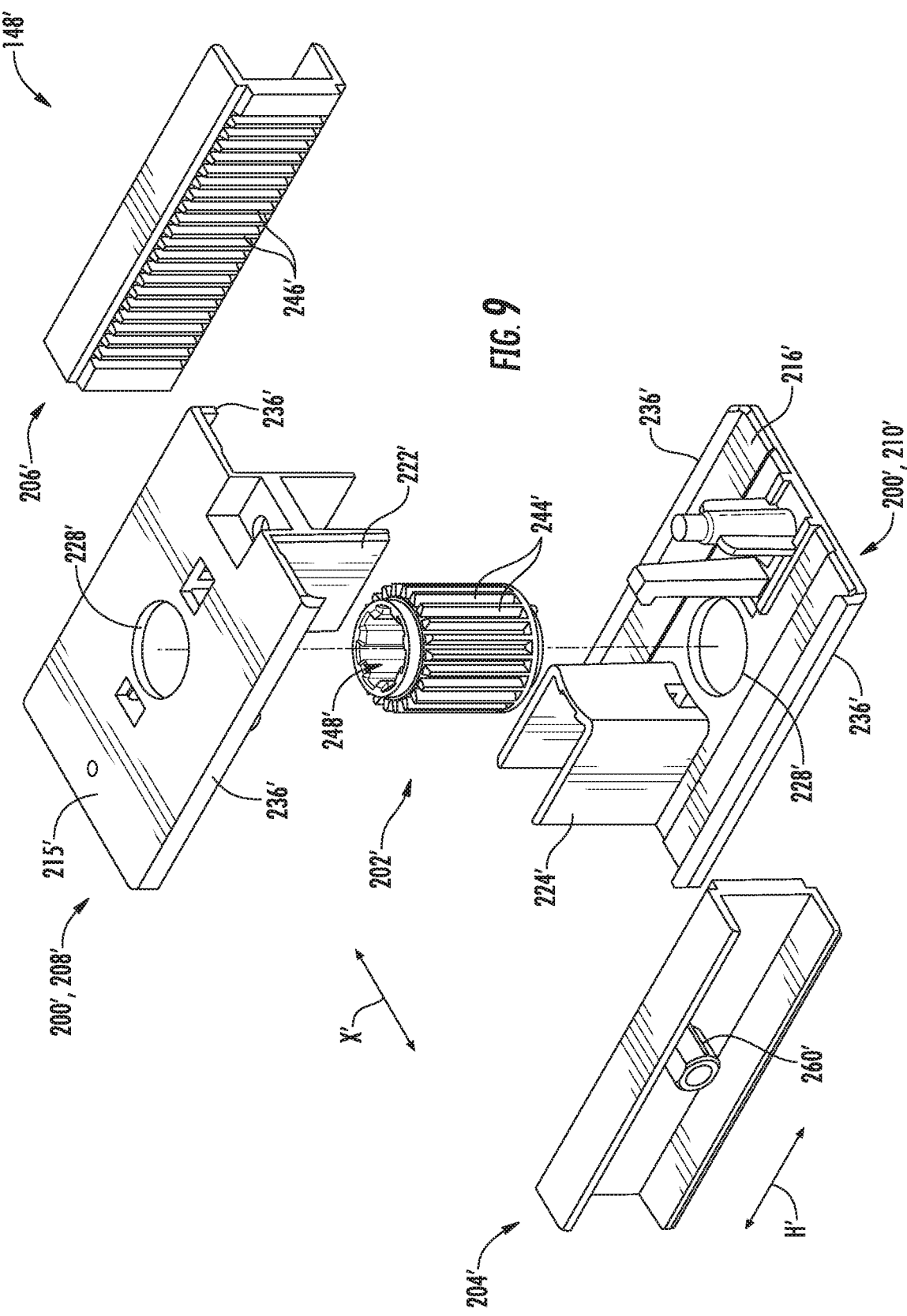
FIG. 9 illustrates a perspective, exploded view of the rack assembly shown in FIG. 8.

Referring now to FIGS. 6-9, several views of other embodiments of rack assemblies suitable for use within the disclosed shutter assembly 100 are illustrated in accordance with aspects of the present subject matter. Specifically, FIGS. 6 and 7 illustrate respective assembled and exploded views of another illustrative embodiment of a rack assembly 152' that may correspond to one or more of the driven rack assemblies 152A, 152B described above with reference to FIG. 3. Similarly, FIGS. 8 and 9 illustrate respective assembled and exploded views of another illustrative embodiment of a rack assembly 148' that may correspond to one or more of the drive rack assemblies 148A, 148B described above with reference to FIG. 3. It should be appreciated that, although the rack assembly 152' shown in FIGS. 6 and 7 will be described herein as being used as one of the driven rack assemblies, the rack assembly 152' may also be used as one of the drive rack assemblies 148A, 148B. Additionally, although the rack assembly 148' shown in FIGS. 8 and 9 will be described herein as being used as one of the drive rack assemblies, the rack assembly 148' may also be used as one of the driven rack assemblies 152A, 152B.

In general, the rack assemblies 152', 148' shown in FIGS. 6-9 and their associated components are configured similar to the various components of the rack assembly 148, 152 described above. As such, the components or features of each rack assembly 152', 148' that are the same or similar to corresponding components or features of the rack assembly 148, 152 described above with reference to FIGS. 4 and 5 will be designated by the same reference character with an apostrophe (') added. Additionally, when a given component or feature of either rack assembly 152', 148' is configured to generally perform the same function as the corresponding component or feature of the rack assembly 148, 152 described above with reference to FIGS. 4 and 5, a less detailed description of such component/feature will be provided with reference to FIGS. 6-9 for the sake of brevity.

As shown in FIGS. 6-9, in one embodiment, each rack assembly 152', 148' includes a housing 200', a rack gear 202' configured to be rotationally supported within the housing 200', and first and second geared racks 204', 206' configured to mesh with the rack gear 202'. In general, the housing 200' for each rack assembly 152', 148' may be configured similar to the housing 200 described above with reference to FIGS. 4 and 5. For instance, as shown in the illustrated embodiments, each housing 200' includes both a first housing component 208' and a second housing component 210', with the first housing component 208' configured to be coupled to the second housing component 210' (e.g., via a snap-fit or by using mechanical fasteners). As shown in FIGS. 7 and 9, in one embodiment, each first housing component 208' includes a first base wall 215' and each second housing component 210' includes a base wall 216'. Additionally, as shown in FIGS. 7 and 9, each first housing component 208' includes a first raised projection 222' extending outwardly from the first base wall 215' and each second housing component 210 includes a second raised projection 224' extending outwardly from the second base wall 216. Similar to the embodiment described above, when the housing components 208', 210' are assembled together, a semi-circular or curved gear channel (not shown) may be defined between the first and second projections 222', 224' for receiving the rack gear 202'. In such an embodiment, corresponding openings 228' may be defined through both the first and second base walls 215', 216' that are aligned with the gear channel for receiving one or more component(s) of the disclosed drive system 134 (FIG. 3).

In one embodiment, the first housing component 208' of the rack assembly 152' shown in FIGS. 6 and 7 may slightly differ in construction from the first housing component 208' of the rack assembly 148' shown in FIGS. 8 and 9. For example, as shown in FIGS. 8 and 9, the outer side of the first base wall 215' of the rack assembly 148' is generally planar. However, as shown in FIGS. 6 and 7, a spacer element 229' extends from the outer side of the first base wall 215' of the rack assembly 152' at the location of the opening 228' defined through the first housing component 208'. In one embodiment, the spacer element 229' may function to ensure that the rack assembly 152' is installed at the appropriate location within the shutter assembly 100. For instance, when the rack assembly 152' corresponds to one of the driven rack assemblies 152A, 152B, the spacer element 229' may function to ensure that the rack assembly 152' is properly installed within the associated panel-side stile 118, 126, such as by ensuring that the rack assembly 152' is properly spaced apart from one of the walls of the stile 118, 126.

Moreover, a translation channel 230' (FIGS. 6 and 8) may be defined along both sides of each housing 200' for receiving the associated geared racks 204', 206'. Specifically, each translation channel 230' may be configured to extend in a widthwise direction (indicated by arrow W' in FIGS. 6 and 8) between the first and second base walls 215', 216' of each housing 200' and in a cross-wise direction (indicated by arrow X' in FIGS. 7 and 9) between the raised projections 222', 224' and corresponding channel lips 236' defined along each outer side of the associated first and second housing components 208', 210'. Moreover, as shown in FIGS. 7 and 9, each translation channel 230' may be configured to extend in a heightwise direction (indicated by arrow H' in FIGS. 7 and 9) between the opposed ends of the housing 200.

As particularly shown in FIGS. 7 and 9, the rack gear 202' of each rack assembly 152' includes outer gear teeth 244' configured to mesh with or otherwise engage corresponding rack teeth 246' provided on each geared rack 204', 206'. Thus, when the gear 202' and racks 204', 206' are installed within each housing 200' such that the outer gear teeth 244' mesh with the rack teeth 246', rotation of the rack gear 202' relative to the housing 200' may result in the geared racks 204', 206' being linearly translated relative to the housing 200' in opposite directions along each associated translation channel 230'. Additionally, as shown in FIGS. 7 and 9, a gear opening 248' is defined through the rack gear 202' for receiving one or more components of the disclosed drive system 134. As indicated above, the gear opening 248' may be keyed or shaped in any suitable manner that allows the rack gear 202' to engage a corresponding portion of the shutter assembly 100. For instance, as shown in FIGS. 8 and 9, when the rack assembly 148' corresponds to one of the drive rack assemblies 148A, 148B, the gear opening 248' may be configured to receive a portion of the associated clutch assembly 160A, 160B, thereby providing a mechanical connection between the rack assembly 148' and the clutch assembly 160A, 160B. In such an embodiment, the gear opening 248' may be keyed or shaped in any suitable manner that allows the rack gear 202' to engage the corresponding portion of the clutch assembly 160A, 160B, such as by defining a splined opening configured to receive a corresponding splined drive portion 360 of a second clutch drive member 318 of the associated clutch assembly 160A, 160B (as described below with reference to FIG. 31).

Similarly, as shown in FIGS. 6 and 7, when the rack assembly 152' corresponds to one of the driven rack assemblies 152A, 152B, the gear opening 248' may be configured to receive a portion of one of the louver drive posts 158A, 158B (or a separate shaft coupling coupled to the associated louver drive posts 158A, 158B), thereby providing a mechanical connection between the rack assembly 152' and the associated driven louver 114A, 114B. In such an embodiment, the gear opening 248' may be keyed or shaped in any suitable manner that allows the rack gear 202' to engage the corresponding portion of the louver drive post 158A, 158B (or coupling). For instance, if the louver drive post 158A, 158B defines one or more keyways (e.g., two opposed v-shaped keyways), the gear opening 248' may be configured as a corresponding keyed opening (e.g., gear opening 248' shown in FIG. 31) to allow the rack gear 202' to be coupled to the louver drive post 158A, 158B.

Moreover, similar to the embodiment described above, each geared rack 204', 206' may be configured to be coupled to one of the drive bars 154, 156 of the associated louver drive assembly 146A 146B (FIG. 3) to allow the racks 204', 206' and corresponding drive bars 154, 156 to be simultaneously translated relative to the housing 200'. For example, as shown in FIGS. 6-9, each geared rack 204', 206' may include an outwardly extending boss or projection 260'. In such an embodiment, when the associated drive bar 154,156 and the housing 200' are placed side-by-side, the projection 260' may be inserted into (e.g., via a press-fit) a corresponding opening (not shown) defined in the drive bar 154, 156 to couple the drive bar 154, 156 to the geared rack 204', 206'.

Referring now to FIGS. 10-15, several views of one illustrative embodiment of a clutch assembly 160 and related components suitable for use within the disclosed shutter assembly 100 are illustrated in accordance with aspects of the present subject matter. It should be appreciated that the clutch assembly 160 may, in one embodiment, illustrate aspects of the first clutch assembly 160A and/or the second clutch assembly 160B described above with reference to FIG. 3.

As indicated above with reference to FIG. 3, each clutch assembly 160A, 160B may be configured to provide selective engagement of its associated drive shaft 150A, 150B of the drive system 134 with the corresponding louver drive assembly 146A, 146B, thereby allowing the louvers 114 to be manually rotated by the user, when desired. For instance, in several embodiments, the first clutch assembly 160A may be configured to transfer motion from the first drive shaft 150A to the first louver drive assembly 146A when the motor 140 is being used to drive the louvers 114. However, when the louvers 114 are being manually rotated, the first clutch assembly 160A may be configured to decouple the first drive rack assembly 148A from the first drive shaft 150A, thereby preventing torque from the first louver drive assembly 146A from being transferred through the clutch assembly 160A to the drive shaft 150A (and, thus, the motor 140).

Figure 10:
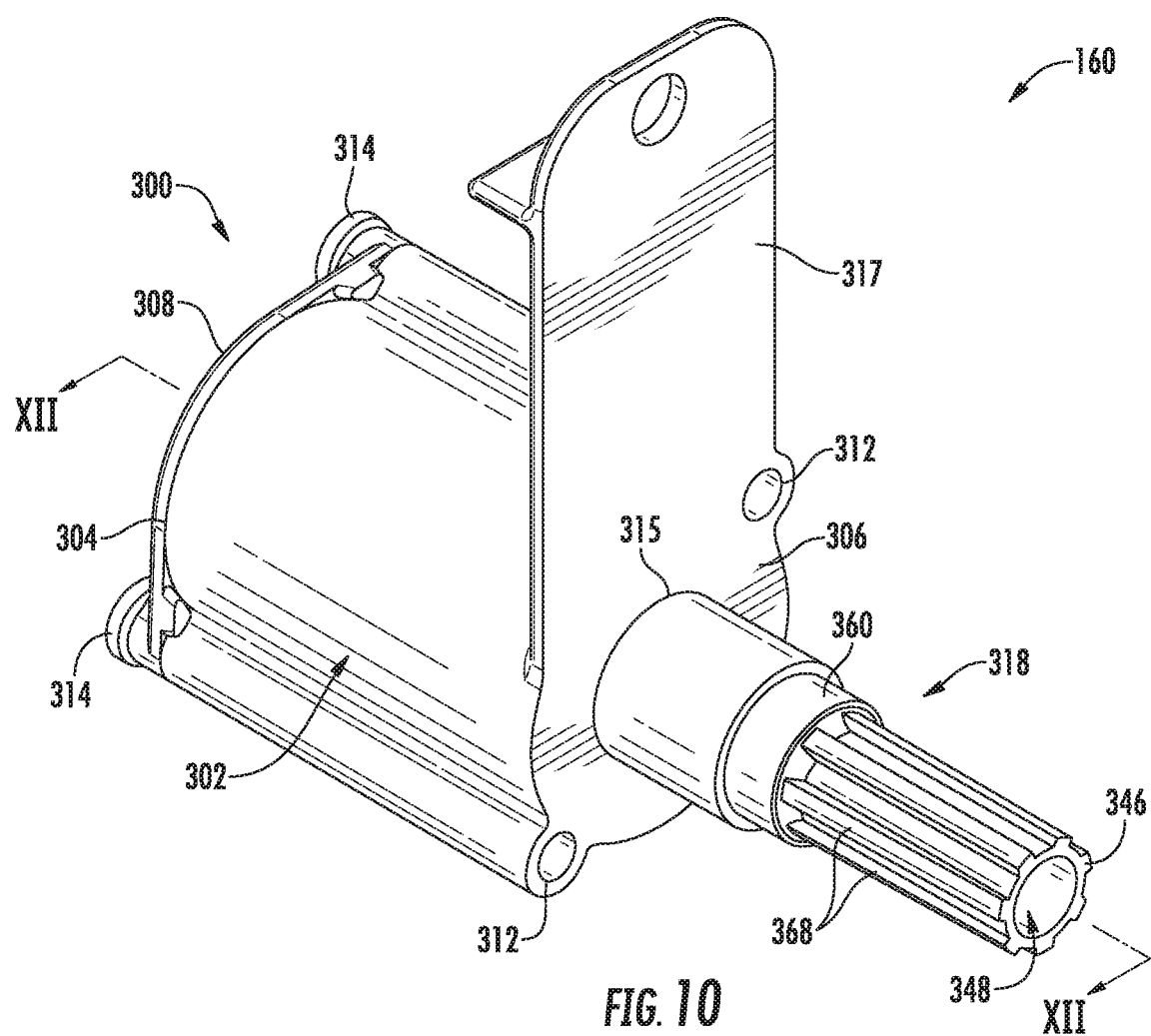
FIG. 10 illustrates a perspective, assembled view of one illustrative embodiment of a clutch assembly suitable for use within the disclosed shutter assembly in accordance with aspects of the present subject matter.
Figure 11:
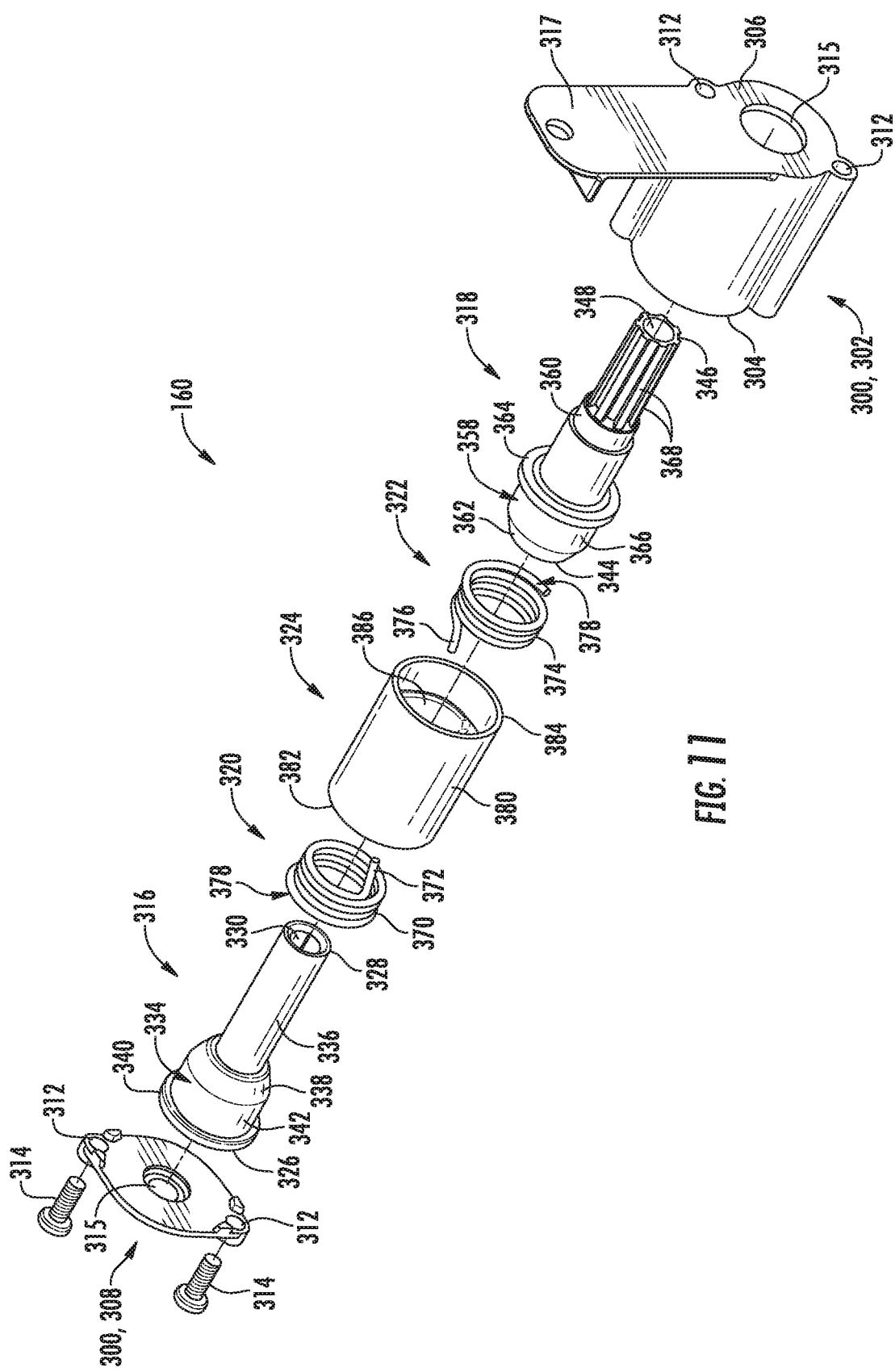
FIG. 11 illustrates a perspective, exploded view of the clutch assembly shown in FIG. 10.

As shown in the illustrated embodiment, the clutch assembly 160 includes a clutch housing 300 configured to at least partially encase the various internal components of the clutch assembly 160. In one embodiment, the clutch housing 300 includes both a housing member 302 extending axially between a first end 304 and a second end 306 and a clutch cover 308 configured to be coupled to the first end 304 of the housing member 302. As particularly shown in FIG. 12, when the clutch cover 308 is coupled to the first end 304 of the housing member 302, a cylindrically-shaped, open volume 310 may be defined between the cover 308 and the second end 306 of the housing member 302 for receiving the internal components of the clutch assembly 160. It should be appreciated that cover 308 may be configured to be coupled to the housing member 302 using any suitable means. For instance, as shown in FIG. 11, both the cover 308 and the housing member 302 may be configured to define corresponding openings 312 configured to receive fasteners 314 for coupling the cover 308 to the housing member 302. Alternatively, the cover 308 may be coupled to the housing member 320 using any other suitable means, such as by ultrasonic welding or by creating a snap-fit between the cover 308 and the housing member 320. Additionally, as shown in FIG. 11, the housing member 302 and the cover 308 may each define an axial opening 315 for receiving one or more drive-related components of the drive system 134. Moreover, as shown in FIG. 10, the housing member 302 may include, for example, a mounting arm 317 configured to provide structure for coupling the clutch housing 300 to a portion of the shutter panel 104A, 104B within which it is being installed.

In several embodiments, the clutch assembly 160 also includes first and second clutch drive members 316, 318 configured to serve as the input and output components or members of the clutch assembly 160. Specifically, in one embodiment, the first clutch drive member 316 is configured to rotationally engage the corresponding drive shaft 150A, 150B of the drive system 134 to allow rotational motion or torque from the motor 140 to be transferred to the clutch assembly 160. Additionally, in one embodiment, the second clutch drive member 318 is configured to rotationally engage a component of the corresponding louver drive assembly 146A, 146B (e.g., one of the drive rack assemblies 148A, 148B) to allow rotational motion or torque to be transferred between the clutch assembly 160 and such louver drive assembly 146A, 146B. As such, when the motor 140 is being used to adjust the orientation of the louvers 114, the first clutch drive member 316 corresponds to the input portion or member of the clutch assembly 160 while the second clutch drive member 318 corresponds to the output portion or member of the clutch assembly 160. However, as will be described below, during manual operation of the shutter assembly 100, the second clutch drive member 318 may correspond to the input member for the clutch assembly 160.

Moreover, in several embodiments, the clutch assembly 160 also includes one or more torque transfer members for transferring torque between the first and second clutch drive members 316, 318 and for allowing such components 316, 318 to be decoupled from each other when the torque transmitted through the clutch assembly 160 exceeds a given torque threshold. Specifically, as shown in the illustrated embodiment, the clutch assembly includes, for example, first and second clutch springs 320, 322 configured to be installed on the first and second clutch drive members 316, 318, respectively, and a clutch sleeve 324 configured to receive portions of the clutch drive members 316, 318 and/or the springs 320, 322. As will be described in greater detail below, the engagement of the clutch springs 320, 322 and the clutch sleeve 324 forms a connection or coupling (e.g., a rotational coupling) between the clutch drive members 316, 318 that allows torque to be transferred from the first clutch drive member 316 (e.g., via the associated drive shaft 150A, 150B) to the second clutch drive member 318 when the torque is below a slippage torque associated with the clutch springs 320, 322, thereby allowing the motor 140 to drive the louvers 114 of the disclosed shutter assembly 100. However, when the torque exceeds the slippage torque for the clutch springs 320, 322 (e.g., when the user is manually adjusting the position of the louvers 114), one of the clutch springs 320, 322 may be configured to slip within the clutch assembly 160, thereby decoupling the clutch drive members 316, 318 from each other and, thus, preventing torque from being transmitted from the second clutch drive member 318 to the first clutch drive member 316.

Figure 12:
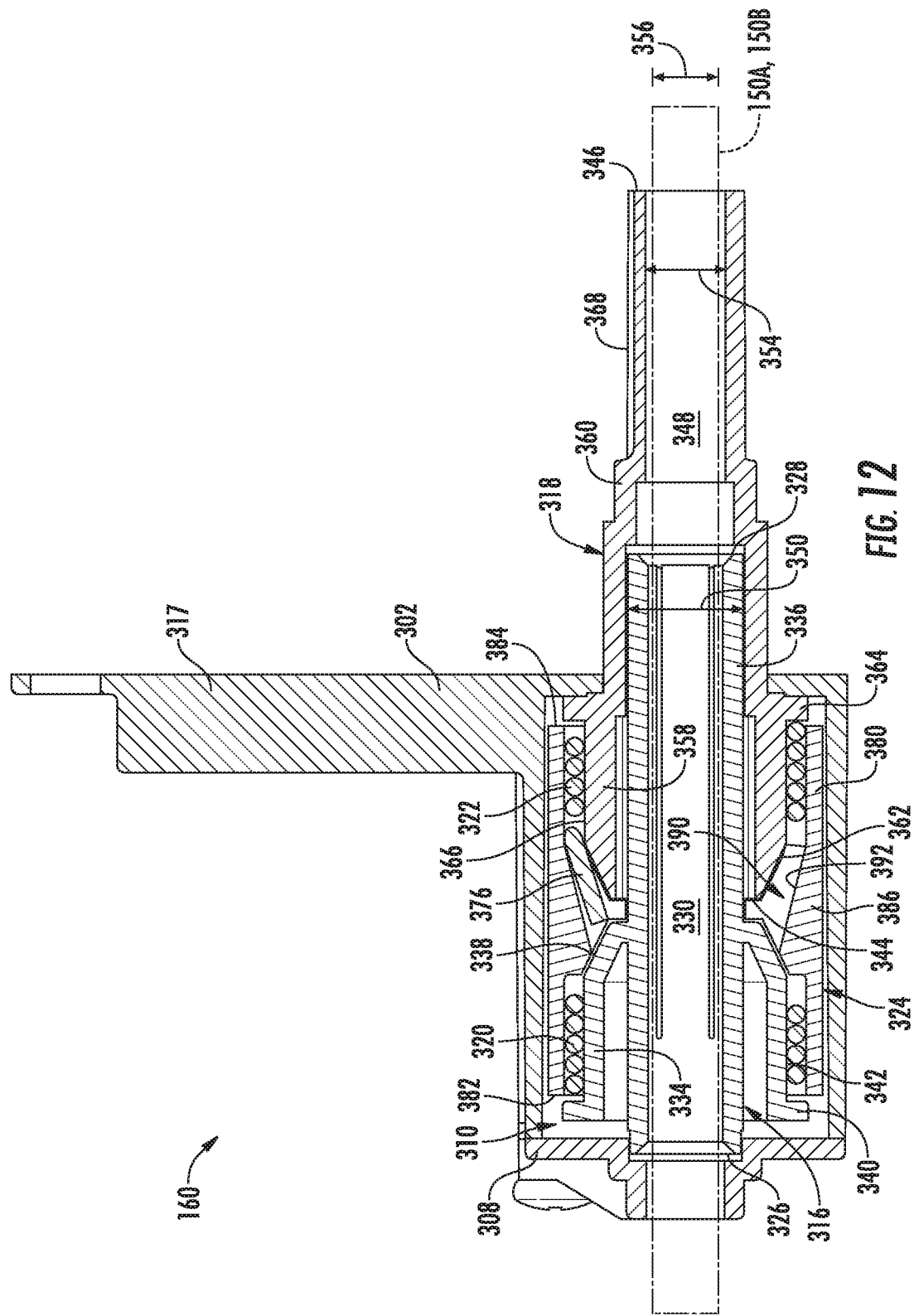
FIG. 12 illustrates a cross-sectional view of the clutch assembly shown in FIG. 10 taken about line XII-XII.
Figure 13:
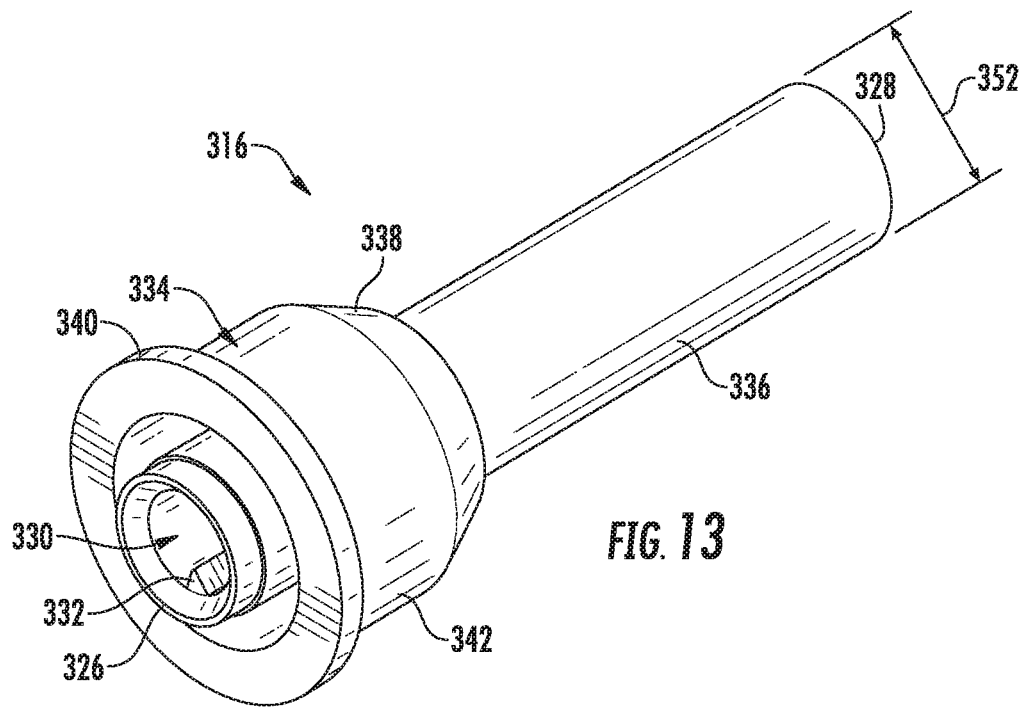
FIG. 13 illustrates a perspective view of a first clutch drive member of the clutch assembly shown in FIG. 11.

As shown in FIGS. 11 and 13, the first clutch drive member 316 may be configured to extend axially between a first end 326 and a second end 328 and may define a shaft opening 330 extending between its first and second ends 326, 328 for receiving the corresponding drive shaft 150A, 150B of the drive system 134 (e.g., as shown in phantom lines in FIG. 12). As indicated above, the drive shaft 150A, 150B may be configured to drive the first clutch drive member 316. Thus, in one embodiment, the shaft opening 330 may be keyed or may otherwise be configured such that the drive shaft 150A, 150B rotationally engages the first clutch drive member 316 when the drive shaft 150A, 150B is received within the shaft opening 330. For instance, as shown in FIG. 13, a "V-shaped" key 332 may be configured to extend into the opening 330 to allow the key 332 to be received within or otherwise engage a corresponding "V-shaped" keyway (not shown) defined in the drive shaft 150A, 150B.

Additionally, in several embodiments, the first clutch drive member 316 includes a first spring support portion 334 and an elongated tube portion 336, with the shaft opening 330 being defined through both the first spring support portion 334 and the elongated tube portion 336. As shown in FIGS. 11 and 13, the first spring support portion 334 may generally extend axially between a tapered end 338 and a radial flange 340 defined at or adjacent to the first end 326 of the first clutch drive member 316. Similarly, the elongated tube portion 336 may extend axially from the tapered end 338 of the first spring support portion 334 to the second end 328 of the first clutch drive member 316.

In general, the first clutch spring 320 may be configured to be installed onto the first clutch drive member 316 such that the first clutch spring 320 is positioned onto and wrapped around an outer spring support surface 342 (FIG. 13) defined by the first spring support portion 334 (e.g., the surface extending axially between the flange 340 and the tapered end 338 of the first spring support portion 334). Specifically, in one embodiment, the first spring support portion 334 and/or the first clutch spring 320 may be dimensioned such that an interference fit is defined between the clutch spring 320 and the outer spring support surface 342 of the first spring support portion 334. In such an embodiment, the first clutch spring 320 may be configured to be installed onto the first clutch drive member 316 at its second end 328 and then pushed axially over at least a portion of the tapered end 338 of the first spring support portion 334 prior to being moved further onto the outer spring support surface 342 in the direction of the flange 340 (e.g., by screwing the spring 320 around the outer spring support surface 342). In doing so, the reduced diameter of the tapered end 338 of the first spring support portion 334 may assist in installing the spring 320 into the first spring support portion 334.

Figure 14:
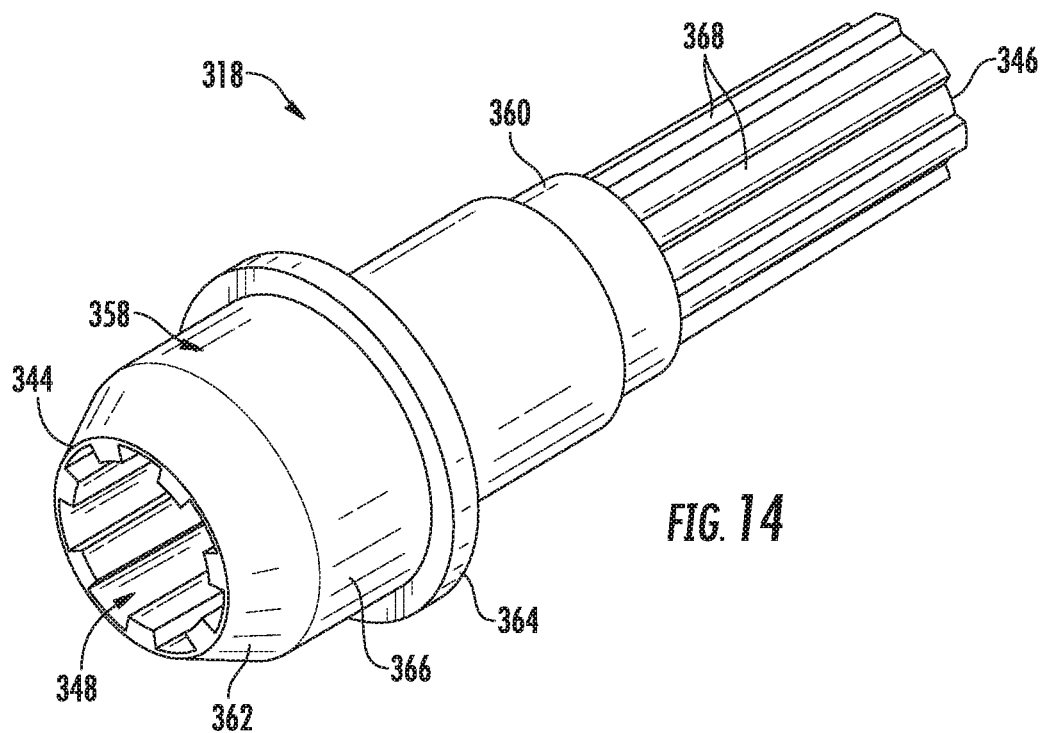
FIG. 14 illustrates a perspective view of a second clutch drive member of the clutch assembly shown in FIG. 11.

Additionally, as shown in FIGS. 11 and 14, the second clutch drive member 318 may be configured to extend axially between a first end 344 and a second end 346 and may define a pass-through opening 348 extending between its first and second ends 344, 346 for receiving both the elongated tube portion 336 of the first clutch drive member 316 and the corresponding drive shaft 150A, 150B of the drive system 134 (e.g., as shown in FIG. 12). Specifically, in several embodiments, the pass-through opening 348 may be dimensioned or otherwise configured to receive the elongated tube portion 336 and the drive shaft 150A, 150B without rotationally engaging such components. For instance, as shown in FIG. 12, an inner diameter 350 of the axial portion of the pass-through opening 348 configured to receive the elongated tube portion 336 may be greater than a corresponding outer diameter 352 (FIG. 13) of the elongated tube portion 336 while the remainder of the pass-through opening 348 may define a minimum inner diameter 354 that is greater than a corresponding outer diameter 356 of the drive shaft 150A, 150B. As such, when the clutch assembly 160 is in its disengaged state, the second clutch drive member 318 may be configured to rotate relative to both the first clutch drive member 316 and the drive shaft 150A, 150B.

Moreover, in one embodiment, the second clutch drive member 318 includes a second spring support portion 358 and an elongated drive portion 360, with the pass-through opening 348 being defined through both the second spring support portion 358 and the elongated drive portion 360. As shown in FIG. 14, the second spring support portion 358 may extend axially between a tapered end 362 terminating at the first end 344 of the second clutch drive member 318 and a radial flange 364. Similarly, the elongated drive portion 360 may extend axially from the radial flange 364 to the second end 346 of the second clutch drive member 318.

In general, the second clutch spring 322 may be configured to be installed onto the second clutch drive member 318 such that the second clutch spring 322 is positioned onto and wrapped around an outer spring support surface 366 of the second spring support portion 358 (e.g., the surface extending axially between the flange 364 and the tapered end 362 of the second spring support portion 358). Specifically, in one embodiment, the second spring support portion 358 and/or the second clutch spring 322 may be dimensioned such that an interference fit is defined between the clutch spring 322 and the outer spring support surface 366 of the second spring support portion 358. In such an embodiment, the second clutch spring 322 may be configured to be installed onto the second clutch drive member 318 at its first end 344 and then pushed axially over at least a portion of the tapered end 362 of the second spring support portion 358 prior to being moved further onto the outer spring support surface 366 in the direction of the flange 364 (e.g., by screwing the spring 322 around the outer spring support surface 266). In doing so, the reduced diameter of the tapered end 362 of the second spring support portion 358 may assist in installing the spring 322 into the second spring support portion 358.

Additionally, in several embodiments, the elongated drive portion 360 of the second clutch drive member 318 may be configured to extend outwardly from the second end 306 of the housing member 302 (e.g., via the axial opening 315 defined through the housing member 302) to allow the elongated drive portion 360 to be received within and/or engage the corresponding drive rack assembly 148A, 148B of the drive system 134. For instance, when assembling the clutch assembly 160, the elongated drive portion 360 may be inserted through the axial opening 315 of the housing member 302 until the flange 364 contacts the wall defined at the second end 306 of the housing member 302. Moreover, in several embodiments, the elongated drive portion 360 may be keyed or otherwise configured to engage the rack gear 202 of the corresponding drive rack assembly 148A, 148B. For example, as shown in FIG. 14, an axial section of the elongated drive portion 360 includes a plurality of radially outwardly extending splines 368. In such an embodiment, the splined section of the elongated drive portion 360 may be configured to be received within and engage the corresponding splined opening 248, 248' of the rack gear 202, 202' (FIGS. 5 and 9). As such, rotational motion transmitted through the shutter's drive system 124 may be transferred from the second clutch drive member 318 to the drive rack assembly 148A, 148B, and vice versa, as the shutter assembly 100 is operated via the motor 140 or manually.

Referring still to FIGS. 10-15, the clutch springs 320, 322 may generally correspond to coiled, torsional springs. As shown in FIG. 11, the first clutch spring 320 includes a first coiled section 370 and a first spring tang 372 extending axially from the first coiled section 370. Similarly, the second clutch spring 322 includes a second coiled section 374 and a second spring tang 376 extending axially from the second coiled section 374. Additionally, in one embodiment, each coiled section 370, 374 of the first and second clutch springs 320, 322 may define an enlarged end 378 at the axial end opposite the spring tang 372, 376. Such an enlarged end 378 of each coiled section 370, 374, in combination with the tapered ends 338. 362 of the spring support sections 334, 358 of the first and second clutch drive members 316, 318, may facilitate installing the first and second springs 320, 322 onto the first and second clutch drive members 316, 318, respectively.

As indicated above, in several embodiments, the clutch springs 320, 322 and/or the spring support sections 334, 358 of the first and second clutch drive members 316, 318 may be dimensioned and/or otherwise configured to provide an interference fit between each spring 320, 322 and its respective spring support portion 334, 358. In doing so, the dimension and/or configuration of such components may be selected so that the specific fit defined between each spring 320, 322 and its respective spring support portion 334, 358 provides for the torque springs 320, 322 to be associated with a desired slippage torque at which each spring 320, 322 may rotationally disengage from or otherwise slip relative to the outer spring support surface 342, 366 of the adjacent spring support portion 334, 358. In such embodiments, the desired slippage torque may be selected to be less than the output torque for the motor 140, but greater than the minimum torque required to operate or rotate the louvers 114 of each individual shutter panel 104A, 104B. Thus, given that the slippage torque is greater than the minimum torque required to rotationally drive the louvers 114 of each individual shutter panel 104A, 104B, the torque actually being transferred through the clutch assembly 160 will be less than the slippage torque when the motor 140 is being used to drive the louvers 114, thereby allowing both springs 320, 322 to be maintained in rotational engagement with the first and second clutch drive members 316, 318. However, when the torque being transferred through the clutch assembly 160 is greater than the slippage torque (e.g., during manual operation), at least one of the springs 320, 322 will slip relative to the outer spring support surface 342, 366 of its adjacent spring support portion 334, 358, thereby permitting the first clutch drive member 316 to be disengaged or decoupled from the second clutch drive member 318.

Moreover, in one embodiment, the respective wires forming the coiled sections 370, 374 of the clutch springs 320, 322 may be wound in opposite directions. For instance, as shown in FIG. 11, the first clutch spring 320 is wound from the first spring tang 372 to its enlarged end 378 in a clockwise direction. In contrast, the second clutch spring 322 is wound from the second spring tang 376 to its enlarged end 378 in a counter-clockwise direction. As will be described below, such counter-wrapping or opposed winding directions of the clutch springs 320, 322 may allow for one clutch spring to be tightened around its adjacent spring support surface 342, 366 while the other clutch spring is loosened relative to its adjacent spring support surface 342, 366 when the torque being transferred through the clutch assembly 160 exceeds the slippage torque for the springs 320, 322, thereby allowing the loosened clutch spring to slip and, thus, decouple the first clutch drive member 316 from the second clutch drive member 318.

Figure 15:
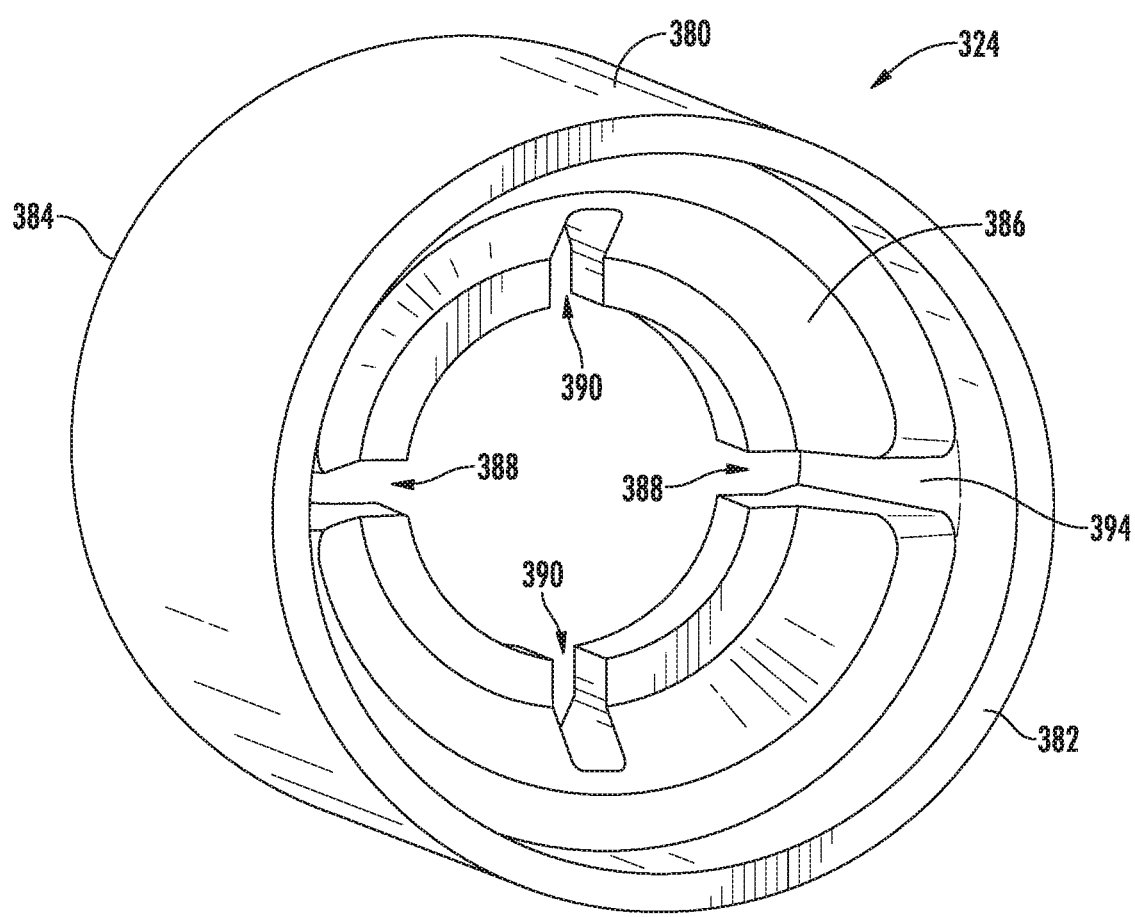
FIG. 15 illustrates a perspective view of a clutch sleeve of the clutch assembly shown in FIG. 11.

As shown in FIGS. 11 and 15, the clutch sleeve 324 may generally correspond to an elongated member having a cylindrically-shaped outer sleeve wall 380 extending axially between a first end 382 and a second end 384. In general, the clutch sleeve 324 may be configured to encase or receive portions of the first and second clutch drive members 316, 318 when the clutch assembly 160 is assembled together. For instance, as shown in FIG. 12, as assembled, the first end 382 of the sleeve wall 380 may be disposed adjacent to the flange 340 of the first clutch drive member 316 and the second end 384 of the sleeve wall 380 may be disposed adjacent to the flange 364 of the second clutch drive member 318 so that all or substantially all of the spring support portions 334, 358 of the clutch drive members 316, 318 are received within and surrounded by the clutch sleeve 324. In such an embodiment, each clutch spring 320, 322 may be positioned directly between outer sleeve wall 380 and the outer spring support surface 342, 366 of its respective spring support portion 334, 358. As a result, the outer sleeve wall 380 may serve to limit the radially outward expansion of the clutch springs 320, 322 when either spring is being loosened relative to its corresponding spring support portion 334, 358 due to the torque transferred through the clutch assembly 160 exceeding the slippage torque of the springs 320, 322.

Additionally, the clutch sleeve 324 may be configured to engage each torsional spring 320, 322, thereby permitting torque to be transferred between the first and second clutch drive members 316, 318. Thus, in several embodiments, the clutch sleeve 324 includes a spring engagement portion 386 extending radially inwardly from the outer sleeve wall 380 that is configured to engage the spring tang 372, 376 of each clutch spring 320, 322. As particularly shown in FIG. 15, the spring engagement portion 386 defines two or more engagement slots 388, 390, with each spring tang 372, 376 being configured to be received within one of the engagement slots 388, 390 when the clutch assembly 160 is assembled. In the illustrated embodiment, the spring engagement portion 386 includes four engagement slots 388, 390 (e.g., a first pair of slots 388 configured to receive the first spring tang 372, and a second pair of slots 390 configured to receive the second spring tang 376). Given that the insertion of the spring tangs 372, 376 into the clutch sleeve 324 is a blind assembly, the additional slots 388, 390 may reduce assembly time by making it easier for the assembler to locate a slot 388, 390 for receiving each spring tang 372, 374. However, in other embodiments, the spring engagement portion 386 may only define two engagement slots 388, 390, one for each spring tang 370, 372. Regardless, by assembling the clutch assembly 160 so that each spring tang 370, 372 is received within one of the engagement slots 388, 390, the clutch sleeve 324 may serve to transfer torque between the clutch springs 322, 324, thereby providing a torque coupling or bridge between the first and second clutch drive members 316, 318.

Moreover, in one embodiment, each engagement slot 388, 390 may be angled radially inwardly from the outer wall 380 to match the radial profile of the spring tang 370, 372 configured to be received within such slot 388, 390. For instance, as shown in FIG. 12, the engagement slots 390 configured to receive the second spring tang 376 may each define an angled surface 392 extending radially inwardly from the outer wall 380 so that, when the second spring tang 376 is received in one of the slots 390, the spring tang 376 is positioned between the angled surface 392 of such slot 390 and the tapered end 362 of the spring support portion 358 of the second clutch drive member 318. Similarly, as shown in FIG. 15, the engagement slots 388 configured to receive the first spring tang 372 may also define an angled surface 394 extending radially inwardly from the outer wall 380 so that, when the first spring tang 372 is received in one of the slots 388, the spring tang 372 is positioned between the angled surface 394 of such slot 388 and the tapered end 338 of the spring support portion 334 of the first clutch drive member 316.

Figure 16:
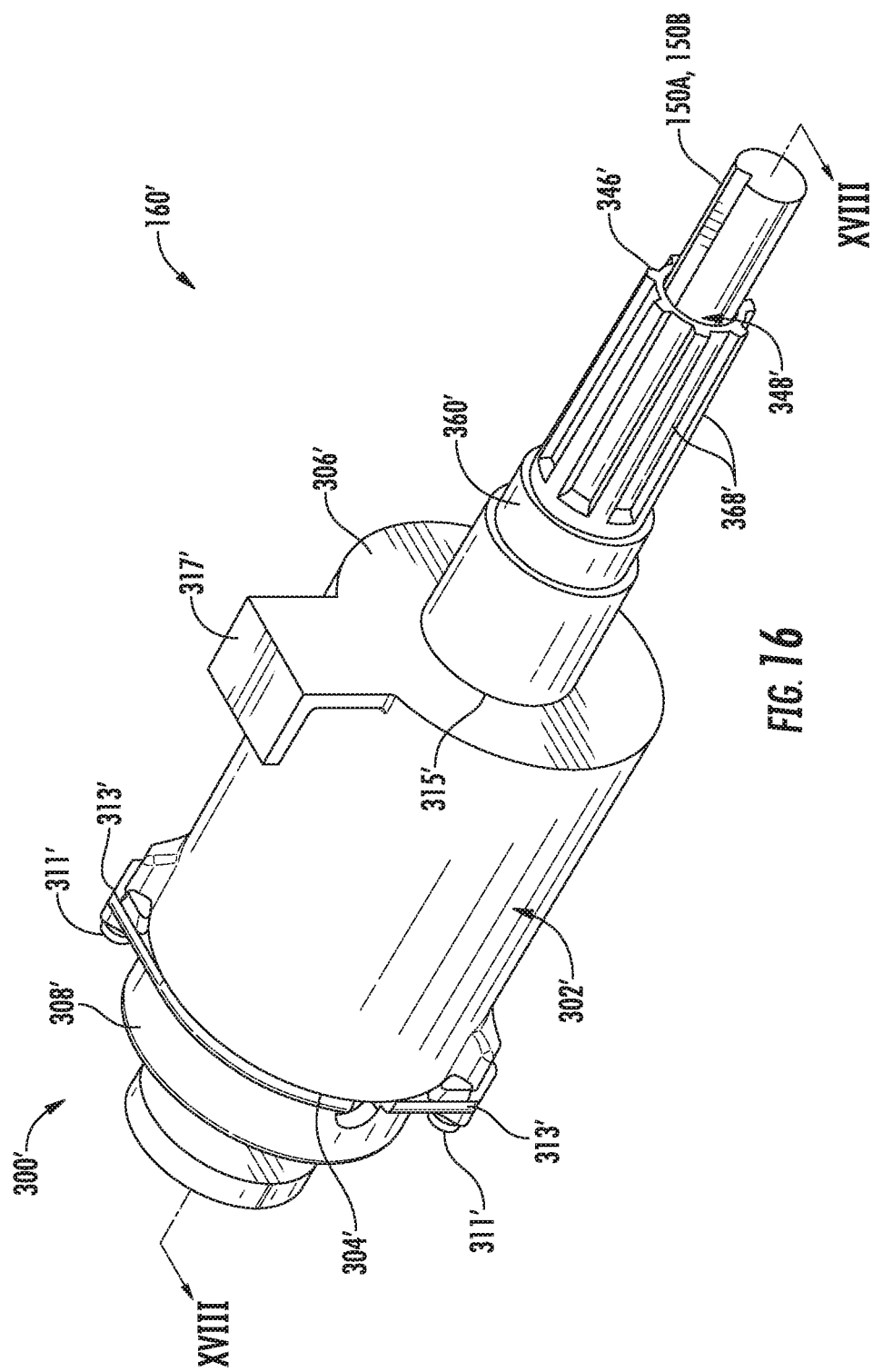
FIG. 16 illustrates a perspective, assembled view of another illustrative embodiment of a clutch assembly suitable for use within the disclosed shutter assembly in accordance with aspects of the present subject matter.
Figure 17:
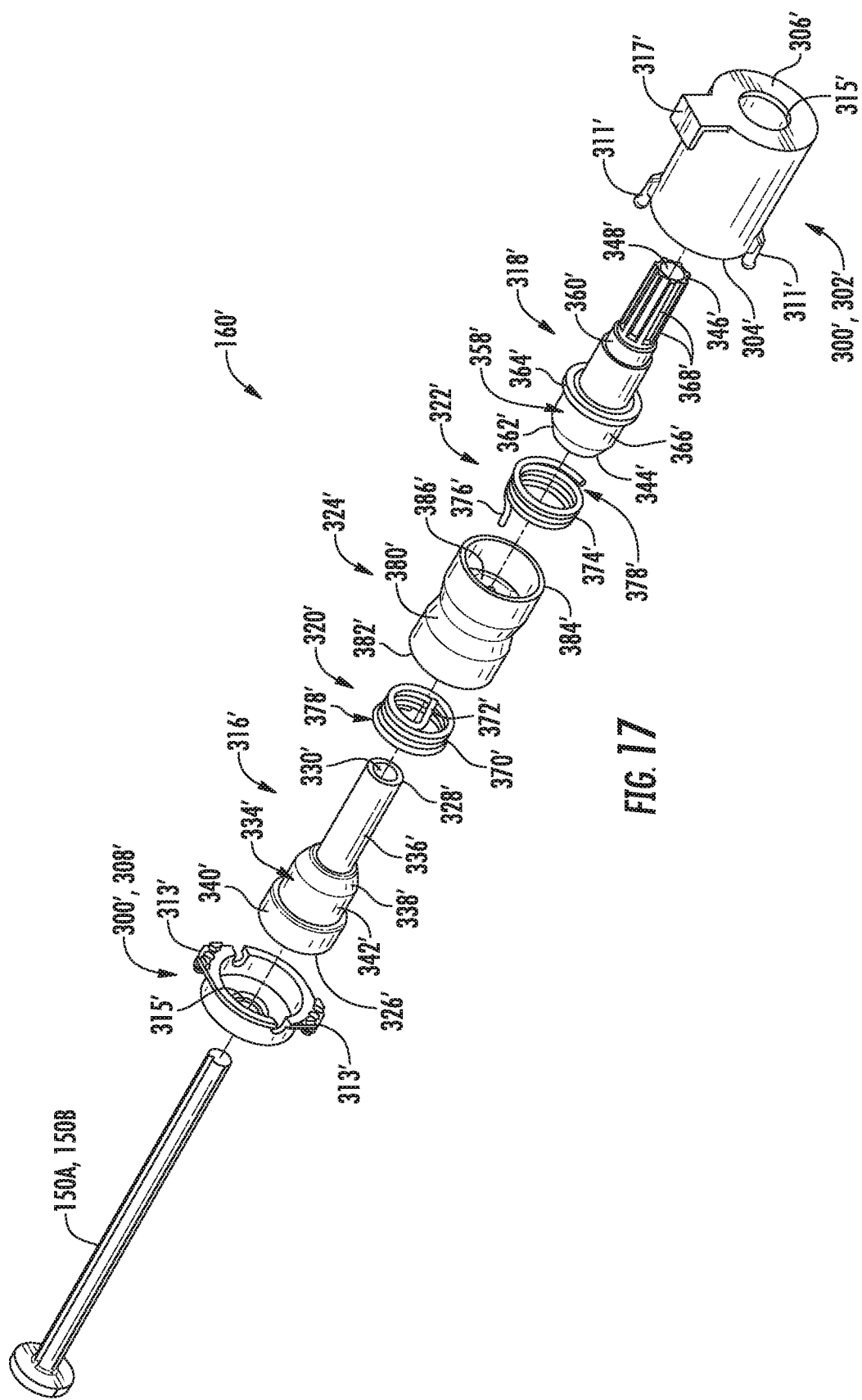
FIG. 17 illustrates a perspective, exploded view of the clutch assembly shown in FIG. 16.
Figure 18:
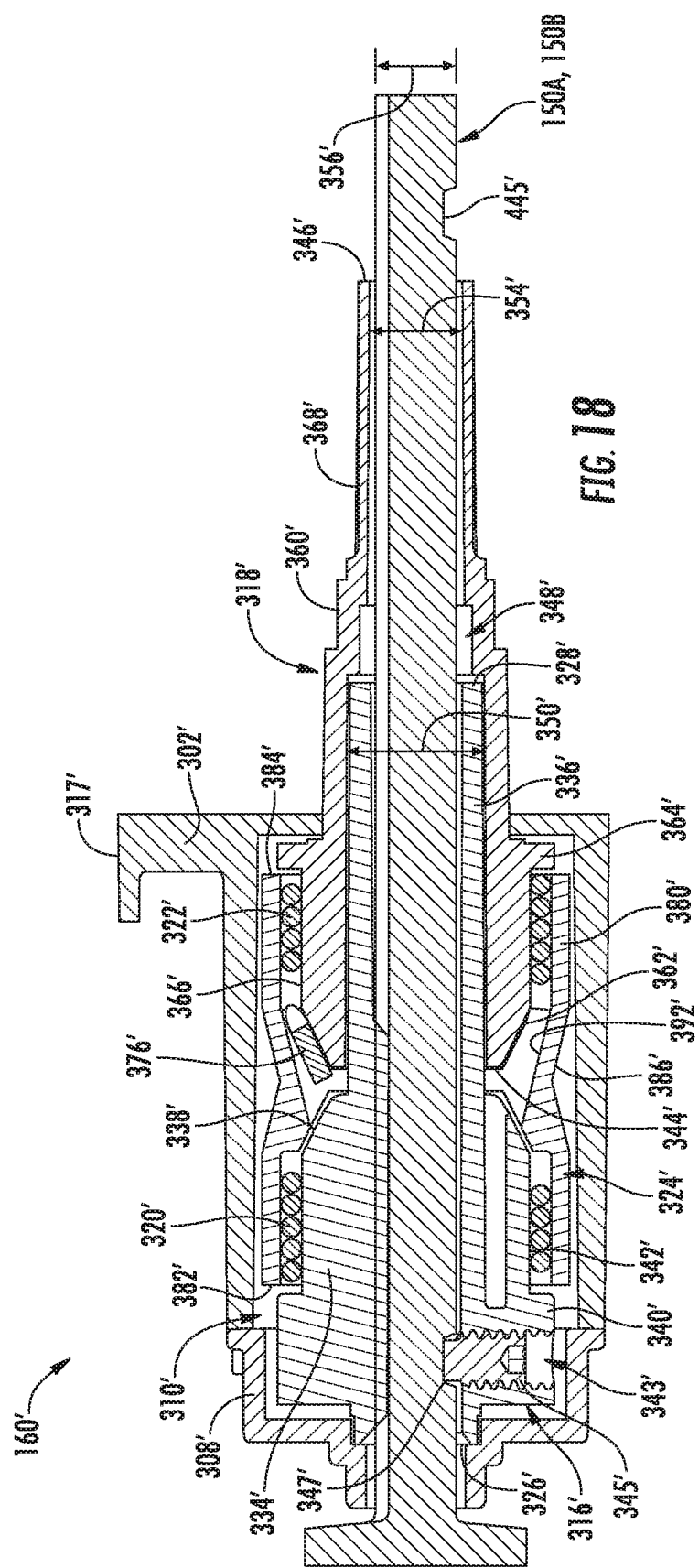
FIG. 18 illustrates a cross-sectional view of the clutch assembly shown in FIG. 16 taken about line XVIII-XVIII.

Referring now to FIGS. 16-21, several views of another illustrative embodiment of a clutch assembly 160' and related components suitable for use within the disclosed shutter assembly 100 are illustrated in accordance with aspects of the present subject matter. Specifically, FIGS. 16-21 generally correspond to similar views of the clutch assembly 160' as those shown above for clutch assembly 160 (i.e., in FIGS. 10-15), except that the drive shaft 150A, 150B is shown in FIGS. 16-18. In general, the clutch assembly 160' shown in FIGS. 16-21 and its associated components are configured similar to the various components of the clutch assembly 160 described above. As such, the components or features of the clutch assembly 160' that are the same or similar to corresponding components or features of the clutch assembly 160 described above with reference to FIGS. 10-15 will be designated by the same reference character with an apostrophe (') added. Additionally, when a given component or feature of the clutch assembly 160' is configured to perform the same general function as the corresponding component or feature of the clutch assembly 160 described above with reference to FIGS. 10-15, a less detailed description of such component/feature will be provided with reference to FIGS. 16-21 for the sake of brevity.

As shown in the illustrated embodiment, similar to the clutch assembly 160 described above, the clutch assembly 160' includes a clutch housing 300' having both a housing member 302' extending axially between a first end 304' and a second end 306' and a clutch cover 308' configured to be coupled to the first end 304' of the housing member 302' such that a cylindrically-shaped, open volume 310' (FIG. 18) is defined between the cover 308' and the second end 306' of the housing member 302' for receiving the internal components of the clutch assembly 160'. As particularly shown in FIGS. 16 and 17, unlike the openings 312 and corresponding fasteners 314 of the clutch housing 300 of FIGS. 10 and 11, the clutch housing 300' includes differing engagement or coupling features for securing the housing member 302' and the cover 308' to each other. Specifically, as shown in FIG. 17, the housing member 302' includes projections 311' extending from its first end 304' that are configured to snap into or otherwise engage corresponding engagement features 313' of the clutch cover 308'. However, it should be appreciated that, in other embodiments, the cover 308' may be configured to be coupled to the housing member 302' using any other suitable means. Additionally, as shown in FIG. 17, the housing member 302' and the cover 308' may each define an axial opening 315' for receiving one or more drive-related components of the drive system 134. Moreover, as shown in FIG. 16, the housing member 302' may include, for example, a mounting arm 317' configured to provide structure for coupling the clutch housing 300' to a portion of the shutter panel 104A, 104B within which it is being installed.

Additionally, the clutch assembly 160' also includes first and second clutch drive members 316', 318' configured to serve as the input and output components or members of the clutch assembly 160', first and second clutch springs 320', 322' configured to be installed on the first and second clutch drive members 316', 318', respectively, and a clutch sleeve 324' configured to receive portions of the clutch drive members 316', 318' and/or the springs 320', 322'. In general, the first and second clutch drive members 316', 318', the first and second clutch springs 320', 322', and the clutch sleeve 324' may be configured to function the same as or similar to the corresponding components 316, 318, 320, 322, 324 of the clutch assembly 160 described above with references to FIGS. 10-15. Thus, for example, the engagement of the clutch springs 320', 322' and the clutch sleeve 324' may form a connection or coupling (e.g., a rotational coupling) between the clutch drive members 316', 318' that allows torque to be transferred from the first clutch drive member 316' (e.g., via the associated drive shaft 150A, 150B) to the second clutch drive member 318' when the torque is below a slippage torque associated with the clutch springs 320', 322', thereby permitting the motor 140 to drive the louvers 114 of the disclosed shutter assembly 100. However, when the torque exceeds the slippage torque for the clutch springs 320', 322' (e.g., when the user is manually adjusting the position of the louvers 114), one of the clutch springs 320', 322' may be configured to slip within the clutch assembly 160', thereby decoupling the clutch drive members 316', 318' from each other and, thus, preventing torque from being transmitted from the second clutch drive member 318' to the first clutch drive member 316'.

Figure 19:
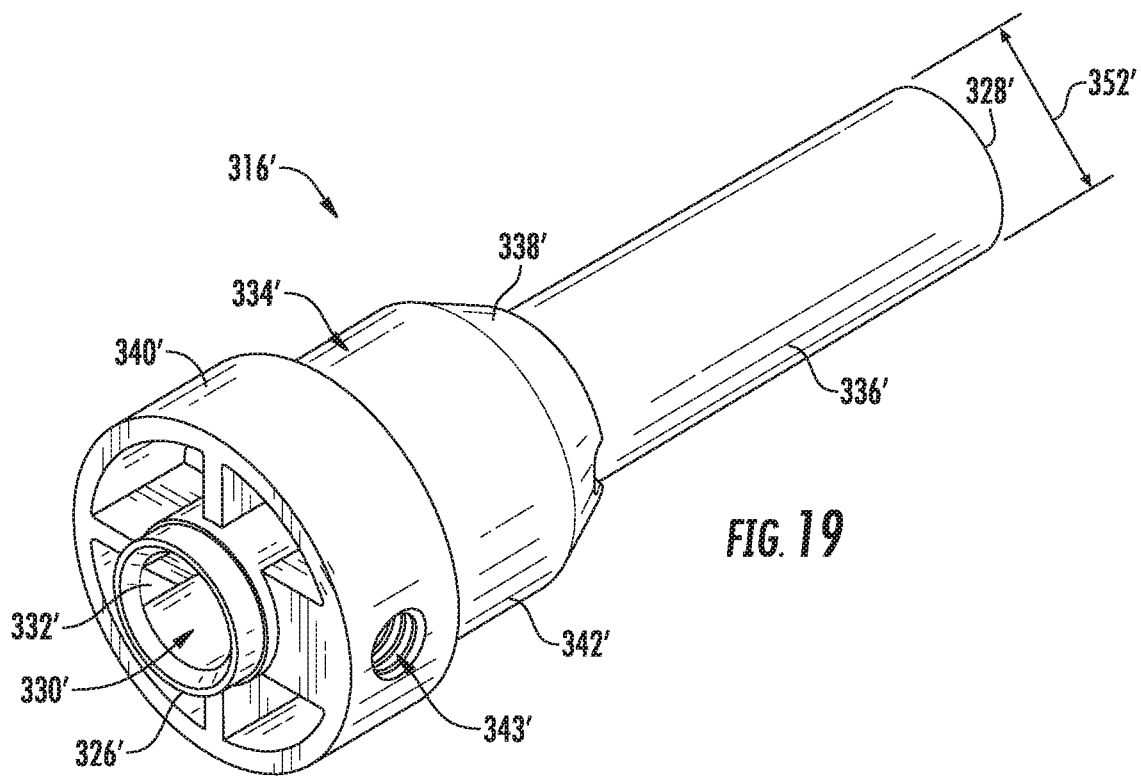
FIG. 19 illustrates a perspective view of a first clutch drive member of the clutch assembly shown in FIG. 17.

As shown in FIGS. 17 and 19, the first clutch drive member 316' may be configured to extend axially between a first end 326' and a second end 328' and may define a keyed shaft opening 330' extending between its first and second ends 326', 328' for receiving the corresponding drive shaft 150A, 150E of the drive system 134 (e.g., as shown in FIG. 18). As such, the drive shaft 150A, 150B may be configured to drive the first clutch drive member 316' (e.g., via a "V-shaped" key 332' configured to be received within or otherwise engage a corresponding "V-shaped" keyway (not shown) defined in the drive shaft 150A, 150B). Additionally, the first clutch drive member 316' includes a first spring support portion 334' and an elongated tube portion 336', with the shaft opening 330' being defined through both the first spring support portion 334' and the elongated tube portion 336'. As shown in FIGS. 17 and 19, the first spring support portion 334' may generally extend axially between a tapered end 338' and a radial flange 340' defined at or adjacent to the first end 326' of the first clutch drive member 316'. Similarly, the elongated tube portion 336' may extend axially from the tapered end 338' of the first spring support portion 334' to the second end 328' of the first clutch drive member 316'. Similar to the embodiment of the clutch assembly 160 described above, the first clutch spring 320' may be configured to be installed onto the first clutch drive member 316' such that the first clutch spring 320' is positioned onto and wrapped around an outer spring support surface 342' (FIG. 19) defined by the first spring support portion 334' (e.g., the surface extending axially between the flange 340' and the tapered end 338' of the first spring support portion 334') to create an interference fit between the clutch spring 320' and the outer spring support surface 342' of the first spring support portion 334'.

Moreover, in one embodiment, the first clutch drive member 316' may include one or more additional features to facilitate rotationally engaging the drive shaft 150A, 150B of the drive system 134. For instance, as particularly shown in FIG. 19, a set screw opening 343' may be defined through a portion of the first clutch drive member 316' (e.g., through the first spring support portion 334') for receiving a set screw 345' (FIG. 18), in such an embodiment, the set screw 345' may be screwed into the set screw opening 343' and tightened into the drive shaft 150A, 150B to couple the first clutch drive member 316' to the draft shaft 150A, 150B, thereby preventing or minimizing rotational lash or play between such components. As shown in FIG. 18, in one embodiment, a groove or recess 347' may be defined in the drive shaft 150A, 150B for receiving the end of the set screw 345', thereby providing a rotational locking or engagement feature between the set screw 345' and the drive shaft 150A, 150B.

Figure 20:
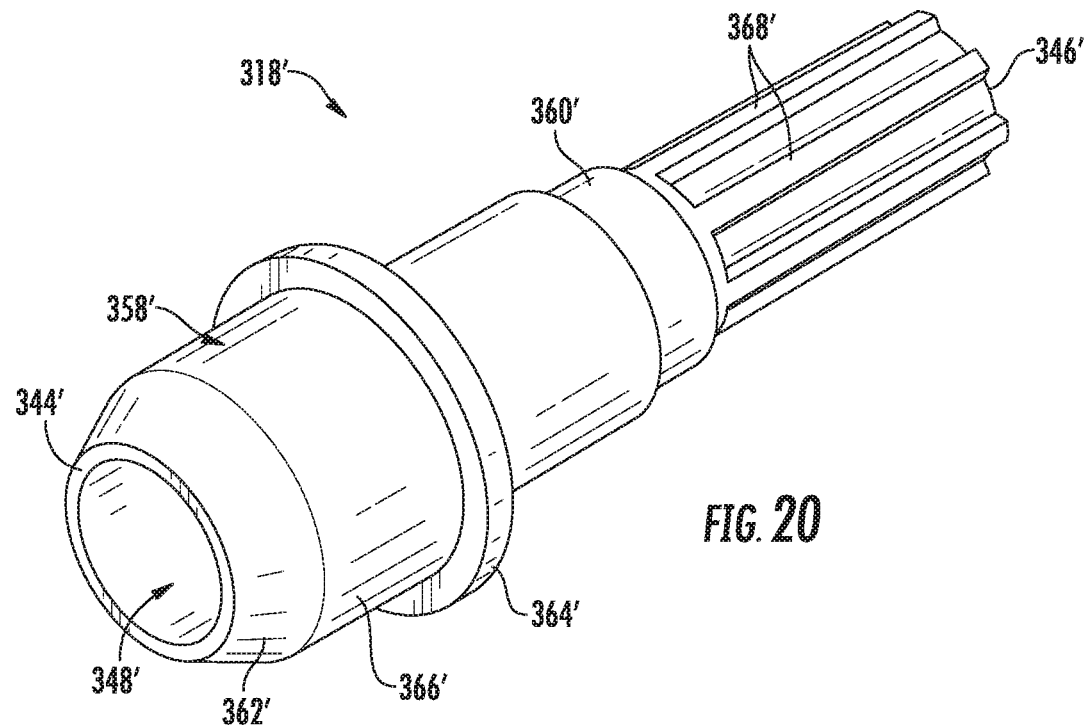
FIG. 20 illustrates a perspective view of a second clutch drive member of the clutch assembly shown in FIG. 17.

Additionally, as shown in FIGS. 17 and 20, the second clutch drive member 318' may be configured to extend axially between a first end 344' and a second end 346' and may define a pass-through opening 348' extending between its first and second ends 344', 346' for receiving both the elongated tube portion 336' of the first clutch drive member 316' and the corresponding drive shaft 150A', 150B' of the drive system 134' (e.g., as shown in FIG. 18). Specifically, in several embodiments, the pass-through opening 348' may be dimensioned or otherwise configured to receive the elongated tube portion 336' and the drive shaft 150A, 150B without rotationally engaging such components. For instance, as shown in FIG. 18, an inner diameter 350' of the axial portion of the pass-through opening 348' configured to receive the elongated tube portion 336' may be greater than a corresponding outer diameter 352' (FIG. 19) of the elongated tube portion 336', while the remainder of the pass-through opening 348' may define a minimum inner diameter 354' that is greater than a corresponding outer diameter 356' of the drive shaft 150A, 150B. Moreover, in one embodiment, the second clutch drive member 318' includes a second spring support portion 358' and an elongated drive portion 360', with the pass-through opening 348' being defined through both the second spring support portion 358' and the elongated drive portion 360'. As shown in FIG. 20, the second spring support portion 358' may extend axially between a tapered end 362' terminating at the first end 344' of the second clutch drive member 318' and a radial flange 364'. Similarly, the elongated drive portion 360' may extend axially from the radial flange 364' to the second end 346' of the second clutch drive member 318'. Similar to the embodiment of the clutch assembly 160 described above, the second clutch spring 322' may be configured to be installed onto the second clutch drive member 318' such that the second clutch spring 322' is positioned onto and wrapped around an outer spring support surface 366' of the second spring support portion 358' (e.g., the surface extending axially between the flange 364' and the tapered end 362 of the second spring support portion 358') to create an interference fit between the clutch spring 322' and the outer spring support surface 366' of the second spring support portion 358'.

Additionally, similar to the second clutch drive member 318 described above with reference to FIGS. 11 and 14, the elongated drive portion 360' of the second clutch drive member 318' may be configured to extend outwardly from the second end 306' of the housing member 302' (e.g., via the axial opening 315' defined through the housing member 302') to allow the elongated drive portion 360' to be received within and/or engage the corresponding drive rack assembly 148A', 148B' of the drive system 134. Moreover, as shown in FIG. 20, an axial section of the elongated drive portion 360 may include a plurality of radially outwardly extending splines 368' for engaging the rack gear 202' of the corresponding drive rack assembly 148A', 148B'. In such an embodiment, the splined section of the elongated drive portion 360' may be configured to be received within and engage the corresponding splined opening 248' of the rack gear 202' (FIG. 9) As such, rotational motion transmitted through the shutter's drive system 124 may be transferred from the second clutch drive member 318' to the drive rack assembly 148A', 148B' and vice versa as the shutter assembly 100 is operated via the motor 140 or manually.

Referring still to FIGS. 16-21, the clutch springs 320', 322' may generally be configured the same as the clutch springs 320, 322 described above. For instance, as shown in FIG. 17, the first clutch spring 320' includes a first coiled section 370' and a first spring tang 372' extending axially from the first coiled section 370', while the second clutch spring 322' includes a second coiled section 374' and a second spring tang 376' extending axially from the second coiled section 374'. Additionally, similar to the embodiment described above, each coiled section 370', 374' of the first and second clutch springs 320', 322' may define an enlarged end 378' at the axial end opposite the spring tang 372', 376' to facilitate installing the first and second springs 320', 322' onto the first and second clutch drive members 316', 318', respectively.

Similar to the embodiment described above, the dimensions and/or configuration of the clutch springs 320', 322' and/or the first and second clutch drive members 316', 318' may be selected so that the specific fit defined between each spring 320', 322' and its respective spring support portion 334', 358' provides for the torque springs 320', 322' to be associated with a desired slippage torque at which each spring 320', 322' may rotationally disengage from or otherwise slip relative to the outer spring support surface 342', 366' of the adjacent spring support portion 334', 358'. For instance, as described above, the desired slippage torque may be selected to be less than the output torque for the motor 140, but greater than the minimum torque required to operate or rotate the louvers 114 of each individual shutter panel 104A, 104B. Moreover, in one embodiment, the respective wires forming the coiled sections 370', 374' of the clutch springs 320', 322' may be wound in opposite directions to allow for one clutch spring to be tightened around its adjacent spring support surface 342', 366' while the other clutch spring is loosened relative to its adjacent spring support surface 342', 366' when the torque being transferred through the clutch assembly 160 exceeds the slippage torque for the springs 320', 322', thereby permitting the loosened clutch spring to slip and, thus, decouple the first clutch drive member 316' from the second clutch drive member 318'.

Figure 21:
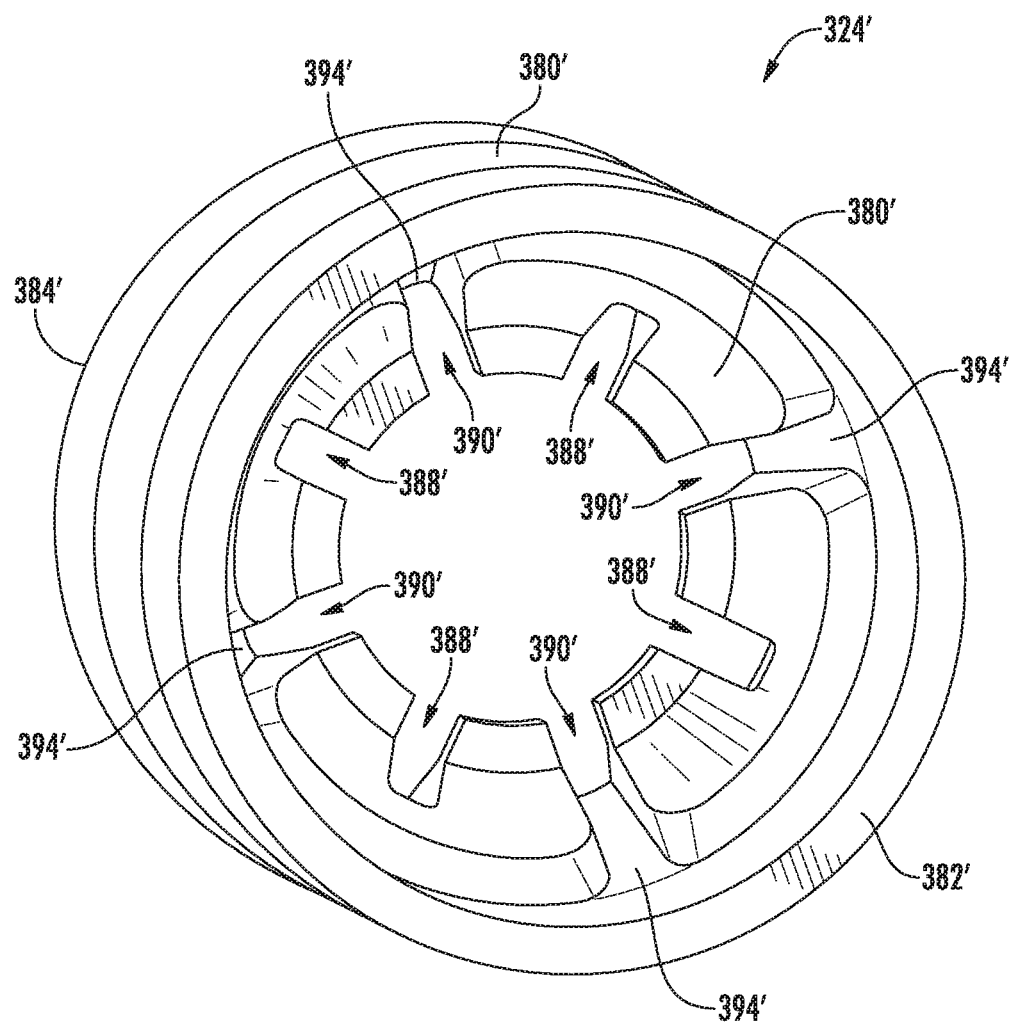
FIG. 21 illustrates a perspective view of a clutch sleeve of the clutch assembly shown in FIG. 17.

As shown in FIGS. 17 and 21, the clutch sleeve 324' may generally correspond to an elongated member having a cylindrically-shaped outer sleeve wall 380' extending axially between a first end 382' and a second end 384'. As shown in FIG. 18 the clutch sleeve 324' may be configured to encase or receive portions of the first and second clutch drive members 316', 318' when the clutch assembly 160 is assembled together so that all or substantially all of the spring support portions 334', 358' of the clutch drive members 316', 318' are received within and surrounded by the clutch sleeve 324'. In such an embodiment, each clutch spring 320', 322' may be positioned directly between outer sleeve wall 380' and the outer spring support surface 342', 366' of its respective spring support portion 334', 358', thereby allowing the outer sleeve wall 380' to limit the radially outward expansion of the clutch springs 320', 322' when either spring is being loosened relative to its corresponding spring support portion 334', 358'.

Additionally, similar to the clutch sleeve 324 described above with reference to FIG. 15, the clutch sleeve 324' includes a spring engagement portion 386' extending radially inwardly from the outer sleeve wall 380' that defines two or more engagement slots 388', 390' configured to receive the spring tang 372', 376' of each clutch spring 320', 322'. As shown in FIG. 21, unlike the embodiment described above, the spring engagement portion 386' includes four engagement slots 388', 390' (e.g., four slots 388' configured to receive the first spring tang 372' and four slots 390' configured to receive the second spring tang 376'). By assembling the clutch assembly 160' so that each spring tang 370', 372' is received within one of the engagement slots 388', 390', the clutch sleeve 324' may serve to transfer torque between the clutch springs 322', 324', thereby providing a torque coupling or bridge between the first and second clutch drive members 316', 318'. Moreover, in one embodiment, each engagement slot 388', 390' may be angled radially inwardly from the outer wall 380' to match the radial profile of the spring tang 370', 372' configured to be received within such slot 388', 390'. For instance, as shown in FIG. 18, the engagement slots 390' configured to receive the second spring tang 376' may each define an angled surface 392' extending radially inwardly from the outer wall 380 while the engagement slots 388' configured to receive the first spring tang 372' may also define an angled surface 394' extending radially inwardly from the outer wall 380'.

It should be appreciated that the clutch assemblies 160, 160' described above may provide certain advantages over conventional "slip clutches" that utilize a friction material to provide a friction/slip interface within the clutch. Specifically, such conventional clutches are typically subject to significant wear at the friction/slip interface as the clutch is operated over time. As such, due to the wear, these clutches must be periodically adjusted to maintain the required slippage force at the friction/slip interface. However, the disclosed clutch assemblies 160, 160' avoid such wear issues by utilizing clutch springs 320, 322, 320', 322' to selectively engage/disengage the associated clutch drive members 316, 318, 316', 318'. Since the interface between the clutch springs 320, 322, 320', 322' and the clutch drive members 316, 318, 316', 318' is subject to no or minimal wear, the clutch assemblies 160, 160' may be operated continuously over time without requiring any adjustments.

It should also be appreciated that, in other embodiments, the disclosed clutch assemblies 160, 160' may have any other suitable configuration that allows the clutch assemblies 160, 160' to function as described herein. For instance, in one alternative embodiment, the first and second clutch springs 320, 322, 320', 322' may be formed integrally as a single, unitary spring. Specifically, in such an embodiment, the first and second spring tangs 372, 376, 372', 376' may be formed from a single, continuous wire extending directly between the first and second coiled sections 370, 374, 370', 374', with the first coiled section 370, 370' being wrapped around the first clutch drive member 316, 316' so as to form all or part of the first torque transfer member and the second coiled section 374, 374' being wrapped around the second drive member 318, 318' so as to form all or part of the second torque transfer member.

In yet another embodiment, the clutch springs 320, 322, 320', 322' may be provided in a different positional relationship relative to the clutch drive members 316, 318, 316', 318'. For instance, in the embodiments shown in FIGS. 10-21, the clutch springs 320, 322, 320', 322' are installed on the clutch drive members 316, 318, 316', 318' so as to engage the outer diameter of the spring support sections 334, 358, 334', 358'. However, in other embodiments, the clutch drive members 316, 318, 316', 318' may be reconfigured to allow each clutch spring 320, 322, 320', 322' to engage or otherwise have an interference fit with an inner diameter of a portion of its respective clutch drive member 316, 318, 316', 318'. For instance, the spring support section 334, 358, 334', 358' of each clutch drive member 316, 318, 316', 318' may be formed as a sleeve or may otherwise define a pocket for receiving the associated clutch spring 320, 322, 320', 322' such that the clutch spring 320, 322, 320', 322' engages the inner diameter of the sleeve or pocket. In such an embodiment, the interference fit between each clutch spring 320, 322, 320', 322' and the inner diameter of the associated clutch drive member 316, 318, 316', 318' may determine the slippage torque for the clutch assembly 160, 160'. Alternatively, a combination of inner and outer interference fits may be provided within the clutch assembly 160, 160'. For example, one of the clutch springs 320, 322, 320', 322' may be configured to form an interference fit with an outer diameter of its respective clutch drive member 316, 318, 316', 318' while the other clutch spring 320, 322, 320', 322' may be configured to form an interference fit with an inner diameter of its respective clutch drive member 316, 318, 316', 318'.

Referring now to FIGS. 22-25, several views of one illustrative embodiment of a coupling assembly 132 suitable for use within the disclosed shutter assembly 100 are illustrated in accordance with aspects of the present subject matter. It should be appreciated that the coupling assembly 132 may, in one embodiment, illustrate aspects of the first coupling assembly 132A and/or the second coupling assembly 132B described above with reference to FIGS. 1-3.

As indicated above with reference to FIG. 3, each coupling assembly 132 of the shutter assembly 100 may be configured to be driven by the respective drive shaft 150A, 150B extending within its associated shutter panel 104A, 104B. Additionally, each coupling 132 may be configured to installed within or on its associated shutter panel 104A, 1.04B so that the coupling assembly 132 engages a corresponding coupling assembly 132 installed within the adjacent shutter panel 104A, 104B at the panel-to-panel interface 110 defines between the shutter panels 104A, 104B. Thus, when engaged with each other, the coupling assemblies 132 may be configured to transfer rotational motion or torque from the first drive shaft 150A to the second drive shaft 150B across the panel to panel interface 110.

Figure 22:
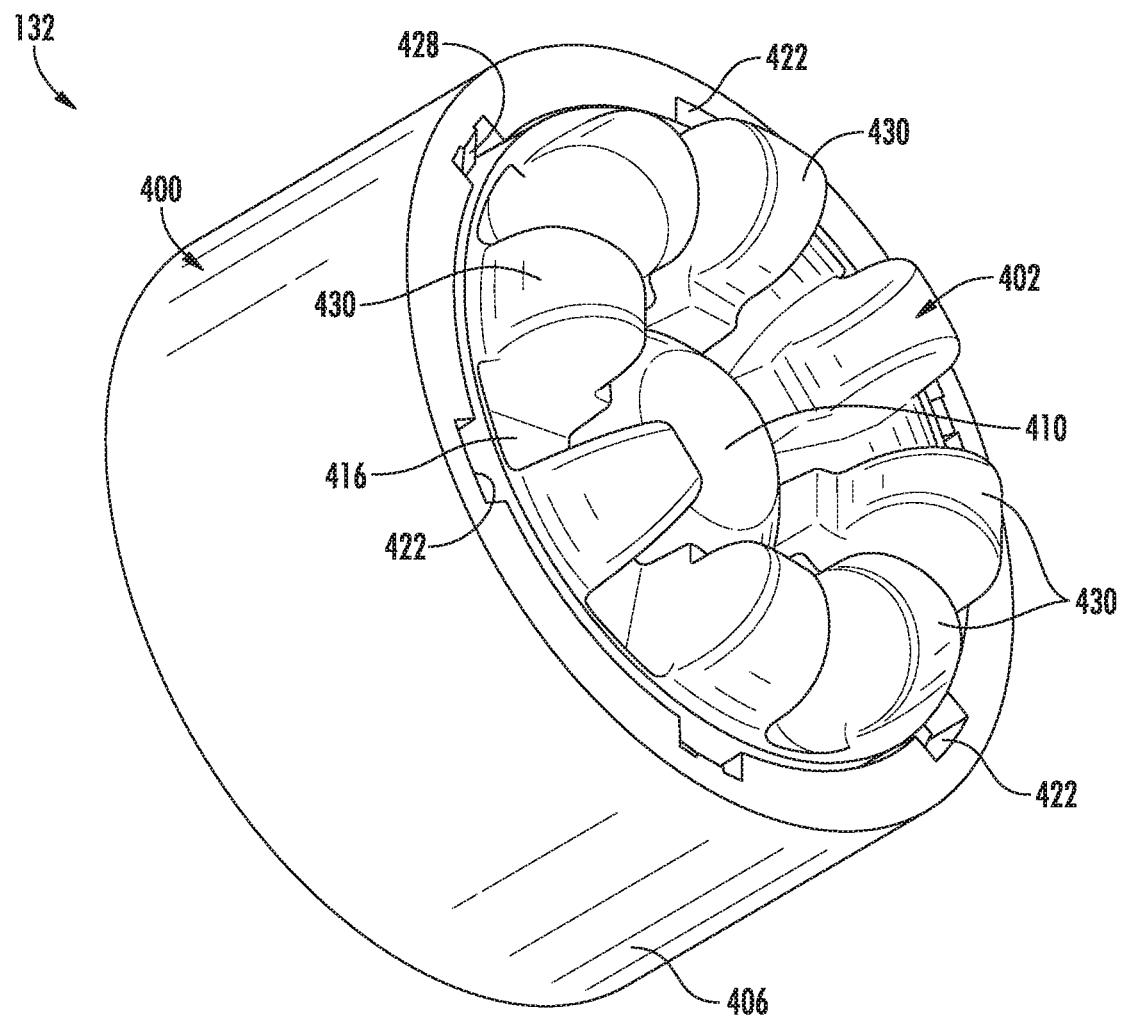
FIG. 22 illustrates a perspective, assembled view of one illustrative embodiment of a coupling assembly suitable for use within the disclosed shutter assembly in accordance with aspects of the present subject matter.
Figure 23:
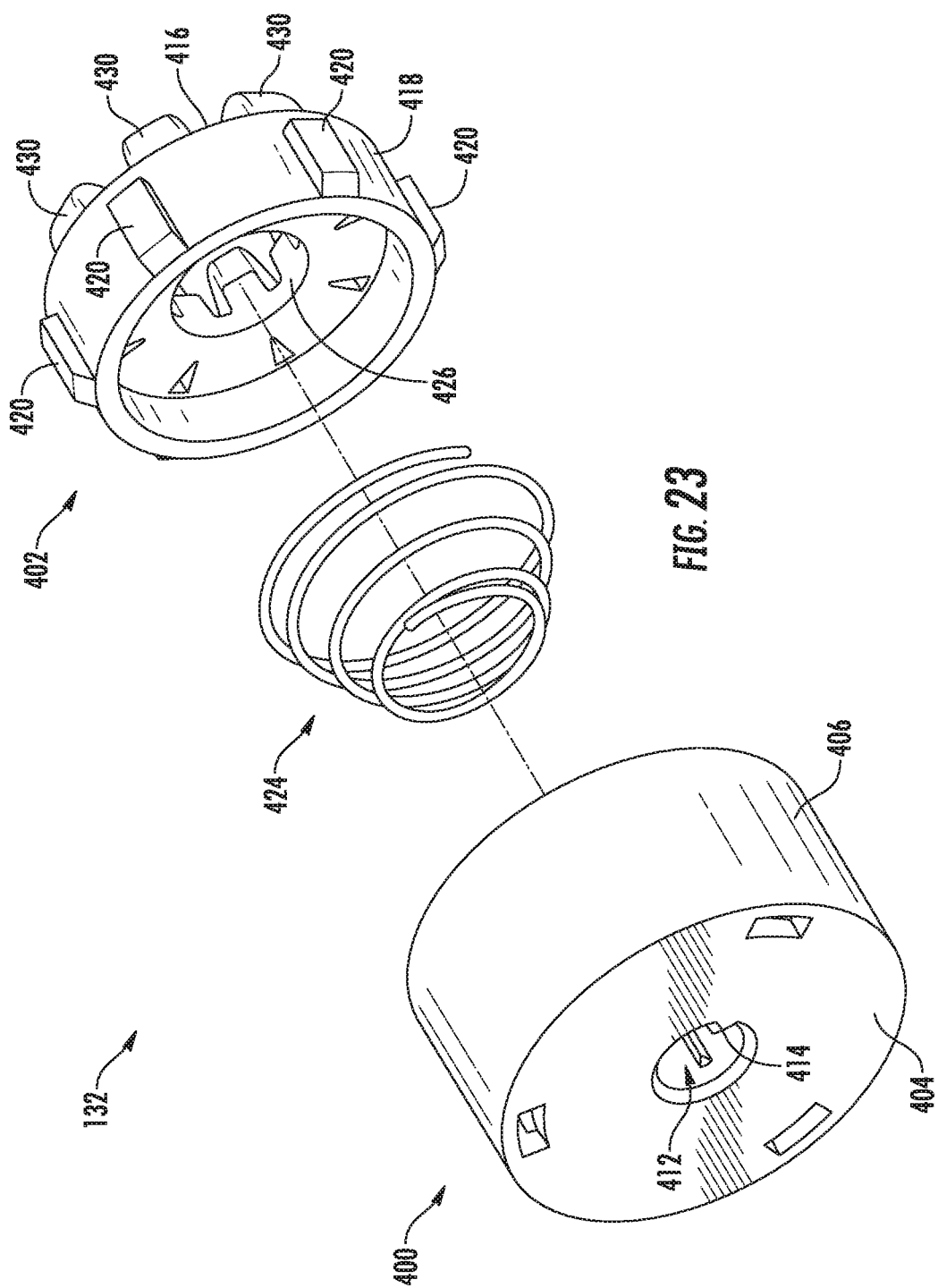
FIG. 23 illustrates a perspective, exploded view of the coupling assembly shown in FIG. 22.
Figure 24:
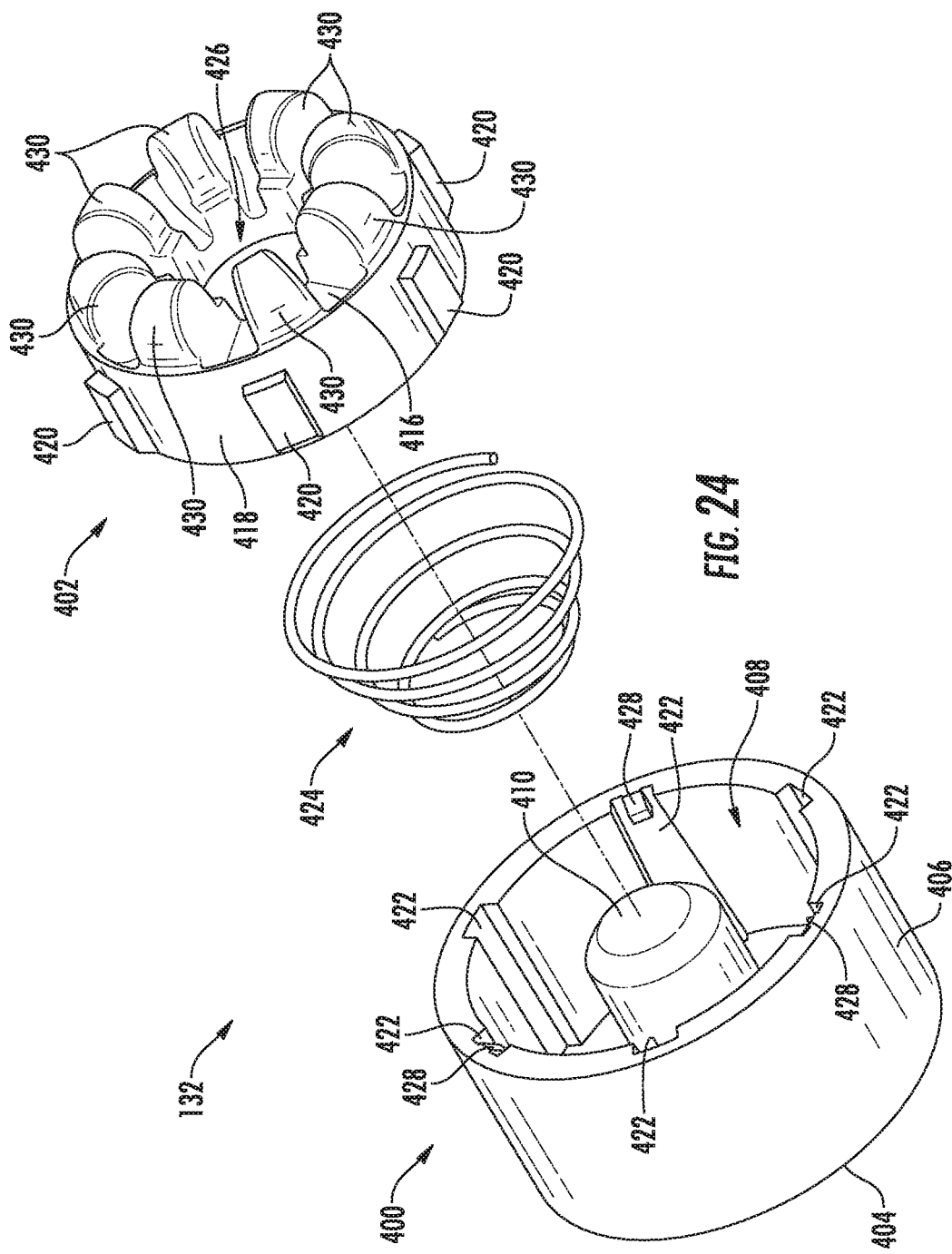
FIG. 24 illustrates another perspective, exploded view of the coupling assembly shown in FIG. 22.

As shown in FIGS. 22-24, each coupling assembly 132 includes a coupling base 400 and a spring-loaded coupler 402 configured to be received within coupling base 400. In general, the coupling base 400 includes a base wall 404 and a cylindrical outer wall 406 extending outwardly from the base wall 404. In the embodiment of FIGS. 22-24, the outer wall 406 defines a cylindrically-shaped open volume 408 (FIG. 24) for receiving the coupler 402. Additionally, as shown in FIGS. 23 and 24, the coupling base 400 includes a central projection 410 (FIG. 24) extending outwardly from the base wall 404 that defines a shaft opening 412 (FIG. 23) for receiving a corresponding drive shaft 150A, 150B of the drive system 134. As particularly shown in FIG. 23, in one embodiment, the shaft opening may be keyed or otherwise configured (e.g., by including a "V-shaped" key 414) so that the drive shaft 150A, 150B engages the coupling base 400 when the drive shaft 150A, 150B is received within the shaft opening 412. Thus, rotational motion or torque may be transferred from the drive shaft 150A, 150B to the coupling base 400 and vice versa.

Figure 25:
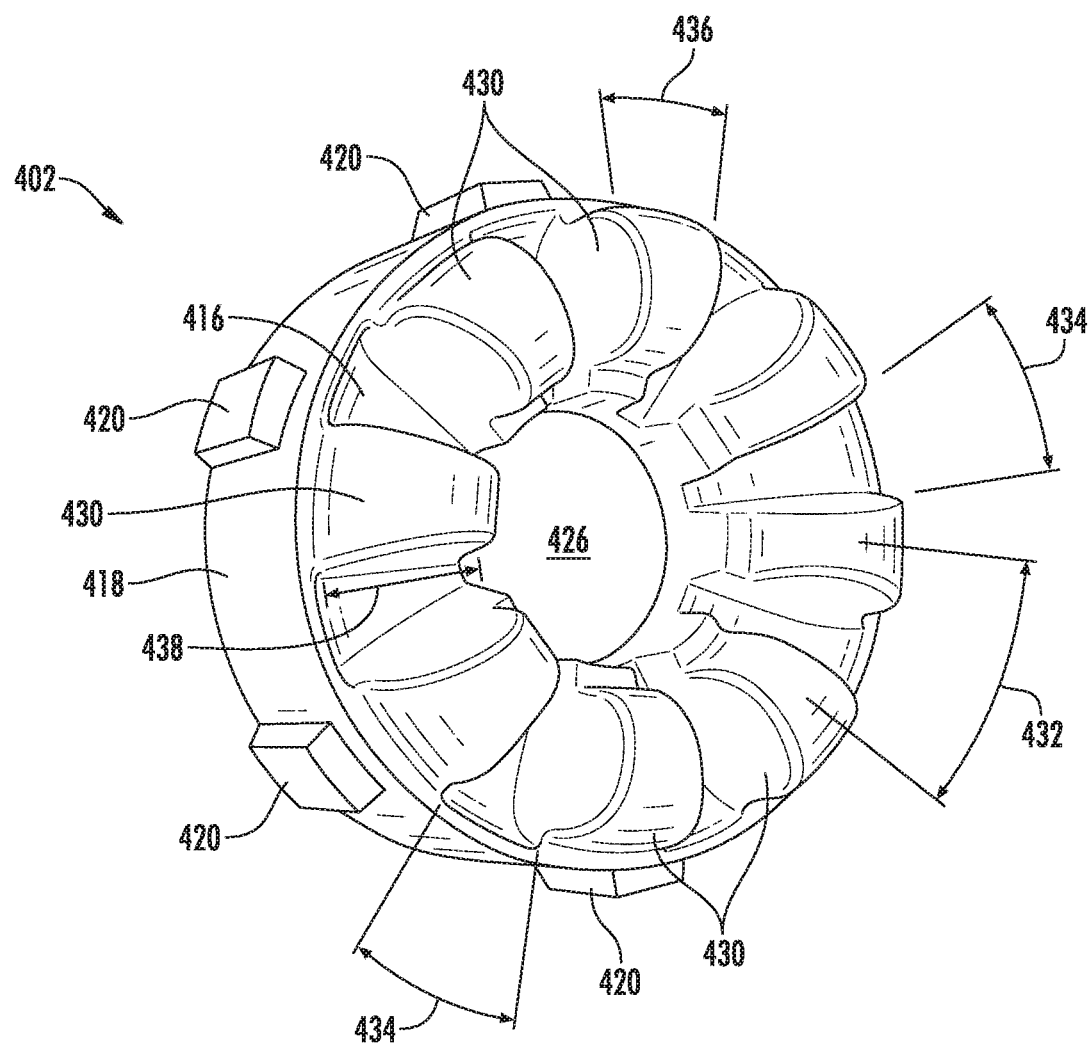
FIG. 25 illustrates a perspective view of a coupler of the coupling assembly shown in FIG. 22.

Additionally, as shown in FIGS. 23-25, the coupler 402 includes an end wall 416 and a cylindrical outer wall 418 extending outwardly from the end wall 416. As shown in the illustrated embodiment, the outer wall 418 of the coupler 402 includes a plurality of engagement flanges 420 extending outwardly therefrom, with each flange 402 being configured to be received within a corresponding slot or channel 422 of the coupling base 400. Thus, when the coupler 402 is installed relative to the coupling base 400, the coupling base 400 may engage the coupler 402 via the interaction between the channels 422 and corresponding flanges 420, thereby allowing the coupler 402 to rotate together with both the coupling base 400 and the associated drive shaft 150A, 150B.

The configuration of the channels 422 and the flanges 420 may also allow for the coupler 402 to slide or move axially relative to the coupling base 400, thereby permitting the coupler 402 to move towards and away from the base wall 404 of the coupling base 400. For instance, as shown in FIGS. 23 and 24, the coupling assembly 132 includes a spring 424 (e.g., a tapered spring) configured to be positioned between the coupling base 400 and the coupler 402 (e.g., between the base wall 404 of the coupling base 400 and the end wall 416 of the coupler 402) to bias the coupler 402 outwardly away from the base wall 404 of the coupling base 404. However, by providing the axially extending channels 422 and flanges 420, the coupler 402 may be moved axially towards the base wall 404 of the coupling base 404 by pushing the coupler 402 inwardly within the coupling base 400 in a manner that compresses the spring 424. In this regard, as shown in FIG. 25, the coupler 402 defines a central opening 426 through its end wall 416 that is configured to receive the central projection 410 of the coupling base 400 as the coupler 402 is moved axially relative to the coupling base 400. It should also be appreciated that the coupling base 400 also includes a stop(s) 428 (FIG. 24) (e.g., at the open ends of the channels 422) to limit the axial movement of the coupler 402 in the direction away from the base wall 404 of the coupling base 400.

Moreover, the coupler 402 also includes a plurality of axially extending engagement ribs 430 projecting outwardly from its end wall 416. As shown in FIG. 25, in one embodiment, the engagement ribs 430 may be provided in an annular array around the central opening 426 of the coupler 402, with each rib 430 being circumferentially spaced apart from adjacent ribs 430. For instance, in the illustrated embodiment, the coupler 402 includes eight ribs 430 spaced apart equally around the annular array so that an offset angle 432 of forty-five degrees is defined between the circumferential centerlines of adjacent ribs 430. However, in other embodiments, the coupler 402 may include more or less than eight ribs 430, with the ribs 430 having any other suitable circumferential spacing.

Additionally, as shown in FIG. 25, due to the circumferential spacing of the ribs 430, a circumferential gap 434 may be defined between each pair of adjacent ribs 430. In one embodiment, the circumferential width or dimension of each circumferential gap 434 may be selected so as to be greater than a corresponding circumferential width 436 of each rib 430. As such, when adjacent coupling assemblies 132 are positioned end-to-end at the panel-to-panel interface 110 defined between the shutter panels 104A, 104B, the ribs 430 of each coupler 402 may be received within the circumferential gaps 434 defined between the ribs 430 of the adjacent coupler 402, thereby allowing the coupling assemblies 132 to engage each other and transfer rotational motion or torque across the panel-to-panel interface 110. Moreover, in one embodiment, the width or dimension of each circumferential gap 434 may be selected so as to be less than a given radial dimension of each rib 430 (e.g., a radial height 438 (FIG. 25) of each rib 430). Such dimensioning of the ribs 430 and corresponding circumferential gaps 434 may ensure that the adjacent coupling assemblies 132 engage each other properly when the shutter panels 104A, 104B are moved to their closed position and may also facilitate engagement of the coupling assemblies 132 when such assemblies 132 are initially misaligned.

It should be appreciated that, in the event that the couplers 402 of adjacent coupling assemblies 132 are not properly aligned when the shutter panels 104A, 104B are moved to the closed position (e.g., the ribs 430 of one coupler 402 are not aligned with the circumferential gaps 434 of the adjacent coupler 402), subsequent rotation of one of the drive shafts 150A, 150B (e.g. by the motor 140 or manually) may result in the adjacent couplers 402 becoming aligned and engaging each other. For example, with the motor 140 of the shutter assembly 100 being coupled to the first drive shaft 150A, the motor 140 may rotate the first drive shaft 150A relative to the second drive shaft 150B until the coupler 402 of the first coupling assembly 132A is properly aligned with the coupler 402 of the second coupling assembly 132B, at which point the springs 424 contained within each coupling assembly 132A, 132B may force the adjacent couplers 402 towards each other and into engagement to allow the rotation of the first drive shaft 150A to be transferred to the second drive shaft 150B.

Referring now to FIGS. 26-29, several views of another illustrative embodiment of a coupling assembly 132' suitable for use within the disclosed shutter assembly 100 are illustrated in accordance with aspects of the present subject matter. Specifically, FIGS. 26-29 generally correspond to similar views of the coupling assembly 132' as those shown above for coupling assembly 132 (i.e., in FIGS. 22-25). In general, the coupling assembly 132' shown in FIGS. 26-29 and its associated components are configured similar to the various components of the coupling assembly 132 described above. As such, the components or features of the coupling assembly 132' that are the same or similar to corresponding components or features of the coupling assembly 132 described above with reference to FIGS. 22-15 will be designated by the same reference character with an apostrophe (') added. Additionally, when a given component or feature of the coupling assembly 132' is configured to generally perform the same function as the corresponding component or feature of the coupling assembly 132 described above with reference to FIGS. 22-25, a less detailed description of such component/feature will be provided with reference to FIGS. 26-29 for the sake of brevity.

Figure 26:
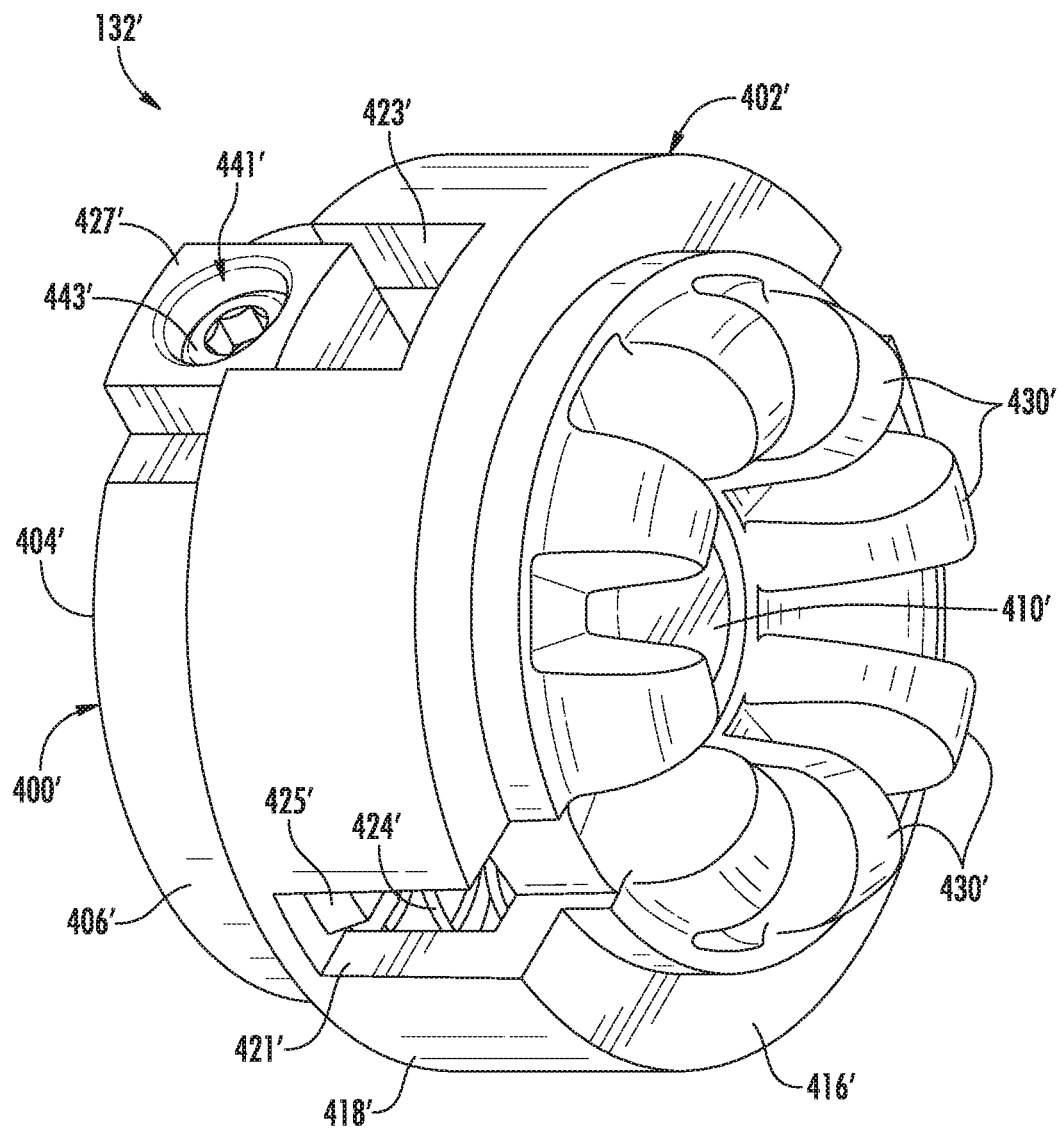
FIG. 26 illustrates a perspective, assembled view of another illustrative embodiment of a coupling assembly suitable for use within the disclosed shutter assembly in accordance with aspects of the present subject matter.
Figure 27:
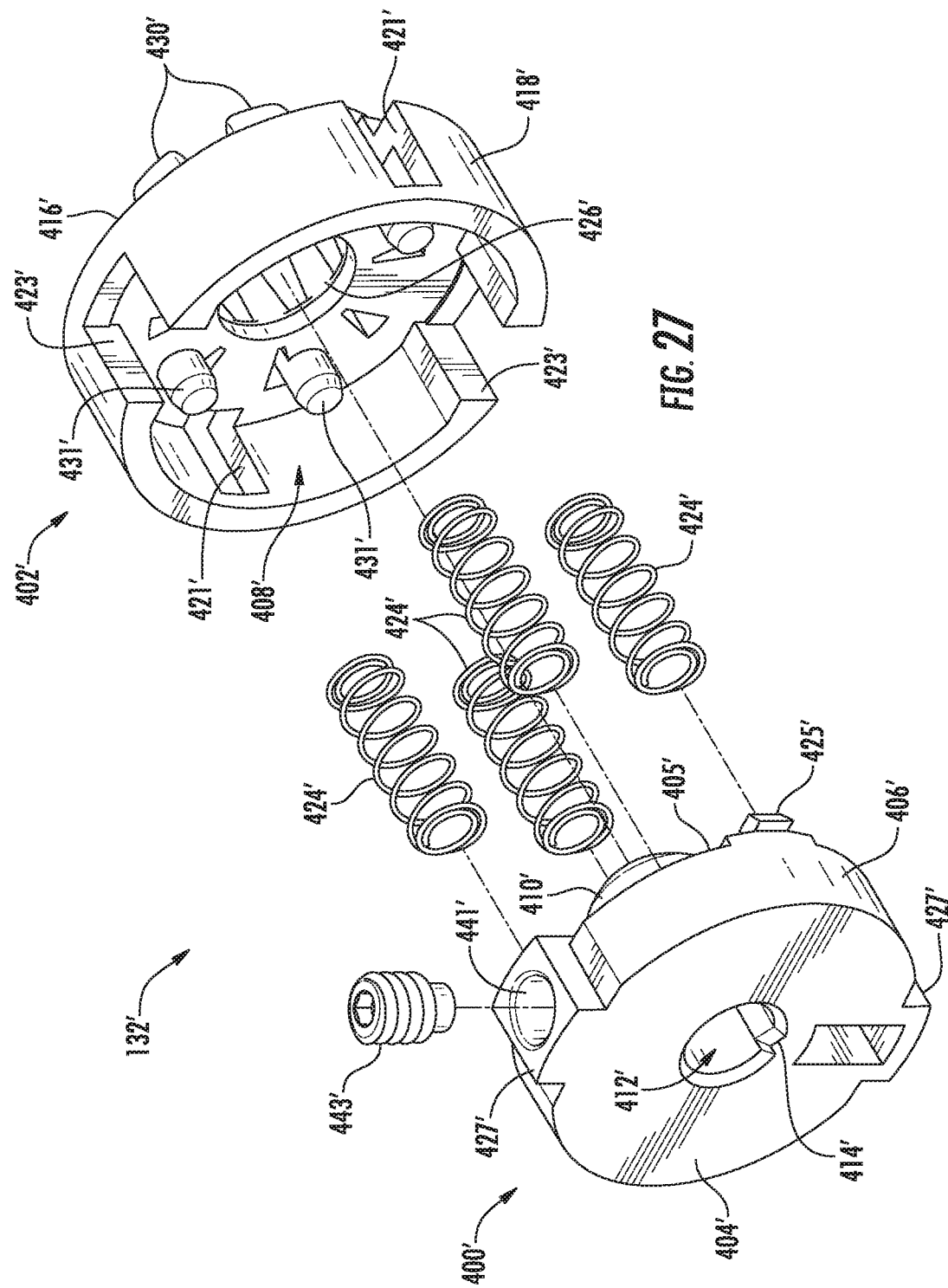
FIG. 27 illustrates a perspective, exploded view of the coupling assembly shown in FIG. 26.
Figure 28:
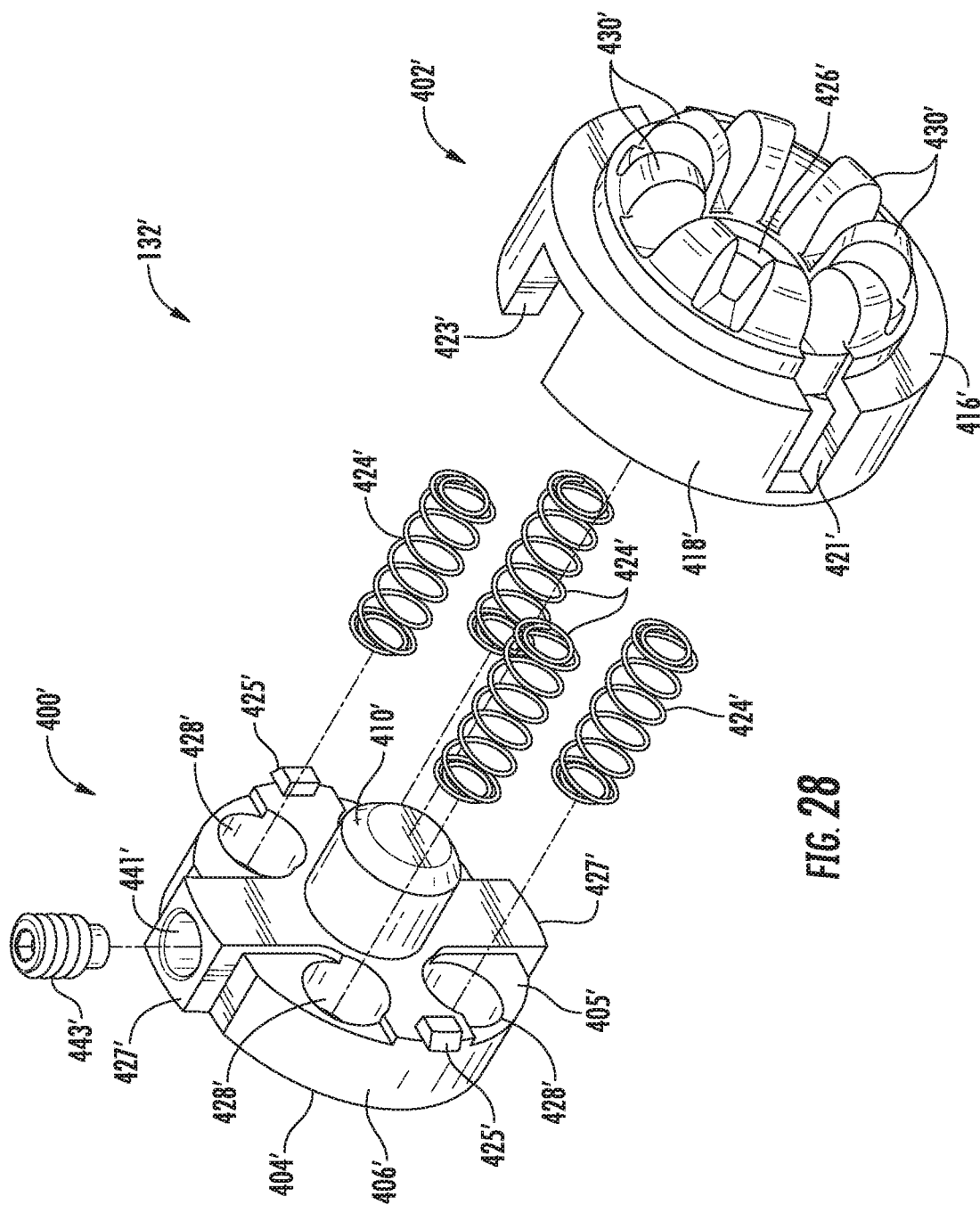
FIG. 28 illustrates another perspective, exploded view of the coupling assembly shown in FIG. 26.

As shown in FIGS. 26-28, the coupling assembly 132' includes a coupling base 400' and a spring-loaded coupler 402' configured to be coupled to the coupling base 400'. In general, the coupling base 400' includes a first base wall 404', an opposed second base wall 405', and a cylindrical outer wall 406' extending between the base walls 404', 405' such that the coupling base 400' forms a cylindrically-shaped component. Additionally, as shown in FIGS. 27 and 28, the coupling base 400' includes a central projection 410' (FIG. 24') extending outwardly from the second base wall 405' that at least partially defines a shaft opening 412' (FIG. 27) for receiving a corresponding drive shaft 150A, 150B of the drive system 134. As particularly shown in FIG. 27, in one embodiment, the shaft opening 412' may be keyed or otherwise configured (e.g., by including a "V-shaped" key 414') so that the drive shaft 150A, 150B engages the coupling base 400' When the drive shaft 150A, 150B is received within the shaft opening 412'.

Figure 29:
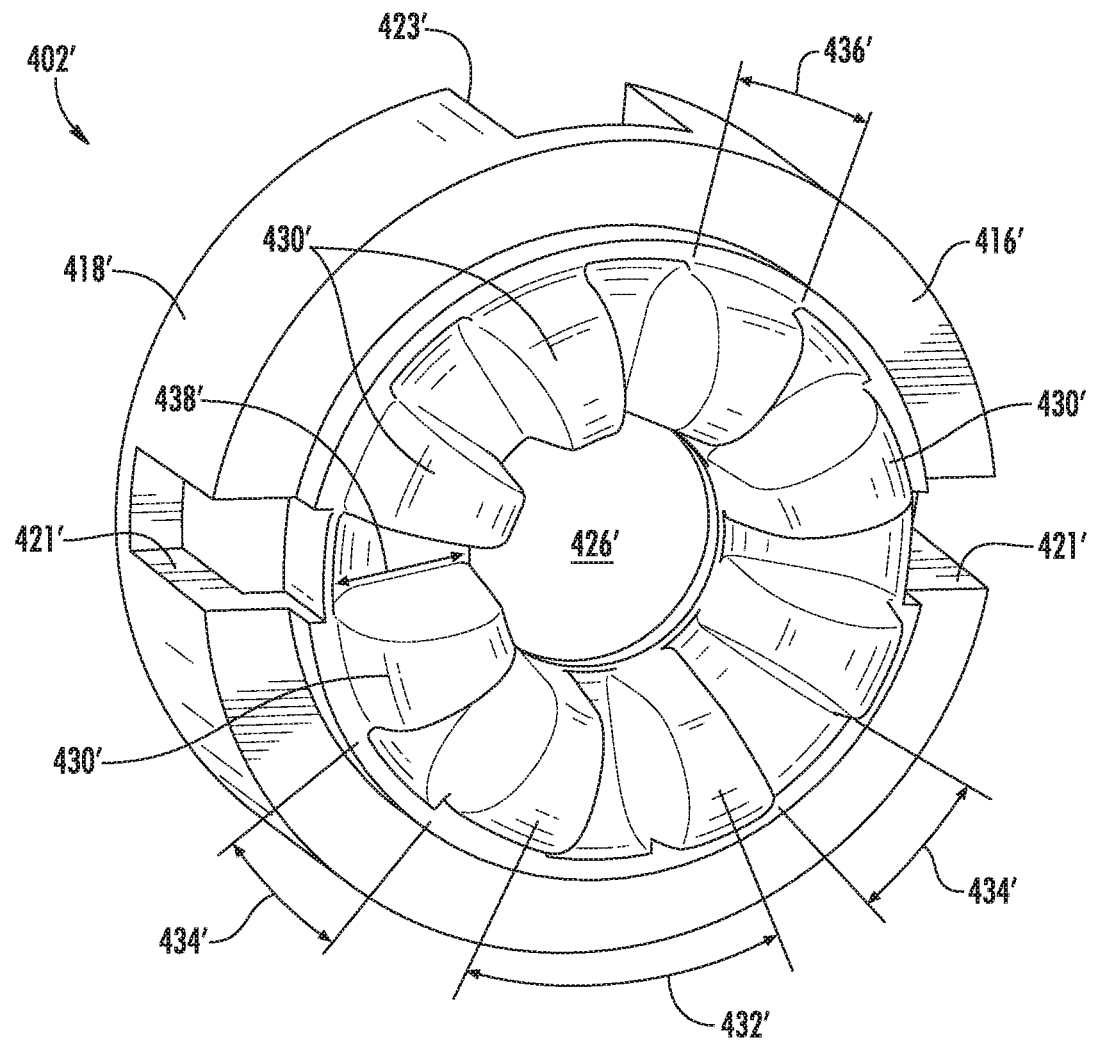
FIG. 29 illustrates a perspective view of a coupler of the coupling assembly shown in FIG. 26.

Additionally, as shown in FIGS. 27-29, the coupler 402' includes an end wall 416' and a cylindrical outer wall 418' extending outwardly from the end wall 416' such that the outer wall 418' defines a cylindrically-shaped open volume 408' (FIG. 27) for at least partially receiving the coupling base 400'. As shown in the illustrated embodiment, the outer wall 418' of the coupler 402' defines a plurality of engagement recesses 421', 423', with each recess 421', 423' being configured to receive a corresponding feature 425', 427' of the coupling base 400. For instance, as shown in FIGS. 28 and 29, a pair of closed-end recesses 421' are defined in the outer wall 418' that are configured to receive corresponding engagement tabs 425' projecting radially outwardly from the second base wall 405' of the coupling base 400'. Similarly, a pair of open-end recesses 423' are defined in the outer wall 418' that are configured to receive corresponding engagement flanges 427' projecting radially outwardly from the outer wall 406' of the coupling base 400'. Thus, when the coupler 402' is installed relative to the coupling base 400', the coupling base 400' may engage the coupler 402' via the interaction between the recesses 421', 423' and corresponding engagement features 425', 427', thereby allowing the coupler 402' to rotate together with both the coupling base 400' and the associated drive shaft 150A, 150B.

The configuration of the recesses 421', 423' and corresponding engagement features 425', 427' may also allow for the coupler 402' to slide or move axially relative to the coupling base 400', thereby permitting the end wall 416' of the coupler 402' to move towards and away from the coupling base 400'. For instance, as shown in FIGS. 27 and 28, the coupling assembly 132 includes a plurality of springs 424' configured to be positioned between the coupling base 400' and the coupler 402' (e.g., between the first base wall 404' of the coupling base 400' and the end wall 416' of the coupler 402') to bias the end wall 416' of the coupler 402' outwardly away from the coupling base 404'. Additionally, the end wall 416' of the coupler 402' may be moved axially towards the second base wall 405' of the coupling base 400' by pressing the components together in a manner that compresses the springs 424'. In this regard, as shown in FIGS. 27 and 28, the coupler 402' defines a central opening 426' through its end wall 416' that is configured to receive the central projection 410' of the coupling base 400' as the coupler 402' is moved axially relative to the coupling base 400'. It should also be appreciated that the engagement tabs 425' of the coupling base 400' may be configured as stops that serve to limit the axial movement of the coupler 402' in the direction away from the second base wall 405' of the coupling base 400'. For instance, the engagement tabs 425' of the coupling base 400' may contact the closed ends of the recesses 421' to prevent further axial movement of the coupler 402' away from the second base wall 405' of the coupling base 400'.

The coupling assembly 132' may also include one or more features for retaining the springs 424' in position between the coupling base 400' and the coupler 402'. For instance, as shown in FIG. 28, the coupling base 400' may include spring openings 428' defined therein that extend inwardly from the second base wall 405'. Additionally, as shown in FIG. 27, the coupler 402' may include spring posts 431' extending from its end wall 416' within the cylindrically-shaped open volume 408' defined by the outer wall 418' of the coupler 402'.

In such an embodiment, when installing the springs 424' with the coupling assembly 132', one end of each spring 424' may be installed over a corresponding spring post 431' of the coupler 402' while the opposed end of such spring 424' may be received within a corresponding spring opening 429' of the coupling base 400'.

Moreover, the coupler 402' also includes a plurality of axially extending engagement ribs 430' projecting outwardly from its end wall 416'. As shown in FIG. 29, in one embodiment, the engagement ribs 430' may be provided in an annular array around the central opening 426' of the coupler 402', with each rib 430' being circumferentially spaced apart from adjacent ribs 430'. For instance, similar to the coupler 402 described above, the coupler 402' includes eight ribs 430' spaced apart equally around the annular array so that an offset angle 432' of forty-five degrees is defined between the circumferential centerlines of adjacent ribs 430'. Additionally, as shown in FIG. 29, due to the circumferential spacing of the ribs 430, a circumferential gap 434' may be defined between each pair of adjacent ribs 430'. In one embodiment, the circumferential width or dimension of each circumferential gap 434' may be selected so as to be greater than a corresponding circumferential width 436' of each rib 430' to allow the ribs 430' of one coupler 402' to be received within the circumferential gaps 434' defined between the ribs 430' of an adjacent coupler 402', thereby permitting a pair of coupling assemblies 132' to engage each other and transfer rotational motion or torque across the panel-to-panel interface 110. Moreover, in one embodiment, the width or dimension of each circumferential gap 434' may be selected so as to be less than a given radial dimension of each rib 430' (e.g., a radial height 438' (FIG. 29) of each rib 430') to ensure that the adjacent coupling assemblies 132' engage each other properly when the shutter panels 104A, 104B are moved to their closed position and to facilitate engagement of the coupling assemblies 132' when such assemblies 132' are initially misaligned.

It should be appreciated that, in one embodiment, the coupling assembly 132' may include one or more features in addition to the shaft opening 412' to facilitate rotationally engaging the drive shaft 150A, 150B of the drive system 134. For instance, as particularly shown in FIGS. 27 and 28, a set screw opening 441' may be defined through a portion of the coupling base 200 (e.g., through one of the flanges 427') for receiving a set screw 443'. In such an embodiment, the set screw 443' may be screwed into the set screw opening 441' and tightened into the drive shaft 150A, 150B to securely couple the coupling assembly 132' to the draft shaft 150A, 150B, thereby preventing or minimizing rotational lash or play between such components. Additionally, in such an embodiment, a corresponding groove or recess 445' (FIG. 18) may be defined in the drive shaft 150A, 150B for receiving the end of the set screw 443', thereby providing a rotational locking or engagement feature between the set screw 443' and the drive shaft 150A, 150B.

Figure 32:
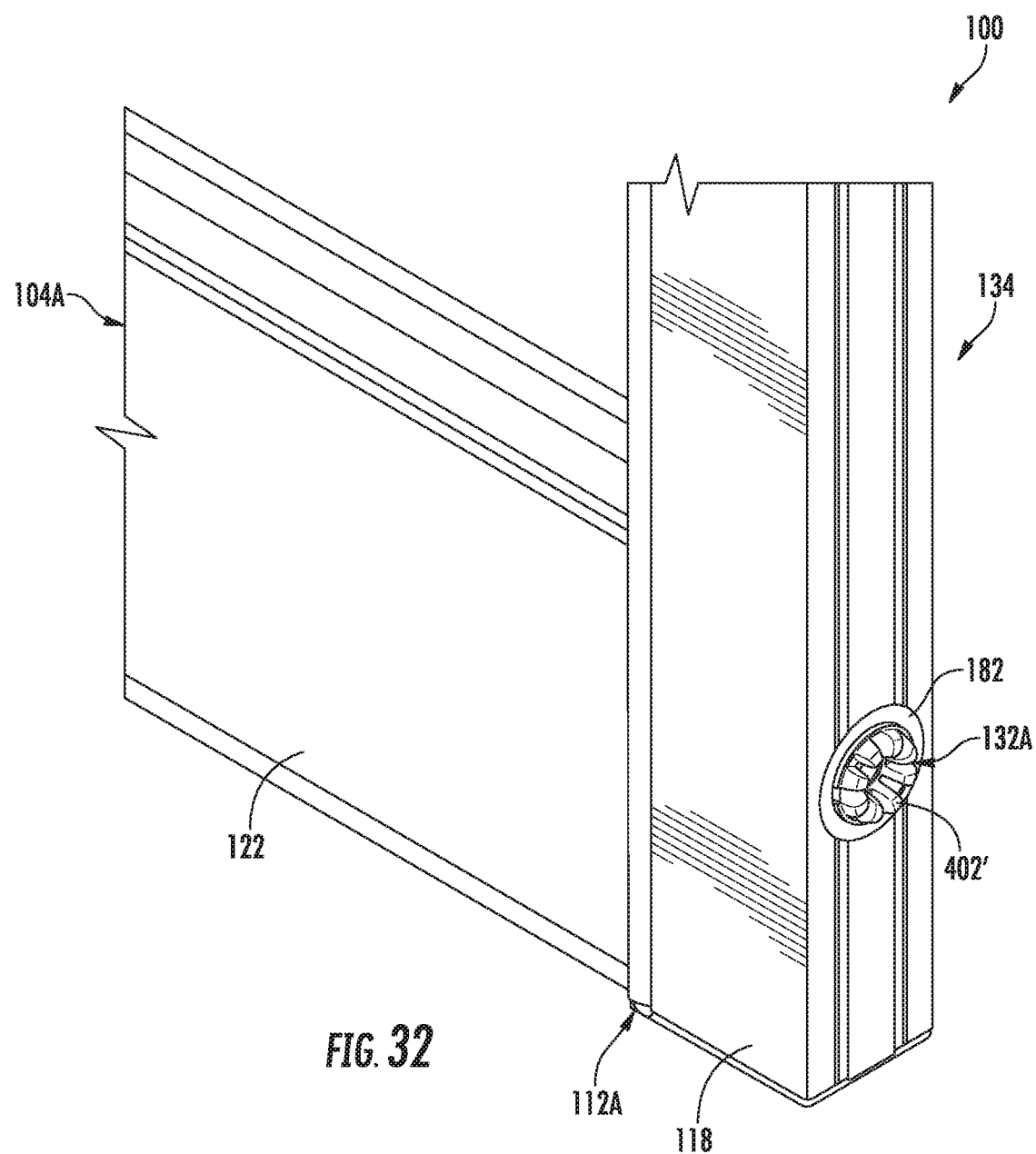
FIG. 32 illustrates a perspective view of one embodiment of a coupling assembly installed within a stile of a shutter panel in accordance with aspects of the present subject matter.
Figure 33:
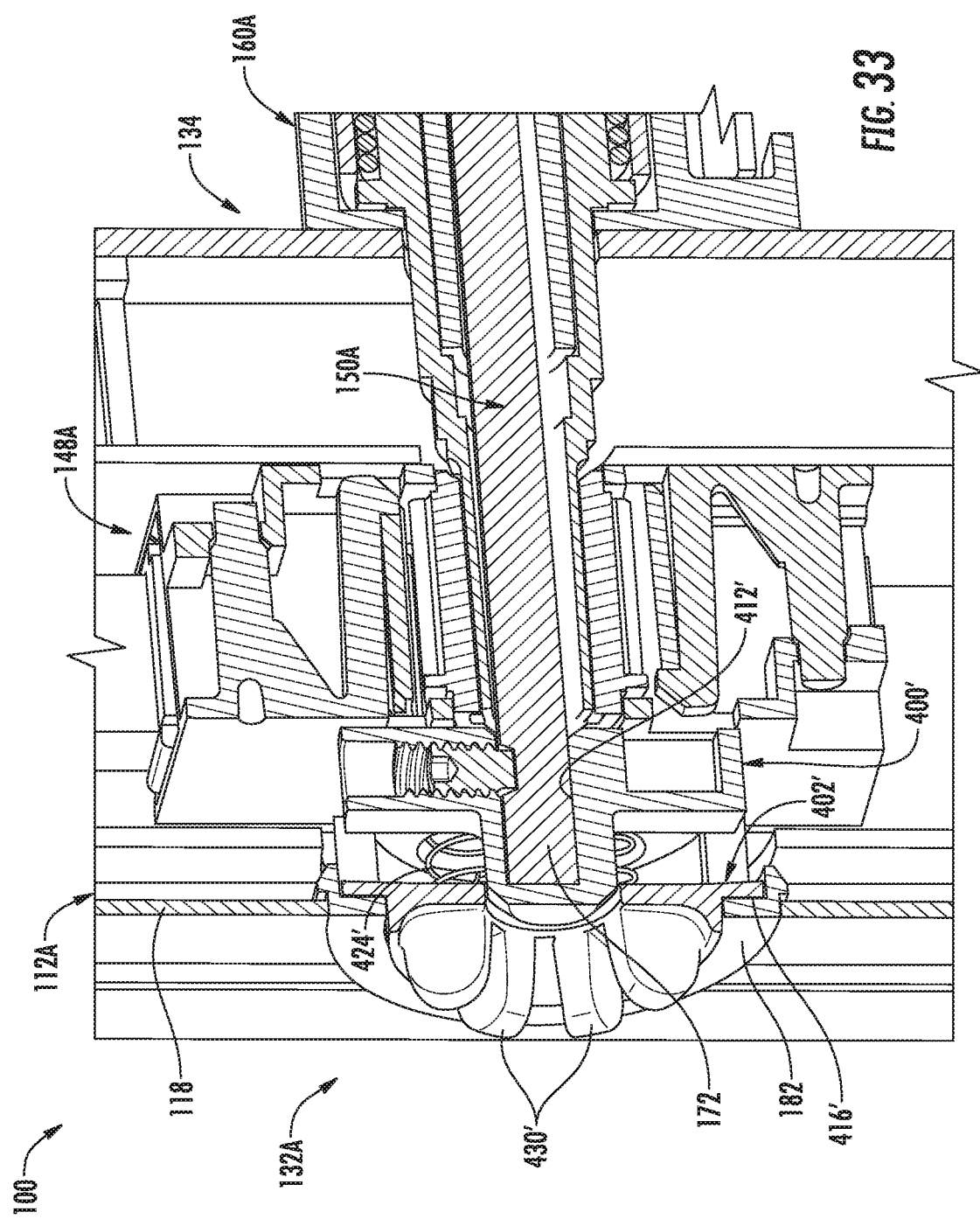
FIG. 33 illustrates a cross-sectional view of a portion of the coupling assembly shown in FIG. 32.
Figure 34:
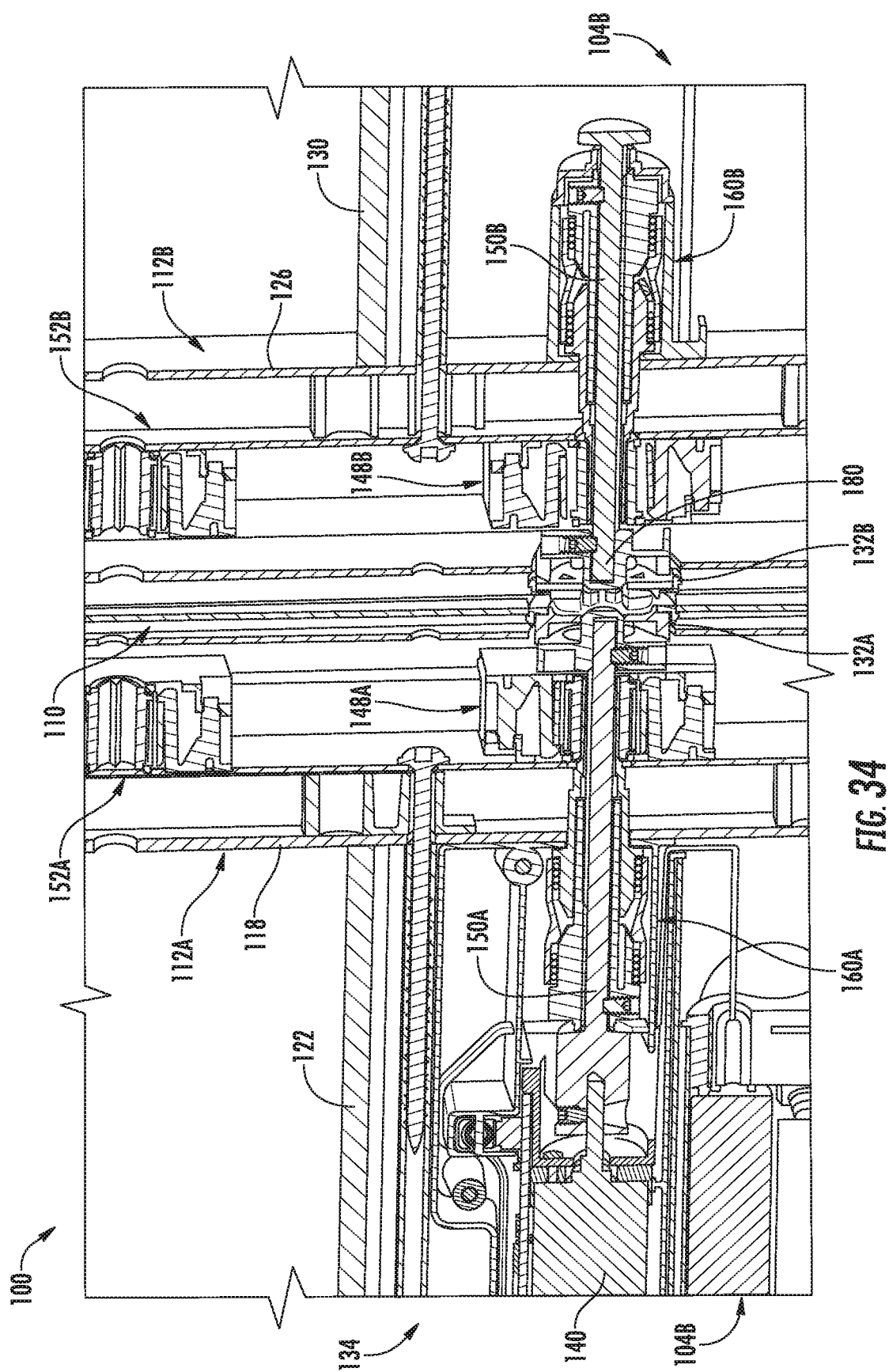
FIG. 34 illustrates a cross-sectional view of one embodiment of various drive system components installed within adjacent shutter panels in accordance with aspects of the present subject matter.

The assembled configuration and operation of one illustrative embodiment of the drive system 134 for the disclosed motorized shutter assembly 100 will now be described with reference to FIGS. 30-33. Specifically, FIGS. 30-33 illustrate several assembled views of one illustrative embodiment of various drive system components installed within the first shutter panel 104A of the disclosed shutter assembly 100, such as the motor 140, the first drive shaft 150A, the first clutch assembly 160A, the first drive rack assembly 148A, one of the first driven rack assemblies 152A, and the first coupling assembly 132A. Additionally, FIG. 34 illustrates an assembled view of various drive system components installed within both the first shutter panel 104A and the second shutter panel 104B of the disclosed shutter assembly 100, particularly illustrating the drive system components positioned at or adjacent to the panel-to-panel interface 110 defined between the shutter panels 104A, 104B. It should be appreciated that, for purposes of illustration, the clutch assemblies shown in FIGS. 30-33 are illustrated as being configured in accordance with the embodiment of the clutch assembly 160' shown in FIGS. 16-21, the drive and driven rack assemblies shown in FIGS. 30-33 are illustrated as being configured in accordance with the embodiments of the rack assemblies 148', 152' shown in FIGS. 8 and 9 and FIGS. 6 and 7, respectively, and the coupling assemblies shown in FIGS. 30-33 are illustrated as being configured in accordance with the clutch assembly 132' shown in FIGS. 26-29. However, in other embodiments, such components may have any other suitable configuration consistent with the disclosure provided herein.

Figure 30:
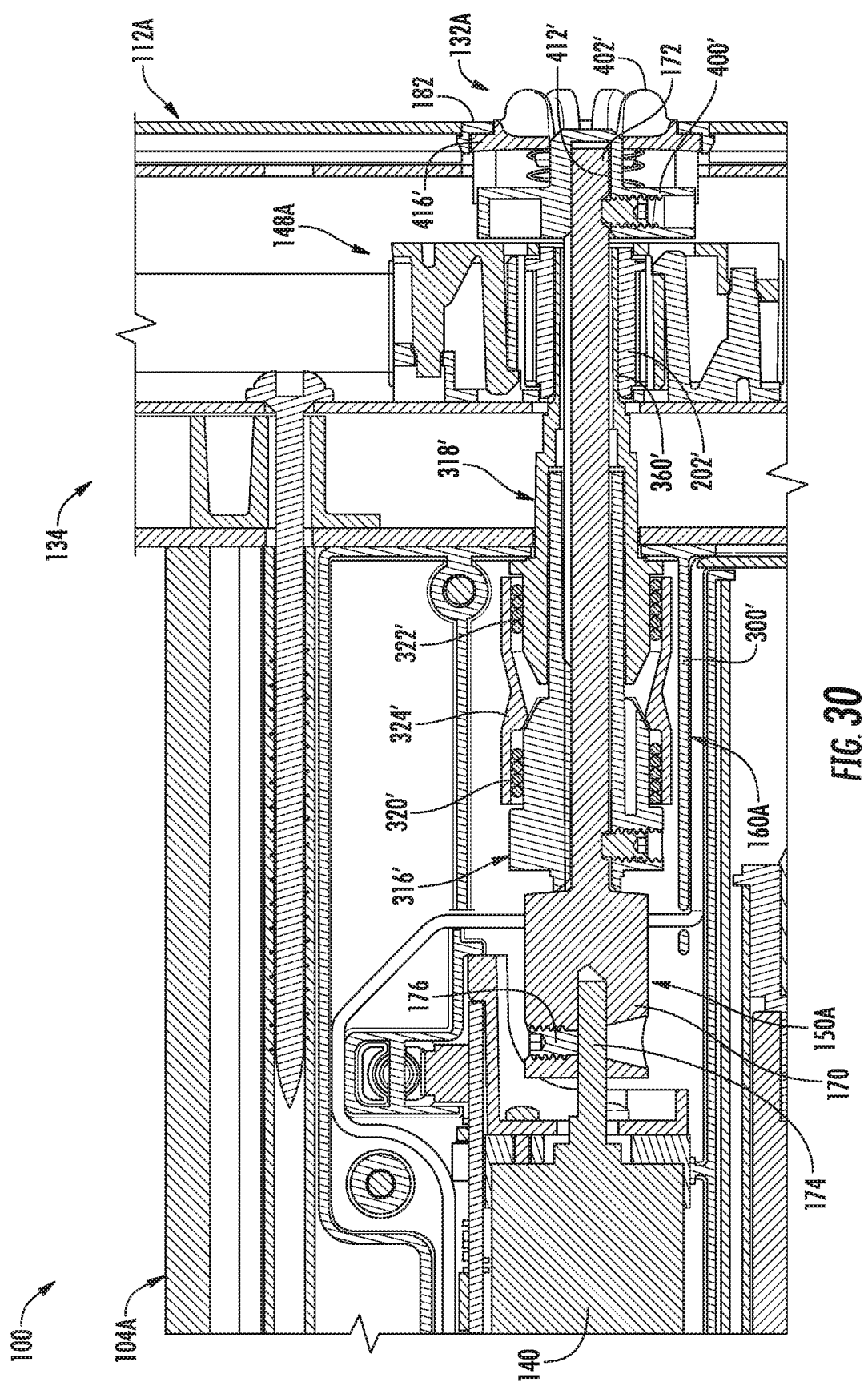
FIG. 30 illustrates a cross-sectional view of one embodiment of various drive system components installed within a shutter panel in accordance with aspects of the present subject matter.

As particularly shown in FIG. 30, in one embodiment, the first drive shaft 150A is configured to extend axially from a first shaft end 170 to a second shaft end 172, with the shaft 150A extending through both the first clutch assembly 160A and the first drive rack assembly 148A between its first and second ends 170, 172. In general, the first shaft end 170 of the drive shaft 150A may be configured to be coupled to the motor 140 to allow the motor 140 to drive the drive shaft 150A. For instance, as shown in FIG. 30, in one embodiment, the drive shaft 150A may be directly coupled to an output shaft 174 of the motor 140 (e.g., via a set screw 176). Alternatively, the drive shaft 150A may be indirectly coupled to the output shaft 174 of the motor 140, such as by providing a separate shaft coupling between the output shaft 174 and the first shaft end 170 of the drive shaft 150A. Additionally, the second shaft end 172 of the drive shaft 150A may be configured to be coupled to the first coupling assembly 132A to allow the drive shaft 150A to transfer rotational motion or torque to the first coupling assembly 132A. For instance, as shown in FIGS. 30 and 33, the second shaft end 172 may be received within the shaft opening 412' (FIG. 33) defined by the coupling base 400' of the first coupling assembly 132A.

Figure 31:
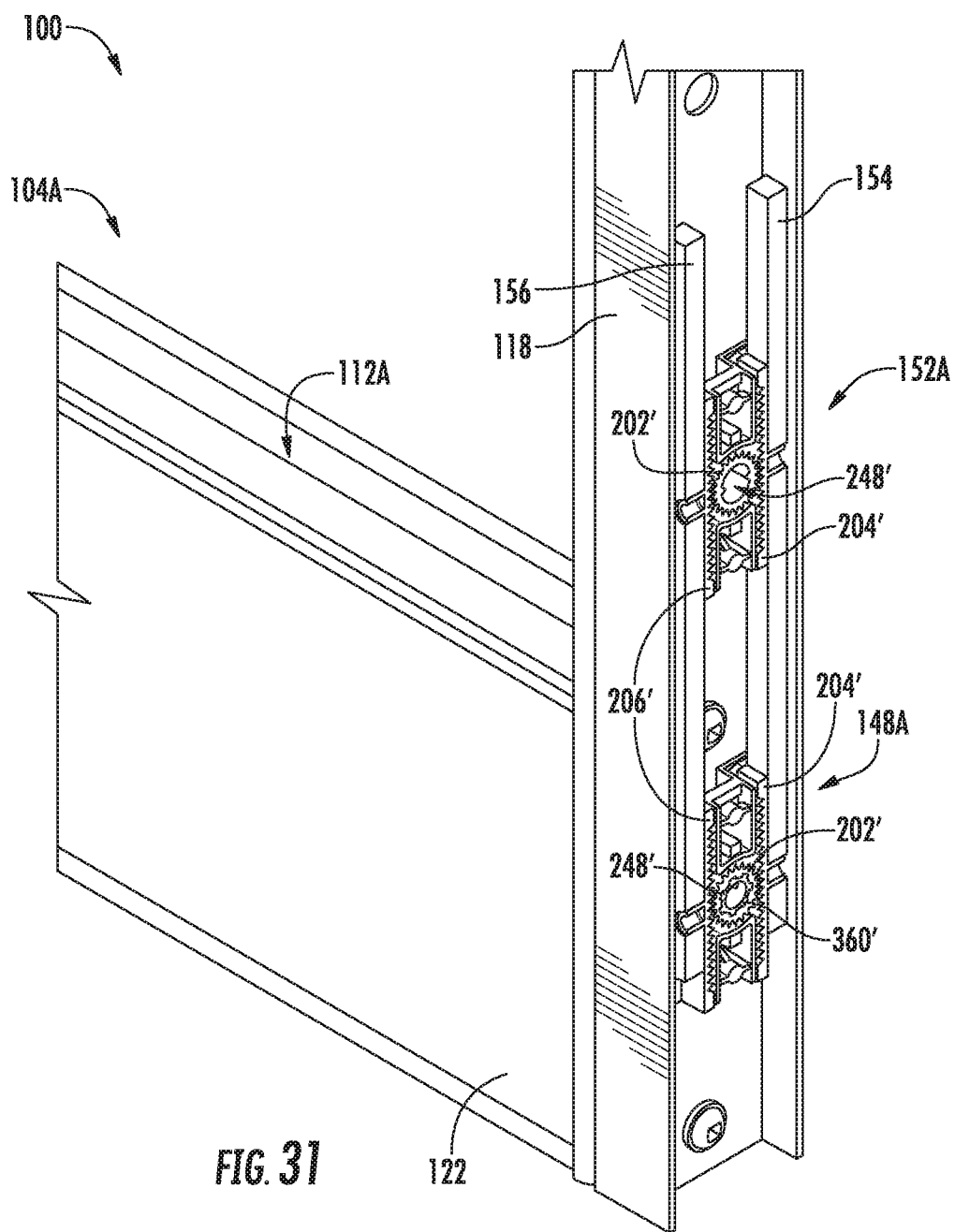
FIG. 31 illustrates a perspective view of one embodiment of various drive system components of a louver drive assembly installed within a stile of a shutter panel in accordance with aspects of the present subject matter.

As indicated above, the drive shaft 150A may be configured to engage the first clutch drive member 316' of the first clutch assembly 160A as it extends through the clutch assembly 160A. However, the drive shaft 150A may also be configured to pass freely through the second clutch drive member 318' of the first clutch assembly 160A. Moreover, as shown in FIG. 30, the second clutch drive member 318' of the first clutch assembly 160A may be configured to extend outwardly from the clutch housing 300' to allow a portion of the second clutch drive member 318' to be received within the first drive rack assembly 148A. Specifically, as indicated above and as shown in FIG. 31, the splined section of the elongated drive portion 360' of the second clutch drive member 318' may be configured to be received within the splined opening 248' defined by the rack gear 202' of the first drive rack assembly 148A. As such, the second clutch drive member 318' may be configured to drive the first drive rack assembly 148A.

When operating the disclosed drive system 134 via the motor 140, the rotational motion or torque of the motor 140 may be transferred through the first drive shaft 150A to the first clutch drive member 316'. Since the torque required to rotationally drive the louvers 114 of each shutter panel 104A, 104B is less than the slippage torque associated clutch springs 320', 322', both springs 320', 322' may remain engaged with their corresponding drive members 316', 318', thereby allowing the rotational motion of the first clutch drive member 316' to be transferred to the second clutch drive 318' member via the connection or coupling provided by the clutch springs 320', 322' and the associated clutch sleeve 324'. Such transfer of torque between the first and second clutch drive members 316', 318' may allow the second clutch drive member 318' to drive the rack gear 202' of the first drive rack assembly 148A, resulting in relative linear translation of both the geared racks 204', 206' (FIG. 31) of the first drive rack assembly 148A and the associated drive bars 154, 156 (FIG. 31). As particularly shown in FIG. 31, since the drive bars 154, 156 are coupled to each of the first driven rack assemblies 152A of the drive system 134, the relative linear translation of the drive bars 154, 156 may be transferred to the geared racks 204', 206' of each first driven rack assembly 152A, thereby causing the rack gears 202' of each first driven rack assembly 152A to be rotated. As indicated above, the rack gears 202' of each first driven rack assembly 152A may be coupled to a corresponding louver drive post 158A (FIG. 3) of one of the driven louvers 114A. Thus, rotation of the rack gears 202' of the first driven rack assemblies 152A may, in turn, drive the louver drive posts 158A, thereby resulting in corresponding rotation of both the driven louvers 114A and the non-driven louvers 114 of the first shutter panel 104A (e.g., via the connection provided by the tie bars 136). It should be appreciated that the motor 140 may be configured to be rotated in one direction to cause the louvers 114 to rotate about their longitudinal axes in a first direction, and in the opposite direction to cause the louvers 114 to rotate about their longitudinal axis in a second, opposed direction.

Similarly, rotation of the first drive shaft 150A via the motor 140 may also drive the first coupling assembly 132A via the connection provided between the second shaft end 172 of the drive shaft 150A and the coupling base 400' of the first coupling assembly 132A. As indicated above and as shown in FIG. 34, the first coupling assembly 132A may be configured to engage the second coupling assembly 132B of the second shutter panel 104B at the panel-to-panel interface 110 defined between the shutter panels 104A, 104B. Thus, torque from the motor 140 may be transferred from the first coupling assembly 132A to the second coupling assembly 132B across the panel-to-panel interface 110 to drive the various drive system components contained within the second shutter panel 104B. For instance, as shown in FIG. 34, an end 180 of the second drive shaft 150B may be coupled to the second coupling assembly 132B. As such, torque transmitted across the panel-to-panel interface 110 may drive the second drive shaft 150B, thereby allowing the drive shaft 150B to drive the remainder of the related drive system components (e.g., the second clutch assembly 160B, the second drive rack assembly 148B, the second driven rack assemblies 152B and the corresponding louver drive posts 158B (FIG. 3)).

It should be appreciated that the first and second coupling assemblies 132A, 132B may be configured to be retained within their associated shutter panel 104A, 104B at the panel-to-panel interface using any suitable means known in the art. For instance, as shown in FIGS. 32 and 33, in one embodiment, a retainer ring 182 may be secured between each coupling assembly 132A, 132B and the associated shutter frame 112A, 112B to maintain the relative positioning between such components. As shown in FIG. 33, the retainer ring 182 may, in one embodiment, be configured to axially engage a portion of the end wall 416' of the coupler 402'.

Additionally, when operating the disclosed drive system 134 manually, the user or operator may be allowed to grasp one of the louvers 114 of the first shutter panel 104A and rotate it about its longitudinal axis. Given the connection between the various louvers 114 of the first shutter panel 104A (e.g., via the tie bar 136), all of the louvers 114 may rotate simultaneously with one another, thereby causing the rotational motion of the drive louvers 114A to serve as an input torque to the rack gears 202' of the first driven rack assemblies 152A. Such rotation of the rack gears 202' of the first driven rack assemblies 152A may then cause relative linear translation of both the geared racks 204', 206' of the first driven rack assemblies 152A and the associated drive bars 154, 156. The relative linear translation of the drive bars 154, 156 may, in turn, be transferred to the geared racks 204', 206' of each first drive rack assembly 148A, thereby causing the rack gear 202' of the first drive rack assembly 148A to be rotated and, thus, rotation of the second clutch drive member 318' coupled to the rack gear 202'. Since the slippage torque for the clutch springs 320', 322' is less than the torque transmitted through the drive system 134 when manually rotating the louvers 114, the torque transmitted from the first drive rack assembly 148A to the clutch assembly 160A may result in one of the clutch springs 320', 322' slipping, thereby decoupling the first clutch drive member 316' from the second drive member 318'. For instance, as indicated above, the clutch springs 320', 322' may be wound in opposed directions. As such, when the louvers 114 are manually rotated in a first direction, the increased torque transmitted through the clutch assembly 160A may result in the first clutch spring 320' tightening around the outer spring support surface 342' (FIG. 19) of the first clutch drive member 316' and the second clutch spring 322' loosening or expanding relative to the outer spring support surface 366' (FIG. 20) of the second clutch drive member 318', thereby disengaging the connection between the first and second clutch drive members 316', 318' at the location of the interface between the second clutch spring 322' and the adjacent outer spring support surface 366' and preventing the torque transmitted from the first drive rack assembly 148A from being transferred to the first clutch drive member 316'. Similarly, when the louvers 114 are manually rotated in the opposite direction, the increased torque transmitted through the clutch assembly 160A may result in the second clutch spring 322' tightening around the outer spring support surface 366' of the second clutch drive member 318' and the first clutch spring 320' loosening or expanding relative to the outer spring support surface 342' of the first clutch drive member 316', thereby disengaging the connection between the first and second clutch drive members 316', 318' at the location of the interface between the first clutch spring 320' and the adjacent outer spring support surface 342' and preventing the torque transmitted from the first drive rack assembly 148A from being transferred to the first clutch drive member 316'.

It should be appreciated that the second clutch assembly 160B may be configured to operate the same as the first clutch assembly 160A. Specifically, when the louvers 114 of the second shutter panel 104B are manually rotated, the increased torque transmitted through the second drive rack assembly 148B to the second clutch assembly 160B may result in one of the clutch springs 320', 322' of the second clutch assembly 160B slipping relative to its adjacent outer spring support surface 342', 366', thereby disengaging or decoupling the first and second clutch drive members 316', 318' of the second clutch assembly 160B from each other.

Figure 35:
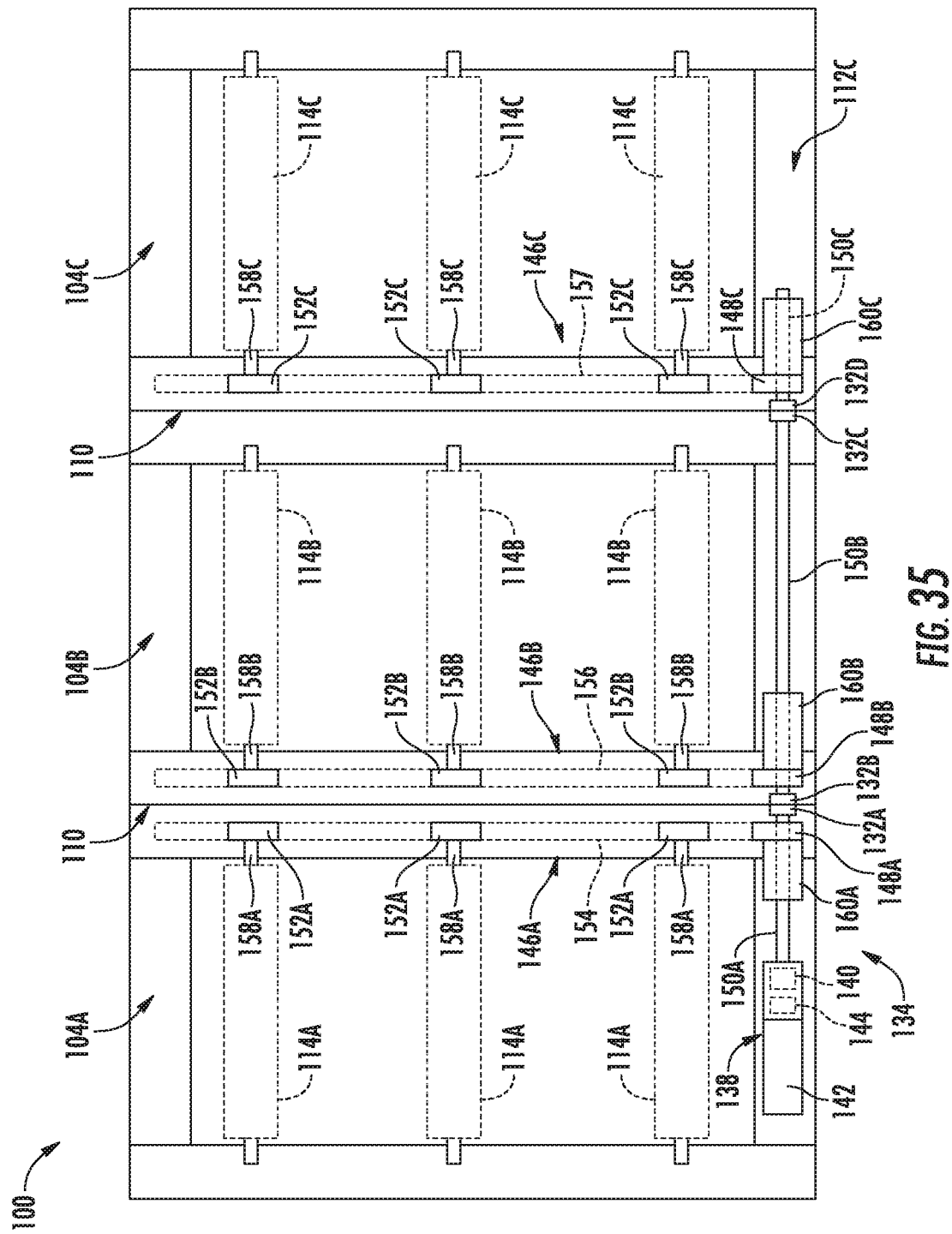
FIG. 35 illustrates a simplified front view of another embodiment of the shutter assembly shown in FIG. 3 with the frames of the shutter panels being shown in wireframe to allow various internal components of the shutter assembly to be viewed, particularly illustrating one illustrative embodiment of a drive system configured for use within the shutter assembly in accordance with aspects of the present subject matter.

It should also be appreciated that, although the shutter assembly 100 has generally been described herein as including two shutter panels 104A, 104B, the disclosed drive system 134 may be utilized with shutter assemblies having any suitable number of shutter panels. For instance, FIG. 35 illustrates an embodiment of the disclosed shutter assembly 100 in which the assembly 100 further includes a third shutter panel 104C. In such an embodiment, the drive system 134 may be configured the same as that described above with the addition of further drive components for driving the louvers 114 of the third shutter panel 104C. For instance, as shown in FIG. 35, the drive system 134 may include third and fourth coupling assemblies 132C, 132D positioned at the panel-to-panel interface 110 defined between the second shutter panel 104B and the third shutter panel 104C to allow rotational motion or torque from the second drive shaft 150B to be transferred to a third drive shaft 150C extending within a shutter frame 112C of the third shutter panel 104C. Additionally, as shown in FIG. 35, the drive system 134 may also include a third clutch assembly 160C coupled between the third drive shaft 150C and a third louver drive assembly 146C configured to drive the driven louvers 114C of the third shutter panel 104C. Similar to that described above, the third louver drive assembly 146C may, in one embodiment, be configured as a rack and pinion-type drive arrangement and may include a third drive rack assembly 148C engaged with the third clutch assembly 160C and one or more third driven rack assemblies 152C coupled to the third drive rack assembly 148C via a pair of drive bars 157, with each third driven rack assembly 152C being coupled to a corresponding louver drive post 158C of each driven louver 114C.

Figure 36:
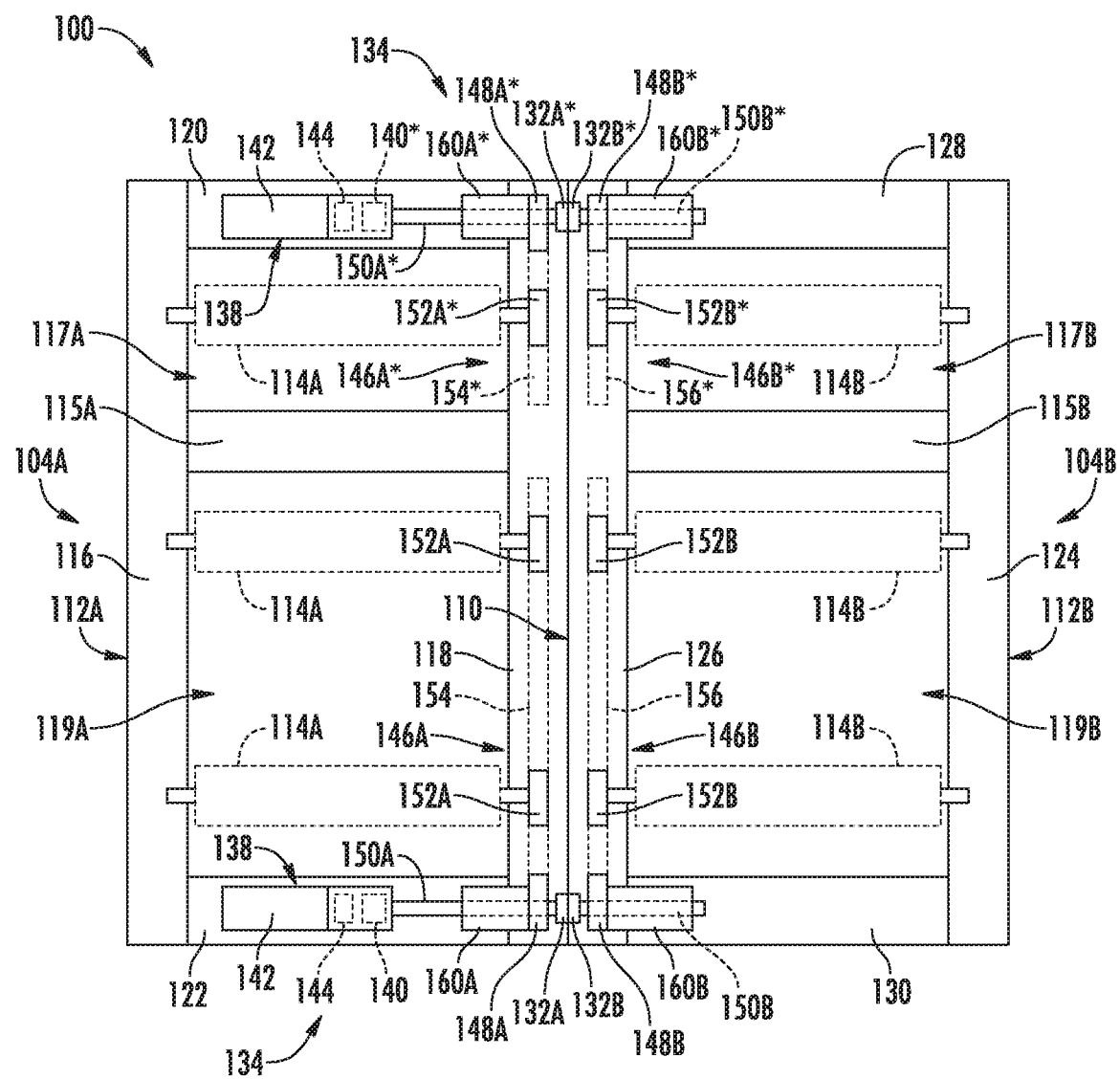
FIG. 36 illustrates a simplified front view of a further embodiment of the shutter assembly shown in FIG. 3 with the frames of the shutter panels being shown in wireframe to allow various internal components of the shutter assembly to be viewed, particularly illustrating one illustrative embodiment of a drive system configured for use within the shutter assembly in accordance with aspects of the present subject matter.

It should also be appreciated that, although the shutter panels 104A, 104B have generally been described herein as including continuous vertical sections of louvers 114, the disclosed drive system 134 may also be utilized with shutter panels having divider rails. For instance, FIG. 36 illustrates an embodiment of the disclosed shutter assembly 100 in which each shutter panel 104A, 104B includes a divider rail 115A, 115B. Specifically, in the illustrated embodiment, the first shutter panel 104A includes a first divider rail 115A, thereby dividing the first shutter panel 104A into an upper panel section 117A extending vertically between the first divider rail 115A and the top rail 120 of the first shutter panel 104A and a lower panel section 119A extending vertically between the first divider rail 115A and the bottom rail 122 of the first shutter panel 104A. Similarly, the second shutter panel 104B includes a second divider rail 115B, thereby dividing the second shutter panel 104B into an upper panel section 117B extending vertically between the second divider rail 115B and the top rail 128 of the second shutter panel 104B and a lower panel section 119B extending vertically between the second divider rail 115B and the bottom rail 130 of the second shutter panel 104B. In such an embodiment, the louvers 114 contained within the lower panel sections 119A, 119B may be driven by the various drive system components described above (e.g., the motor 140 the first and second drive shafts 150A, 150B, the first and second clutch assemblies 160A, 160B, and the various components of the first and second louver drive assemblies 146A, 146B.

Additionally, the drive system 134 also includes various system components for driving the louvers 114 contained within the upper panel sections 117A, 117B. For instance, in one embodiment, the drive system components for the louvers 114 contained within the upper panel sections 117A, 117B may be configured the same as or similar to the drive system components for the louvers 114 contained within the lower panel sections 119A, 119B. Specifically, as shown in FIG. 36, a motor 140* installed within the top rail 120 of the first shutter panel 104A may be coupled to a first drive shaft 150A* extending within the top rail 120, which is, in turn, coupled to a second drive shaft 150B* extending within the top rail 128 of the second shutter panel 104B via first and second coupling assemblies 132A*, 132B* positioned at the panel-to-panel interface 110. Additionally, the drive system 134 also includes first and second clutch assemblies 160A*, 160B*, with the first clutch assembly 160A* being coupled between the first drive shaft 150A* and a first louver drive assembly 146A* for the louvers 114 contained within the upper panel section 117A and the second clutch assembly 160B* being coupled between the second drive shaft 150B* and a second louver drive assembly 146B* for the louvers 114 contained within the upper panel section 117B. In such an embodiment, the louver drive assemblies 146A*, 146B* may be configured the same as or similar to the louver drive assemblies described above 146A, 146B, such as by including a drive rack assembly 148A*, 148B* and one or more driven rack assemblies 152A*, 152B* coupled to the drive rack assembly 148A*, 148B* via a pair of drive bars 154*, 156*.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed. Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A shutter assembly comprising:
a shutter frame;
a plurality of louvers supported by the shutter frame; and
a louver drive system configured to facilitate rotation of the plurality of louvers relative to the shutter frame, the louver drive system comprising first and second drive bars extending lengthwise within the shutter frame and a plurality of rack assemblies coupled between the first and second drive bars, each rack assembly of the plurality of rack assemblies comprising:
a housing;
a rack gear configured to be rotationally supported by the housing; and
first and second gear racks configured to mesh with the rack gear and being at least partially supported within the housing for movement relative thereto, the first gear rack being coupled to the first drive bar and the second gear rack being coupled to the second drive bar;
wherein the rack gear of at least one rack assembly of the plurality of rack assemblies is coupled to a respective louver of the plurality of louvers such that translation of the first and second drive bars within the shutter frame results in the respective louver being rotationally driven relative to the shutter frame.

2. The shutter assembly of claim 1, wherein the housing is configured to at least partially encase the rack gear and the first and second gear racks.

3. The shutter assembly of claim 1, wherein the housing defines a gear channel configured to receive the rack gear.

4. The shutter assembly of claim 3, wherein the housing defines at least one opening aligned with the gear channel for receiving a component of the louver drive system that is configured to be rotationally coupled to the rack gear.

5. The shutter assembly of claim 4, wherein the component comprises one of a louver drive post of a respective louver of the plurality of louvers or a drive-related component of the louver drive system that is configured to transmit torque between a motor of the louver drive system and the rack gear.

6. The shutter assembly of claim 1, wherein the housing defines first and second translation channels within which the first and second gear racks, respectively, are configured to translate relative to the housing.

7. The shutter assembly of claim 6, wherein:
the housing includes a first pair of opposed channel lips extending along a first side of the housing and a second pair of opposed channel lips extending along a second side of the housing, with the second side of the housing being spaced apart from the first side of the housing along a cross-wise direction of the housing;
the first translation channel is defined in the cross-wise direction between the first pair of opposed channel lips and a location of the rack gear within the housing; and
the second translation channel is defined in the cross-wise direction between the second pair of opposed channel lips and the location of the rack gear within the housing.

8. The shutter assembly of claim 6, wherein the first and second gear racks are configured to mesh with the rack gear such that rotation of the rack gear results in linear translation of the first and second gear racks relative to the housing in opposed directions within the first and second translation channels, respectively of the housing.

9. The shutter assembly of claim 1, wherein the first and second drive bars extend lengthwise within the shutter frame along opposed sides of the housing of each rack assembly.

10. The shutter assembly of claim 1, wherein the housing further includes a spacer projecting outwardly from an outer wall of the housing that is configured to provide spacing between the housing and an adjacent portion of the shutter frame.

11. The shutter assembly of claim 1, wherein:
the housing comprises a first housing component and a second housing component configured to be coupled to the second housing component; and
the rack gear is rotationally supported within the housing between the first and second housing components.

12. The shutter assembly of claim 1, wherein:
the louver drive system further comprises a motor; and
one of the plurality of rack assemblies comprises a drive rack assembly coupled to the motor such that rotation of the motor rotationally drives the rack gear of the drive rack assembly in a manner that results in translation of the first and second drive bars within the shutter frame.

13. The shutter assembly of claim 12, wherein:
the drive rack assembly is coupled to the motor via a clutch assembly; and
the clutch assembly is configured to decouple the drive rack assembly from the motor when a torque transmitted through the clutch assembly exceeds a torque threshold.

14. A louver drive system for rotating louvers of a shutter assembly, the louver drive system comprising:
a first drive bar extending in a lengthwise direction;
a second drive bar spaced apart from the first drive bar and extending in the lengthwise direction; and
a plurality of rack assemblies coupled between the first and second drive bars and being spaced apart from one another along the lengthwise direction, each rack assembly of the plurality of rack assemblies comprising:
a housing;
a rack gear configured to be rotationally supported by the housing; and
first and second gear racks at least partially supported within the housing for movement relative thereto, the first gear rack being coupled to the first drive bar and the second gear rack being coupled to the second drive bar;
wherein the rack gear of each respective rack assembly of the plurality of rack assemblies is configured to mesh with the first and second gear racks of each respective rack assembly such that rotation of the rack gear results in translation of first and second drive bars relative to the housing of each respective rack assembly.

15. The louver drive system of claim 14, wherein the housing is configured to at least partially encase the rack gear and the first and second gear racks.

16. The louver drive system of claim 14, wherein the housing defines a gear channel configured to receive the rack gear.

17. The louver drive system of claim 16, wherein the housing defines at least one opening aligned with the gear channel for receiving a component of the louver drive system that is configured to be rotationally coupled to the rack gear.

18. The louver drive system of claim 14, wherein the housing defines first and second translation channels within which the first and second gear racks, respectively, are configured to translate relative to the housing with rotation of the rack gear.

19. The louver drive system of claim 18, wherein:
the housing includes a first pair of opposed channel lips extending along a first side of the housing and a second pair of opposed channel lips extending along a second side of the housing, with the second side of the housing being spaced apart from the first side of the housing along a cross-wise direction of the housing;
the first translation channel is defined in the cross-wise direction between the first pair of opposed channel lips and a location of the rack gear within the housing; and
the second translation channel is defined in the cross-wise direction between the second pair of opposed channel lips and the location of the rack gear within the housing.

20. The louver drive system of claim 14, wherein the first and second drive bars extend in the lengthwise direction along opposed sides of the housing of each rack assembly.

* * * * *